(12) United States Patent
Jang et al.

(10) Patent No.: US 12,313,904 B2
(45) Date of Patent: May 27, 2025

(54) CAMERA ACTUATOR, CAMERA MODULE AND CAMERA DEVICE INCLUDING SAME

(71) Applicant: LG INNOTEK CO., LTD., Seoul (KR)

(72) Inventors: Young Bae Jang, Seoul (KR); Seung Hyeon Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 618 days.

(21) Appl. No.: 17/633,513

(22) PCT Filed: Aug. 7, 2020

(86) PCT No.: PCT/KR2020/010470
§ 371 (c)(1),
(2) Date: Feb. 7, 2022

(87) PCT Pub. No.: WO2021/025518
PCT Pub. Date: Feb. 11, 2021

(65) Prior Publication Data
US 2022/0299730 A1 Sep. 22, 2022

(30) Foreign Application Priority Data

Aug. 7, 2019 (KR) .................. 10-2019-0096316
Aug. 8, 2019 (KR) .................. 10-2019-0096649

(51) Int. Cl.
*G02B 7/18* (2021.01)
*G02B 7/02* (2021.01)
(Continued)

(52) U.S. Cl.
CPC ............. *G02B 7/181* (2013.01); *G02B 7/023* (2013.01); *G02B 7/09* (2013.01); *H04N 23/51* (2023.01); *H04N 23/55* (2023.01); *H04N 23/685* (2023.01)

(58) Field of Classification Search
None
See application file for complete search history.

(56) References Cited

U.S. PATENT DOCUMENTS 10,133,152 B2 11/2018 Kang et al.
10,284,780 B2 5/2019 Goldenberg et al.
(Continued)

FOREIGN PATENT DOCUMENTS

CN 206002752 U 3/2017
CN 106990551 A 7/2017
(Continued)

OTHER PUBLICATIONS

International Search Report dated Nov. 13, 2020 in International Application No. PCT/KR2020/010470.
(Continued)

*Primary Examiner* — Bao-Luan Q Le
*Assistant Examiner* — Danell L Owens
(74) *Attorney, Agent, or Firm* — Saliwanchik, Lloyd & Eisenschenk

(57) ABSTRACT

A camera actuator according to an embodiment may include a housing, a prism unit disposed in the housing and a prism drive unit, a shaft unit disposed in the housing so as to tilt the prism unit in a first axis direction or a second axis direction, wherein the shaft unit includes a first shaft arranged in a direction parallel to a first direction, and a second, and a third shaft arranged in directions perpendicular to the first direction.

18 Claims, 50 Drawing Sheets

(51) Int. Cl.
    *G02B 7/09*     (2021.01)
    *H04N 23/51*     (2023.01)
    *H04N 23/55*     (2023.01)
    *H04N 23/68*     (2023.01)

(56) References Cited

U.S. PATENT DOCUMENTS

| | | |
|---|---|---|
| 10,394,046 B2 | 8/2019 | Jeong et al. |
| 10,498,961 B2 | 12/2019 | Goldenberg et al. |
| 10,516,773 B2 | 12/2019 | Yoon et al. |
| 10,534,194 B2 | 1/2020 | Lee et al. |
| 10,564,442 B2 | 2/2020 | Seol et al. |
| 10,678,062 B2 | 6/2020 | Im et al. |
| 10,866,430 B2 | 12/2020 | Kim et al. |
| 11,567,338 B2 | 1/2023 | Enta et al. |
| 2014/0218798 A1 | 8/2014 | Suzuka |
| 2018/0024329 A1 | 1/2018 | Goldenberg et al. |
| 2018/0217475 A1 | 8/2018 | Goldenberg et al. |
| 2018/0321504 A1* | 11/2018 | Hu .......................... G02B 7/09 |
| 2018/0343391 A1 | 11/2018 | Goldenberg et al. |
| 2019/0222758 A1 | 7/2019 | Goldenberg et al. |
| 2020/0174270 A1 | 6/2020 | Enta et al. |

FOREIGN PATENT DOCUMENTS

| | | |
|---|---|---|
| CN | 107357114 A | 11/2017 |
| CN | 107515459 A | 12/2017 |
| CN | 109901342 A | 6/2019 |
| JP | 2015-92285 A | 5/2015 |
| JP | 2018-205683 A | 12/2018 |
| KR | 10-2018-0085460 A | 7/2018 |
| KR | 10-2018-0092251 A | 8/2018 |
| KR | 10-2018-0096073 A | 8/2018 |
| KR | 10-2018-0097228 A | 8/2018 |
| KR | 10-1892857 B1 | 8/2018 |
| KR | 10-1901705 B1 | 9/2018 |
| KR | 10-1942743 B1 | 1/2019 |
| KR | 10-1973434 B1 | 4/2019 |

OTHER PUBLICATIONS

Supplemental European Search Report dated Aug. 9, 2023 in European Application No. 20849610.9.

Office Action dated May 10, 2023 in Chinese Application No. 202080063089.X.

* cited by examiner

CAMERA ACTUATOR, CAMERA MODULE AND CAMERA DEVICE INCLUDING SAME

CROSS-REFERENCE TO RELATED APPLICATIONS

This application is the U.S. national stage application of International Patent Application No. PCT/KR2020/010470, filed Aug. 7, 2020, which claims the benefit under 35 U.S.C. § 119 of Korean Application Nos. 10-2019-0096316, filed Aug. 7, 2019; and 10-2019-0096649, filed Aug. 8, 2019, the disclosures of each of which are incorporated herein by reference in their entirety.

TECHNICAL FIELD

The embodiment relates to a camera actuator, a camera module, and a camera device including the same.

BACKGROUND ART

The camera module captures a subject and stores it as an image or video, and is installed in mobile terminals such as cell phones, laptops, drones, and vehicles.

On the other hand, portable devices such as smart phones, tablet PCs, and laptops have built-in micro-camera modules. Such a camera module may perform an autofocus (AF) function that automatically adjusts the distance between the image sensor and the lens to align the focal lengths of the lenses.

In addition, recent camera modules may perform a zooming function of zooming up or zooming out by increasing or decreasing the magnification of a distant subject through a zoom lens.

In addition, recent camera modules employ image stabilization (IS) technology that corrects or inhibits image shake due to camera movement caused by unstable fixing devices or user movement.

Such image stabilization (IS) technology includes an optical image stabilizer (OIS) technology and an image shake prevention technology using an image sensor.

OIS technology is a technology that corrects motion by changing the path of light, and the image shake prevention technology using an image sensor is a technology that compensates movement by mechanical and electronic methods, OIS technology is being adopted more and more.

In addition, the vehicle camera module is a product for transmitting images around the vehicle or inside the vehicle to the display, and can be mainly used for parking assistance and driving assistance systems.

In addition, the vehicle camera module detects lanes and vehicles around the vehicle and collects and transmits related data, thereby enabling the ECU to warn or control the vehicle.

Meanwhile, a zoom actuator is used for a zooming function in the camera module. However, due to the mechanical movement of the actuator, friction torque is generated when the lens is moved, and the friction torque causes technical problems such as a decrease in driving force, an increase in power consumption, or a decrease in control characteristics.

In particular, in order to obtain the best optical properties by using a plurality of zoom lens groups in the camera module, not only alignment between the plurality of lens groups but also the alignment between the plurality of lens groups and the image sensor are required. However, if a decenter that a center of the spherical surface between lens groups deviates from the optical axis, or a tilt of a lens inclination phenomenon, or a phenomenon that the lens group and the central axis of the image sensor are not aligned, the angle of view may be changed or the focus may be out of focus such that these phenomena may adversely affect picture quality or resolution.

On the other hand, when an attempt is made to increase a spacing in the area where friction is generated in order to reduce friction torque resistance while moving the lens for the zoom function in the camera module, there is a technical problem in that intensifies the lens decent or the tilt of the lens at the reversal time of the zoom movement or the zoom movement.

On the other hand, the resolution of the image sensor increases as the pixel becomes higher and the size of the pixel becomes smaller. As the pixel becomes smaller, the amount of light received at the same time decreases. Therefore, the higher the resolution of a camera, the more severe the image un-stabilization due to hand shake that occurs when the shutter speed is slowed down in a dark environment.

Accordingly, in order to take images without distortion using a high-pixel camera in a dark night or video, the OIS function has recently been adopted as essential.

On the other hand, OIS technology is a method of correcting image quality by moving a lens or an image sensor of a camera to correct an optical path. In particular, the OIS technology detects the movement of the camera through a gyro sensor and calculates a distance that the lens or image sensor should move based on this.

For example, the OIS correction method includes a lens movement method and a module tilting method. In the lens movement method, only the lens in the camera module is moved to realign the center of the image sensor and the optical axis. On the other hand, the module tilting method is a method of moving the entire module including the lens and image sensor.

In particular, the module tilting method has a wider correction range than the lens movement method and has the advantage of minimizing image distortion because the focal length between the lens and the image sensor is fixed.

On the other hand, in the case of the lens movement method, a Hall sensor is used to detect the position and movement of the lens. On the other hand, in the module tilting method, a photo reflector is used to detect the movement of the module. However, both methods use a gyro sensor to detect the movement of the camera user.

The OIS controller uses the data recognized by the gyro sensor to predict where the lens or module should move to compensate for the user's movement.

According to the recent technology trend, ultra-slim and ultra-small camera modules are required. In the ultra-small camera module, there is a space limitation for OIS operation, so it is difficult to implement the OIS function applied to general large cameras such that there is a problem in that it is not possible to implement an ultra-small camera module.

On the other hand, according to the unpublished internal technology, the optical path is controlled by using a predetermined variable lens for driving the OIS. However, in recent camera modules, high-pixel cameras have to increase the amount of light received for clearer image quality, so the size of the variable lens for OIS driving needs to be increased. However, when the size of the variable lens increases, there is a technical contradiction in that the size of the variable lens cannot be increased to a level required owing to the thickness limit of the camera module.

In addition, according to the unpublished technology, a dual prism OIS actuator technology in which two prisms each tilt in one axial direction in order to implement a high magnification zoom performance is being developed. However, in order to implement such a dual prism OIS, two independent actuators need to be applied, so there is a problem in that the size of the OIS actuator increases. In addition, as the camera module assembly process becomes more complex, issues of precision and reliability are occurring.

In addition, in the conventional OIS technology, within the limited size of the camera module, as the OIS driving unit is disposed on the side of the solid lens assembly, there is a problem in that the size of the lens to be OIS is limited, making it difficult to secure the amount of light.

In particular, in order to obtain the best optical characteristics from the camera module, alignment between lens groups must be well matched when OIS is implemented through lens movement or module tilting. When a decent or a tilt of inclination of the lens occurs, the angle of view can be changed or the focus can be defocused, thereby adversely affecting image quality or resolution.

In addition, in the conventional OIS technology, OIS driving and AF or Zoom can be implemented at the same time. However, due to the space constraint of the camera module and the position of the driving part of the existing OIS technology, the OIS magnet and the AF or Zoom magnet are placed close to each other, which may cause magnetic field interference. So, OIS operation cannot be properly performed due to such magnetic field interference, which causes a decent or tilt phenomenon.

In addition, the conventional OIS technology has a problem in that the structure is complicated and power consumption increases because a mechanical driving device is required for lens movement or tilting of the module.

Meanwhile, as described above, the camera module may be applied to a vehicle together with a radar and the like and used in an advanced driver assistance system (ADAS). Accordingly, not only the convenience of the driver, but also the safety or life of the driver or pedestrian may be greatly affected by the camera module.

For example, advanced driver assistance systems (ADAS) include Autonomous Emergency Braking (AEB), which slows down or stops by itself in the event of a collision risk without the driver stepping on the brake, Lane Keep Assist System (LKAS), which maintains the lane by adjusting the driving direction in case of lane departure, Advanced Smart Cruise Control (ASCC), which maintains a distance from the vehicle in front while driving at a preset speed, Active Blind Spot Detection (ABSD), which detects the risk of collision in the blind spot and helps to change into a safe lane, and Around View Monitor (AVM) that visually shows the surroundings of the vehicle, etc.

In this advanced driver assistance system (ADAS), the camera module functions as a core part together with radar, and the proportion of the camera module application is gradually increasing.

For example, in the case of an automatic emergency braking system (AEB), a front camera sensor and a radar sensor detect a vehicle or pedestrian in front and automatically provide emergency braking when the driver does not control the vehicle.

Alternatively, in the case of the Lane Keep Assist System (LKAS), the camera sensor detects whether the driver leaves the lane without manipulation, such as direction indication, and automatically steers the steering wheel to maintain the lane.

In addition, in the case of an Around View Monitoring System (AVM), it is possible to visually show the surroundings of the vehicle through camera sensors placed on all sides of the vehicle.

When the camera module is applied to a vehicle's advanced driver assistance system (ADAS), the OIS technology becomes even more important due to the vibration of the vehicle. This is because the precision of OIS data can be directly related to the safety or life of drivers and pedestrians. In addition, when implementing AF or Zoom, a plurality of lens assemblies are driven by electromagnetic force between magnets and coils, but there is a problem in that magnetic field interference occurs between magnets mounted on each lens assembly. Due to magnetic field interference between these magnets, there is a problem in that AF or zoom operation cannot be properly performed and thrust can be lowered.

Also, there is a problem of causing a decent or tilt phenomenon due to magnetic field interference between magnets.

If there is an issue in the precision of camera control or the thrust down due to such magnetic field interference, or if a decent or tilt phenomenon is induced, it may directly affect the safety or life of a user, a driver or a pedestrian.

In addition, when each element of the camera module, for example, a magnet, etc. is detached in an environment with severe vibration such as a vehicle, it may cause major problems such as thrust, precision, and control as well as mechanical reliability.

Meanwhile, in the related art, a Hall sensor is disposed inside the winding of the coil to detect a change in magnetic flux of a predetermined magnet mounted on the moving lens housing to detect the position of the lens housing.

However, when the Hall sensor is positioned inside the coil, the distance between the Hall sensor and the magnet is determined by the height of the coil.

However, in the related art, there is a thrust required for the movement of the moving lens housing, and in order to secure such thrust, the height of the coil is required to be higher than a predetermined height.

However, when the height of the coil is increased in this way, the magnetic flux of the magnet is blocked by the coil, so there is a technical contradiction in which the sensitivity of the Hall sensor disposed inside the coil is weakened.

According to the undisclosed internal technology of the applicant, in order to cope with this problem, the optimum point of the sensitivity and thrust of the Hall sensor is just set by a coil of an appropriate height.

On the other hand, the content described in the item simply provides background information for the present disclosure and does not constitute the prior art.

DISCLOSURE

Technical Problem

One of the technical problems of the embodiment is to provide an ultra-slim, ultra-small camera actuator and a camera module including the same.

In addition, one of the technical problems of the embodiment is to provide a camera actuator and a camera module including the same, which eliminates the size limitation of the lens in the lens assembly of the optical system when implementing OIS to ensure sufficient light quantity.

In addition, one of the technical problems of the embodiment is to provide a camera actuator and a camera module including the same, which can solve the technical contradiction that a size of the variable lens for OIS driving should be increased to increase the amount of light received for clear image quality, while the size increasing of the variable lens can be constrained due to the thickness limitation of the camera module.

In addition, one of the technical problems of the embodiment is to provide a camera actuator and a camera module including the same, capable of exhibiting the best optical characteristics by minimizing the occurrence of a decent or tilt phenomenon when implementing OIS.

In addition, one of the technical problems of the embodiment is to provide a camera actuator and a camera module including the same, capable of inhibiting magnetic field interference with a magnet for AF or Zoom when implementing OIS.

In addition, one of the technical problems of the embodiment is to provide a camera actuator and a camera module including the same, capable of inhibiting magnetic field interference between magnets mounted on each lens assembly when a plurality of lens assemblies are driven by electromagnetic force between magnets and coils when implementing AF or Zoom.

Another embodiment is to provide a camera actuator and a camera module including the same, capable of inhibiting detachment of the magnet and the yoke.

In addition, one of the technical problems of the embodiment is to provide a camera actuator and a camera module including the same, capable of implementing OIS with low power consumption.

In addition, one of the technical problems of the embodiment is to provide a camera actuator and a camera module including the same, capable of inhibiting friction torque from being generated when the lens is moved through zooming in the camera module.

In addition, one of the technical problems of the embodiment is to provide a camera actuator and a camera module including the same that can inhibit the occurrence of a phenomenon of the lens decenter or the lens tilt, and an inconsistency between the center of the lens and the central axis of the image sensor when the lens is moved through zooming in the camera module.

In addition, one of the technical problems of the embodiment is to provide a camera actuator and a camera module including the same, capable of simultaneously increasing the sensitivity of the hall sensor while increasing thrust.

The technical problems of the embodiments are not limited to those described in this item, and include those that can be inferred from the entire description of the invention.

Technical Solution

A camera actuator according to the embodiment may include a housing 310, a prism unit 330 disposed in the housing 310, and a prism driving unit 320, a shaft unit 340 for tilting in a first axis or a second axis direction disposed in the housing 310 and the shaft unit 340 may include a first shaft 341 disposed in a direction parallel to a first direction and a second shaft 342, a third shaft 342 disposed perpendicular to the first direction.

The prism unit 330 may include a prism mover 334 having a seating portion 334A, and a prism 332 disposed on the seating portion 334A of the prism mover 334.

The prism mover 334 may include a first outer surface 334S1 and a second outer surface 334S2 extending upwardly from both corners of the seating portion 334A, and the first outer surface 334S1 of the prism mover 334 may include a first recess 334R1, and the second outer surface 334S2 may include a second recess 334R2.

The second shaft 342 and the third shaft 343 may be respectively disposed in the first recess 334R1 and the second recess 334R2.

Diameters of the first recess 334R1 and the second recess 334R2 of the prism mover 334 may be greater than diameters of the second shaft 342 and the third shaft 343, respectively.

The prism mover 334 includes a third outer surface 334S3 between the first outer surface 334S1 and the second outer surface 334S2, and a rotation guide area AR1 on the third outer surface 334S3.

The rotation guide area AR1 may include a first guide protrusion 334P1 protruding from the third outer surface 334S3 and a second guide protrusion 334P2 protruding from the first guide protrusion 334P1.

The first guide protrusion 334P1 may include a third guide recess 334R3, and the second guide protrusion 334P2 may include a fourth guide recess 334R4.

The first shaft 341 of the shaft unit 340 may be disposed in the fourth guide recess 334R4 on the second guide protrusion 334P2.

The second guide protrusion 334P2 may protrude higher than the first guide protrusion 334P1 and the first shaft 341 may be disposed in the fourth guide recess 334R4 on the second guide protrusion 334P2.

When the prism unit 330 is rotated or tilted in the first axial direction using the first shaft 341 as a rotation axis, the second shaft 342 and the third shaft 343 may function as a stopper.

By disposing the first shaft 341 on the fourth guide recess 334R4 on the second guide protrusion 334P2 that protrudes more than the first guide protrusion 334P1, it can be rotated or tilted in the second axial direction.

When the prism unit 330 is rotated or tilted in the second axis direction using the second shaft 342 and the third shaft 342 as rotation axis, the first shaft 341 may function as a stopper by the third guide recess 334R3.

The third outer surface 334S3 of the prism mover may include a third-first seating portion 334S3$a$ and a third-second seating portion 334S3$b$ and a fourth magnet 322M4 and a first magnet 322M1 may be respectively disposed on the third-first seating portion 334S3$a$ and the third-second seating portion 334S3$b$.

A camera actuator according to the embodiment may include a housing 310, a prism unit 330 disposed in the housing 310, a driving unit for tilting the prism unit, and first to third shafts.

The housing may include a housing base, a first sidewall, a second sidewall opposite the first sidewall, and a third sidewall disposed between the first sidewall and the second sidewall.

The housing base may include a first recess protruding from the housing base in an area adjacent to the first sidewall and a second recess protruding from the housing base in an area adjacent to the second sidewall.

The second shaft is disposed in the first recess, the third shaft is disposed in the second recess, and the first shaft is disposed in a third recess formed in the first sidewall and a fourth recess formed in the second sidewall.

The direction of the long axes of the second shaft and the third shaft may be perpendicular to the direction of the long axis of the first shaft.

The prism unit 330 may include a prism mover 334 having a seating portion 334A, and a prism 332 disposed on the seating portion 334A of the prism mover 334. The prism mover 334 may include a third outer surface 334S3 between the first outer surface 334S1 and the second outer surface 334S2, and a rotation guide area AR1 on the third outer surface 334S3.

The rotation guide area AR1 may include a first guide protrusion 334P1 protruding from the third outer surface 334S3 and a second guide protrusion 334P2 protruding from the first guide protrusion 334P1.

The first guide protrusion 334P1 may include a third guide recess 334R3, the second guide protrusion 334P2 may include a fourth guide recess 334R4. The first shaft 341 of the shaft unit 340 may be disposed in the fourth guide recess 334R4 of the second guide protrusion 334P2.

The second guide protrusion 334P2 may protrude higher than the first guide protrusion 334P1, and the first shaft 341 may be disposed on the fourth guide recess 334R4 of the second guide protrusion 334P2.

When the prism unit 330 is rotated or tilted in the first axial direction using the first shaft 341 as a rotation axis, the second shaft 342 and the third shaft 343 may function as a stopper.

By disposing the first shaft 341 on the fourth guide recess 334R4 on the second guide protrusion 334P2 that protrudes more than the first guide protrusion 334P1, it can be rotated or tilted in the second axial direction.

When the prism unit 330 is rotated or tilted in the second axis direction using the second shaft 342 and the third shaft 342 as rotation axis, the first shaft 341 may serve as a stopper by the third guide recess 334R3.

In addition, a camera actuator according to the embodiment may include a housing 310, a prism unit 330 disposed in the housing 310, and a prism driving unit 320, a rotating unit 340 disposed in the housing 310 for tilting the prism unit 330 to a first axis or a second axis. And the rotating unit 340 may include a first rotating unit 341 and a second rotating unit 342 at least partially overlapping with the first rotating unit 341.

The prism unit 330 may be disposed on the first rotating unit 341 and the second rotating unit 342.

The prism unit 330 may include a prism mover 334 having a seating portion 334A, and a prism 332 disposed on the seating portion 334A of the prism mover 334.

The prism mover 334 may include a first outer surface 334S1 and a second outer surface 334S2 extending upwardly from both corners of the seating portion 334A, and the first outer surface 334S1 of the prism mover 334 may include a first mover protrusion 334P1, and the second outer surface 334S2 may include a second mover protrusion 334P2.

The prism mover 334 may include a third outer surface 334S3 between the first outer surface 334S1 and the second outer surface 334S2.

A rotation guide 334P disposed on the third outer surface 334S3 may be further included.

The rotation guide 334P may include a first rotation guide 334P1 that extends and protrudes in a vertical direction from the third outer surface 334S3 and a second rotation guide 334P2 that extends vertically and protrudes from the first rotation guide 334P1

The second rotation guide 334P2 may be coupled to the first rotation hole 342R1 of the second rotation unit 342 to rotate or tilt the prism unit 330.

The third outer surface 334S3 of the prism mover may include a third-first seating portion 334S3a and a third-second seating portion 334S3b. A fourth magnet 322M4 and a first magnet 322M1 may be respectively disposed on the third-first seating portion 334S3a and the third-second seating portion 334S3b.

The housing 310 may include a first housing side portion 312S1, a second housing side portion 312S2, and a third housing side portion 312S3 disposed between the first and second housing sides 312S1, 312S2, the first housing side portion 312S1 may include a first hinge groove HG1, and the second housing side portion 312S2 may include a second hinge groove HG2.

A first hinge shaft 341B of the first rotation unit 341 may be coupled to the first hinge groove HG1.

A second hinge shaft 342B of the second rotation unit 342 may be coupled to the second hinge groove HG2.

The second hinge groove HG2 may include a second-first hinge groove HG2a and a second-second hinge groove HG2b, and the second-first hinge groove HG2a may have a rectangular cross section, and the second-second hinge groove HG2b may have a circular or hemispherical cross-section.

In addition, a camera actuator according to the embodiment may include a housing 310 and a prism unit 330 disposed in the housing 310 including a prism mover and a prism. In addition, the camera actuator may include a prism driving unit 320 and a rotating unit 340 for tilting the prism unit 330 in a first axis or a second axis direction.

The rotating unit 340 may include a first rotating unit 341 and a second rotating unit 342 at least partially overlapping the first rotating unit 341. The prism unit 330 may be disposed on the first rotating unit 341 and the second rotating unit 342.

The first rotation unit 341 may include a first-first rotation side part 341S1 and a first-second rotation side part 341S2, and the first-second rotation side part 341S2 may extend in a direction perpendicular to the first-first rotation side part 341S1 and include an inclined surface. And a portion of the prism mover 334 may be seated on the inclined surface of the first-second first rotation side part 341S2.

The first-first rotation side part 341S1 of the first rotation unit 341 may include a first-first rotation protrusion 341P1 and a first-second rotation protrusion part 341P2. And a first hinge shaft 341B may be disposed on the first-first rotation protrusion 341P1, and a second magnet 322M2, a second yoke 324Y2 may be disposed on the first-second rotation protrusion 341P2.

The first hinge shaft 341B of the first rotation unit 341 may include a first-first hinge shaft 341B1 and a first-second hinge shaft 341B2 extending and protruding from the first-first rotation protrusion 341P1.

The housing 310 may include a first housing side portion 312S1, a second housing side portion 312S2, and a third housing side portion 312S3 disposed between the first and second housing sides 312S1, 312S2. And the first housing side portion 312S1 may include a first hinge groove HG1, and the second housing side portion 312S2 may include a second hinge groove HG2.

The first hinge groove HG1 of the first housing side portion 312S1 may include a first-fist hinge groove HG1a and a first-second hinge groove HG1b, and the first-second hinge shaft 341B2 may be inserted in the first-first hinge groove HG1a.

A vertical width DH1 of the first-first hinge groove HG1a may be greater than a vertical width of the first-second hinge shaft 341B2, and a horizontal width DH1 of the first-second hinge groove HG1b may be larger than the horizontal width DB1 of the first-second hinge shaft 341B2.

The second rotation unit 342 may include a second-first rotation side part 342S1 and a second-second rotation side part 342S2, and the second-second rotation side part 342S2 may extend in a direction perpendicular to the second-first rotation side part 342S1 and include an inclined surface. And a portion of the prism mover 334 may be seated on the inclined surface of the second-second second rotation side part 342S2.

A second-first rotation side part 342S1 of the second rotation unit 342 may include a second-first rotation protrusion 342P1 and a second-second rotation protrusion 342P2. And the second hinge shaft 342B of the second rotation unit 342 may be disposed in the second-first rotation protrusion portion 342P2.

The second hinge shaft 342B of the second rotation unit 342 may include a second-first hinge shaft 342B1 and a second-second hinge shaft 342B2 that extend and protrude from the second-first rotation protrusion 342P1. And the second hinge shaft 342B of the second rotation unit 342 may be coupled to the second hinge groove HG2 of the housing.

In addition, the camera actuator according to the embodiment includes a housing 310, a prism unit 330 disposed in the housing 310, a driving unit 320 for tilting the prism unit 330, and a rotation guide unit 340 surrounding the prism unit 330.

The rotation guide unit 340 may include a first rotation guide 341 and a second rotation guide 342 coupled to the first rotation guide 341.

The first rotation guide 341 may include a first protrusion 341B, and the second rotation guide 342 may include a prism mover recess and a second protrusion 342B.

The prism unit 330 may include a prism 332 and a prism mover 334,

The prism mover 334 may include an inclined surface on which the prism is seated, and magnet seating parts 334S3a and 334Sb disposed on a surface opposite to the surface 334A on which the prism is seated on the inclined surface. And the prism mover 334 may include a prism mover protrusion 334P that is seated in the prism mover recess of the second rotation guide 342 from the magnet seating portion to rotate the prism unit about the first axis.

The housing 310 may include a first sidewall 312S1 and a second sidewall 312S2 opposite to the first sidewall 312S1. And he first sidewall 312S1 may include a first recess HG1 accommodating the first protrusion 341B, and the second sidewall 312S2 may include a second recess HG2 accommodating the second protrusion 342B.

The movement of the first protrusion 341B and the second protrusion 342B with respect to the first recess HG1 and the second recess HG2 may rotate the prism unit about the second axis.

The camera module of the embodiment may include a lens assembly, an image sensor unit disposed on one side of the lens assembly, and any one of the camera actuators disposed on the other side of the lens assembly.

The camera module of the embodiment may include a lens assembly, an image sensor unit disposed on one side of the lens assembly, and any one of the camera actuators disposed on the other side of the lens assembly.

Advantageous Effects

According to the embodiment, there is a technical effect that can provide an ultra-slim, ultra-small camera actuator and a camera module including the same.

For example, according to the embodiment, the OIS can be implemented by having a prism driving unit 320 and a shaft unit 340 disposed in a housing 310, thereby eliminating a size limitation of the lens in the lens assembly of the optical system, so that and there is a technical effect that can provide the ultra-slim, ultra-small camera actuator and a camera module including the same.

In addition, according to the embodiment, there is a technical effect that can provide a camera actuator and a camera module including the same, capable of securing a sufficient amount of light by solving the size limitation of the lens in the lens assembly of the optical system when OIS is implemented.

For example, according to the embodiment, by implementing OIS through rotation in the first and second axis directions of the prism unit 230 itself, there is a technical effect that can provide a possible camera actuator and a camera module including the same, capable of securing sufficient light quantity by solving the size limitation of the lens in the lens assembly of the optical system when implementing OIS.

In addition, according to the embodiment, by controlling the rotation of the prism unit 330 on the first axis or the second axis by the electromagnetic force between the magnet arranged on the prism mover 334 and the coil unit arranged on the housing while implementing the OIS. There is a technical effect that minimizes the occurrence of a decent or tilt phenomenon and produces the best optical characteristics.

In addition, according to the embodiment, there is a technical effect of providing a camera actuator and a camera module including the same, capable of providing the best optical characteristics by minimizing the occurrence of a decent or tilt phenomenon when implementing OIS.

For example, according to the embodiment, a prism driving unit 320 stably disposed on the housing 310 is provided to control the rotation of the prism unit 330 on a first axis or a second axis such that there is a technical effect that can produce the best optical properties by minimizing the occurrence of a decent or tilt phenomenon when implementing OIS.

In addition, according to the embodiment, there is a technical effect of providing a camera actuator and a camera module including the same, capable of implementing OIS with low power consumption.

For example, according to the embodiment, the prism driving unit 320 and the shaft unit 340 are provided to control the rotation of the prism unit 330 on the first axis or the second axis, unlike moving the existing plurality of solid lenses, there is a technical effect of providing a camera actuator and a camera module including the same, capable of implementing OIS with low power consumption.

According to the camera actuator and the camera module including the same according to the embodiment, there is a technical effect that can solve the problem of friction torque generation during zooming.

For example, according to the embodiment, as the lens assembly is driven in a state in which the first guide part and the second guide part, which are precisely numerically controlled in the base, are driven, frictional torque can be reduced to reduce frictional resistance during zooming such that there are technical effects such as improvement of driving force, reduction of power consumption and improvement of control characteristics.

In the related art, when the guide rail is disposed on the base itself, there is a difficulty in dimensional control because a gradient occurs depending on the injection direction.

On the other hand, according to the embodiment, the first guide part and the second guide part are formed separately from the base and assembled without arranging the guide rail on the base itself such that there is a special technical effect that can inhibit the generation of gradients depending on the injection direction.

In addition, the camera actuator and the camera module including the same according to the embodiment have a technical effect of simultaneously increasing the sensitivity of the hall sensor while increasing the thrust.

In addition, according to the embodiment, when implementing OIS, there is a technical effect of providing a camera actuator and a camera module including the same, capable of inhibiting magnetic field interference with a magnet for AF or Zoom.

In addition, according to the embodiment, when a plurality of lens assemblies are driven by electromagnetic force between magnets and coils when implementing AF or Zoom, such that there are technical benefits that can provide a camera actuator and a camera module including the same, capable of inhibiting magnetic field interference between magnets mounted on each lens assembly.

In addition, the embodiment has a technical effect that can provide a camera actuator and a camera module including the same that can inhibit the detachment of the magnet and the yoke.

In addition, according to the embodiment, there is a technical effect that can provide an ultra-slim, ultra-small camera actuator and a camera module including the same.

For example, according to the embodiment, the OIS can be implemented by having the prism driving unit 320 and the rotating unit 340 disposed in the housing 310, thereby eliminating the size limitation of the lens in the lens assembly of the optical system. So there is a technical effect that can provide the ultra-slim, ultra-small camera actuator and the camera module including the same.

For example, according to the embodiment, electromagnetic force is generated between the magnet disposed on the prism mover 334 and the coil unit disposed on the housing 310. By this electromagnetic force, the prism unit 330 may be controlled while being rotated in the first axis or the second axis direction through the first rotation unit 341 and the second rotation unit 342. Accordingly, when implementing OIS, there is a technical effect of minimizing the occurrence of a decent or a tilt phenomenon to obtain the best optical characteristics.

Also, according to the embodiment, the first rotation unit 341 and the second rotation unit 342 can be rotated or tilted in the second axial direction (for example, in the X-axis direction) by the first hinge region HGR1 and the second hinge region HGR2 such that the prism unit 330 may be rotated or tilted in the second axis direction.

For example, the second magnet 322M2 and the third magnet 322M3 respectively disposed in the first rotation unit 341 and the second rotation unit 342 may form an electromagnetic force with the second coil unit 323C2 and the third coil unit 323C3 respectively disposed in the housing 310 such that the prism unit 330 may be tilted or rotated by tilting the first rotation unit 341 and the second rotation unit 342 in the X-axis direction by this electromagnetic force.

Also, according to the embodiment, the rotation guide 334P of the prism unit 330 may be rotatably coupled to the first rotation hole 342R1 of the second rotation unit 342 such that the prism unit 330 may be rotated or tilted in the first axial direction, for example, the Y-axis direction.

For example, the prism mover 334 may include a rotation guide 334P and the second rotation guide 334P2 of the rotation guide 334P may function as a rotation shaft and may be coupled to the first rotation hole 342R1 of the second rotation unit 342 so that the prism unit 330 can be rotated or tilted in the Y-axis direction.

The technical effects of the embodiments are not limited to those described in this item, and include those that can be understood from the entire description of the invention.

MODE FOR INVENTION

Figure 1:
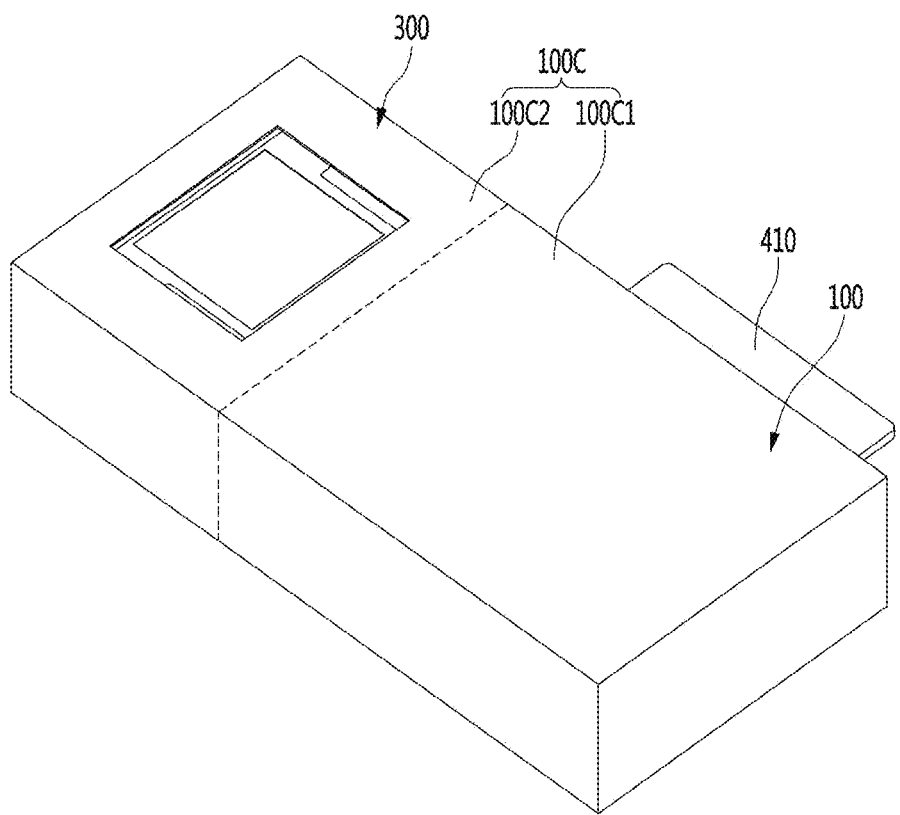
FIG. 1 is a perspective view of a camera module according to an embodiment.

Hereinafter, an embodiment will be described in detail with reference to the accompanying drawings. Since the embodiment may have various changes and may have various forms, specific embodiments will be illustrated in the drawings and described in detail in the text. However, this is not intended to limit the embodiment to a specific disclosed form, and it should be understood to include all changes, equivalents, and substitutes included in the spirit and scope of the embodiment.

Terms such as "first" and "second" may be used to describe various elements, but the elements should not be limited by the terms. These terms are used for the purpose of distinguishing one element from another. In addition, terms specifically defined in consideration of the configuration and operation of the embodiment are only for describing the embodiment, and do not limit the scope of the embodiment.

In the description of the embodiment, in the case where it is described as being formed in "up (top)" or "on or under" of each element, these include both case in which two elements are in direct contact with each other or one or more other elements are disposed between the two elements indirectly. In addition, when expressed as "up (top)" or "on or under", the meaning of not only the upward direction but also the downward direction based on one element may be included.

Also, as used hereinafter, relational terms such as "on/upper/above" and "down/lower/below" etc. do not necessarily require or imply any physical or logical relationship or order between such entities or elements; but may be used to distinguish one entity or element from another entity or element.

(Embodiment)

FIG. 1 is a perspective view of a camera module 1000A according to an embodiment.

Referring to FIG. 1, the camera module 1000A of the embodiment may include a single or a plurality of camera actuators. For example, the camera module 1000A of the embodiment may include a first camera actuator 100 and a second camera actuator 300.

The embodiment may include a case 100C for protecting the first camera actuator 100 and the second camera actuator 300. For example, the case 100C may include a first case 100C1 protecting the first camera actuator 100 and a second case 100C2 protecting the second camera actuator 300. The first case 100C1 and the second case 100C2 may be integrally formed or formed separately from each other.

The first camera actuator 100 may be electrically connected to a first circuit board 410, and the second camera actuator 300 can be electrically connected to a second circuit board 350 (see FIG. 2) to be described later. The first circuit board 410 and the second circuit board may also be electrically connected.

The first camera actuator 100 may support one or a plurality of lenses and may perform an auto-focusing function or a zoom function by moving the lenses up and down in response to a control signal from a predetermined control unit. In addition, the second camera actuator 300 may be an OIS (Optical Image Stabilizer) actuator, but is not limited thereto.

Hereinafter, the OIS actuator as the second camera actuator 300 will be mainly described, and thereafter, the first camera actuator 100 will be described.

<Second Camera Actuator>

Figure 2:
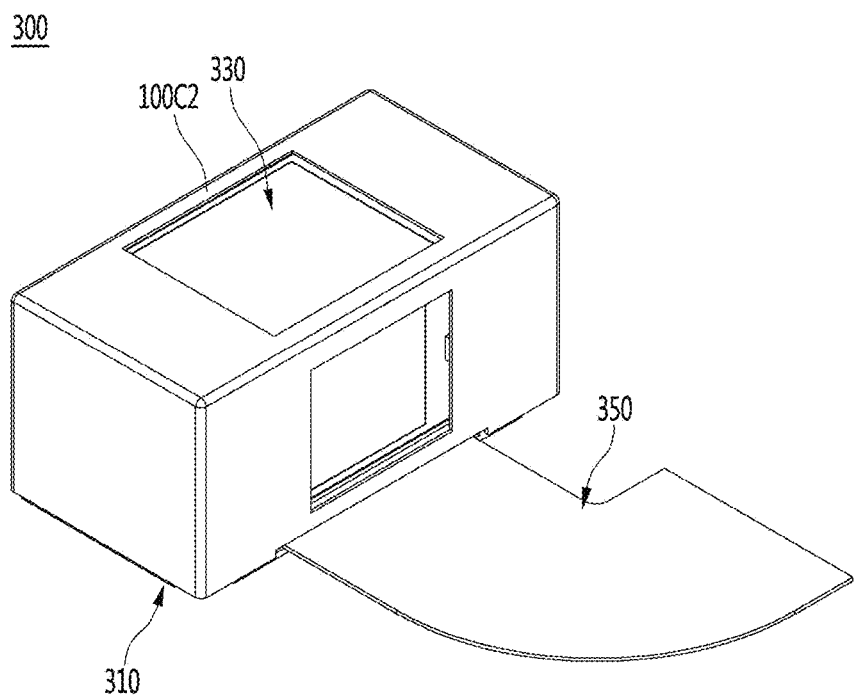
FIG. 2 is a perspective view of a second camera actuator in the camera module according to the embodiment shown in FIG. 1.
Figure 3A:
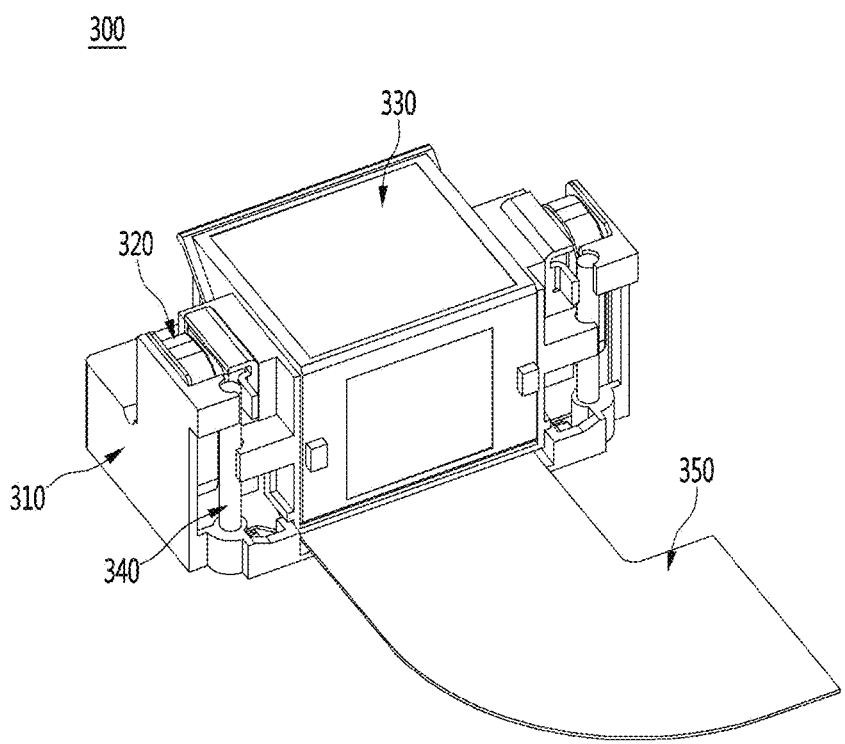
FIG. 3A is a perspective view of the second camera actuator in which a second case is omitted from the second camera actuator shown in FIG. 2.
Figure 3B:
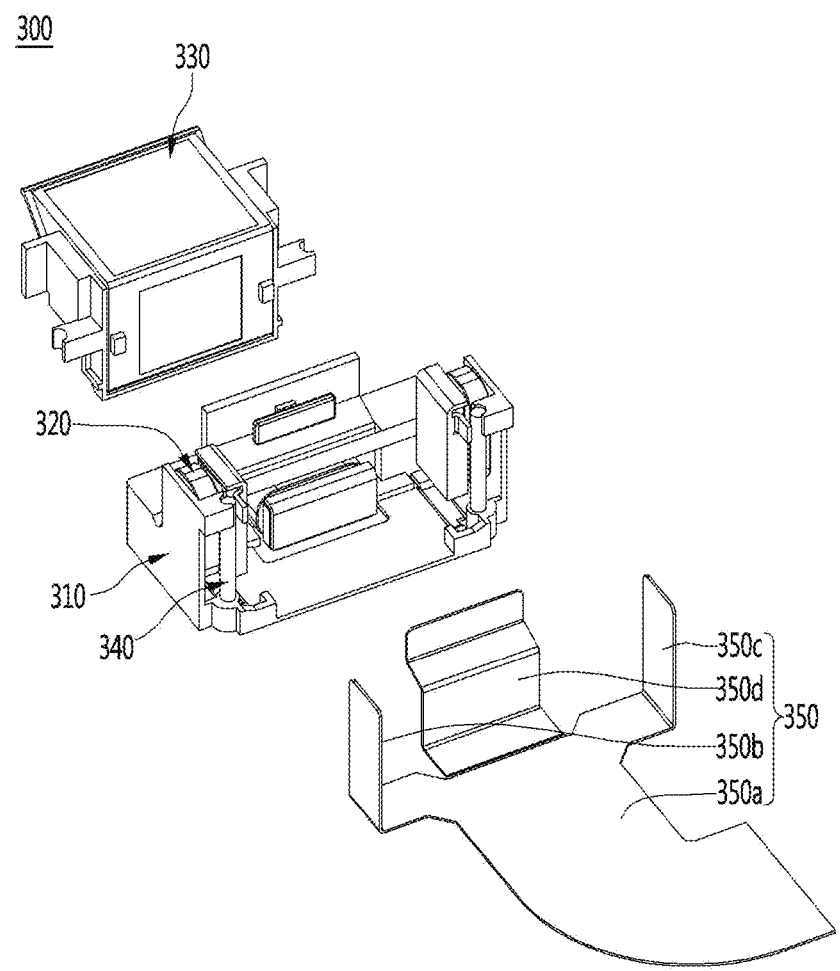
FIG. 3B is an exploded perspective view of the second camera actuator shown in FIG. 3A.

FIG. 2 is a perspective view of a second camera actuator 300 in the camera module 1000A according to the embodiment shown in FIG. 1, and FIG. 3A is a perspective view of second camera actuator 300 shown in FIG. 2 while the second case 100C2 is an omitted, and FIG. 3B is an exploded perspective view of the second camera actuator 300 shown in FIG. 3A.

Referring to FIG. 2, in the second camera actuator 300 of the embodiment, a housing 310, a prism unit 330, and a second circuit board 350 may be disposed in a second case 100C2.

Next, referring to FIGS. 3A and 3B, the second camera actuator 300 of the embodiment may include a housing 310, a prism driving unit 320 disposed in the housing 310, a prism unit 330, and a shaft unit 340 and a second circuit board 350 electrically connected to the prism driver 320.

The second circuit board 350 may be a circuit board having a wiring pattern that can be electrically connected, such as a rigid printed circuit board (Rigid PCB), a flexible printed circuit board (Flexible PCB), and a rigid flexible printed circuit board (Rigid Flexible PCB). may include Referring to FIG. 3B, the second circuit board 350 may include a second body substrate 350*a*, a second-first extended substrate 350*b*, a second-second extended substrate 350*c* and a second-third extended substrate 350*d* which are extending in a vertical direction from the second body substrate 350*a*.

Figure 8:
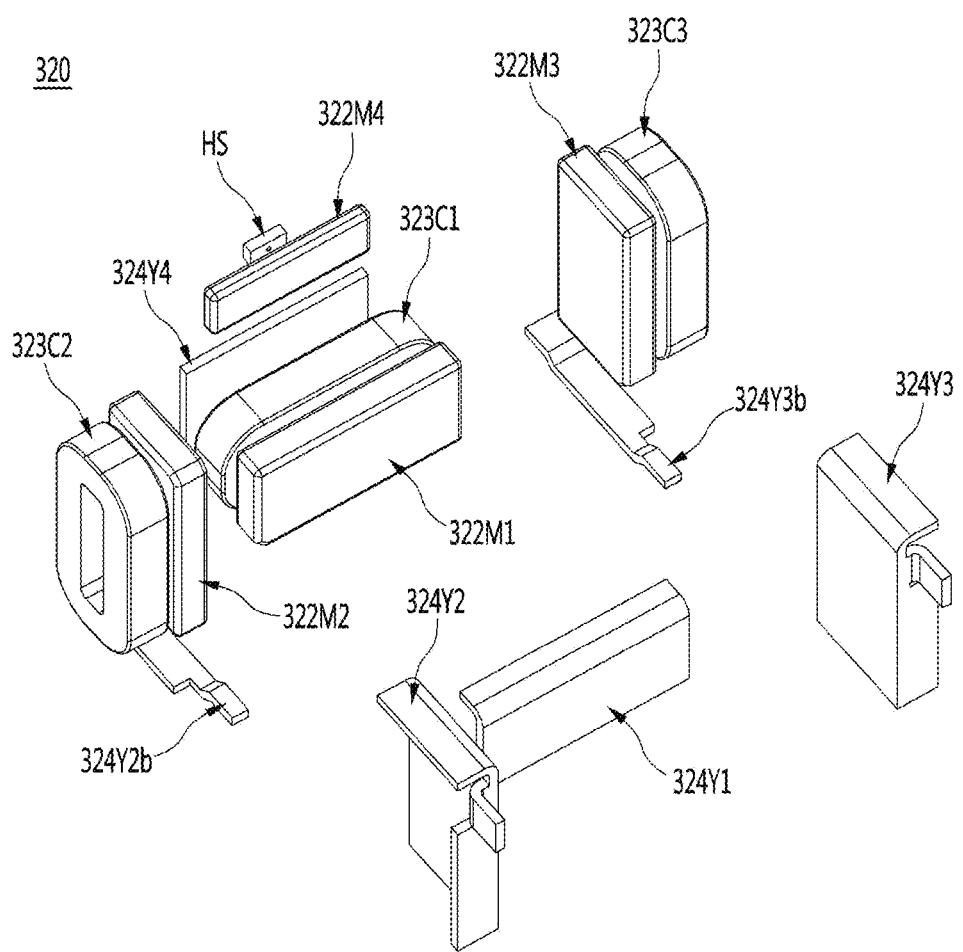
FIG. 8 is an exploded perspective view of a prism driving unit in the second camera actuator shown in FIG. 6B.

The second-first extended substrate 350*b*, the second-second extended substrate 350*c*, and the second-third extended substrate 350*d* may respectively apply power each of a first coil unit 323C1, a second coil unit 323C2 and a third coil unit 323C3 (see FIG. 8 for each coil unit).

According to the embodiment, the OIS can be implemented by having the prism driving unit 320 and the shaft unit 340 disposed in the housing 310, there is a technical effect that can provide an ultra-slim, ultra-small camera actuator and a camera module including the same can eliminate the size limitation of the lens in the lens assembly of the optical system.

In addition, according to the embodiment, the prism unit 330 including the prism driving unit 320 and the shaft unit 340 stably disposed on the housing 310 may be rotationally controlled by the first axis or the second axis. Accordingly, when implementing OIS, there is a technical effect of minimizing the occurrence of a decent or a tilt phenomenon to obtain the best optical characteristics.

In addition, according to the embodiment, unlike moving the plurality of solid lenses, the OIS can be implemented by providing the prism driving unit 320 and the shaft unit 340 to control the rotation of the prism unit 330 on the first axis or the second axis such that there is a technical effect that enables OIS implementation with low power consumption.

<Second Camera Actuator 300>

The second camera actuator 300 of the embodiment will be described in detail with reference to the drawings below.

Figure 4A:
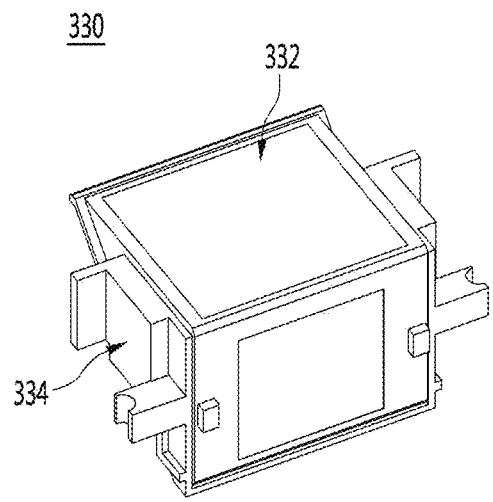
FIG. 4A is a perspective view of the prism unit in the second camera actuator shown in FIG. 3B.
Figure 4B:
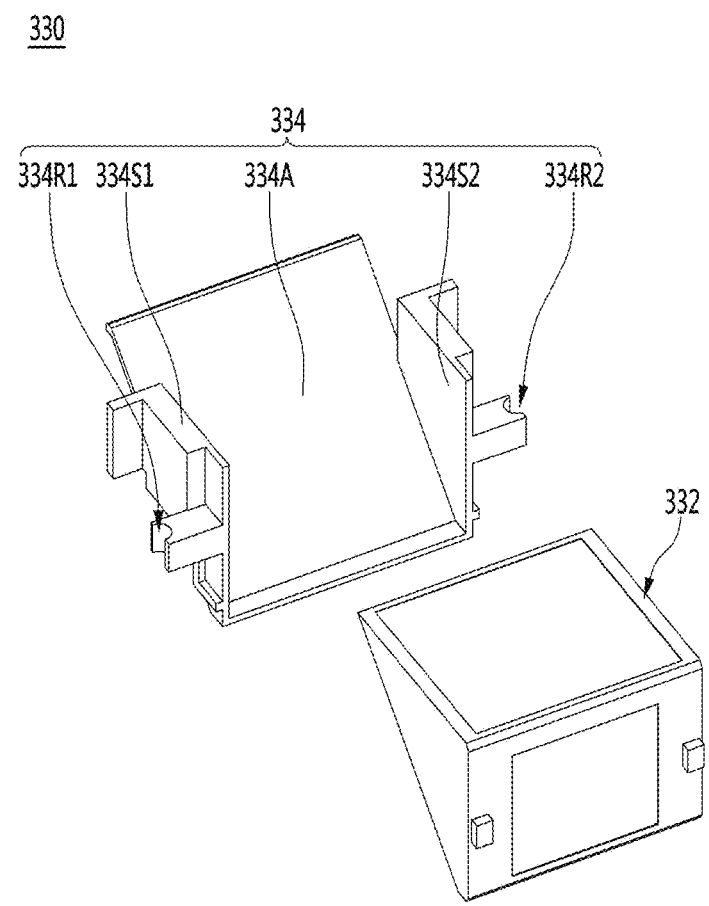
FIG. 4B is an exploded perspective view in a first direction of the prism unit shown in FIG. 4A.

FIG. 4A is a perspective view of the prism unit 330 in the second camera actuator 300 shown in FIG. 3B, and FIG. 4B is a first direction, for example, a front directional exploded perspective view of the prism unit 330 shown in FIG. 4A.

Referring to FIG. 4B, in the second camera actuator of the embodiment, the prism unit 330 may include a prism mover 334 including a seating portion 334A and a prism 332 disposed on the seating portion 334A of the prism mover 334. The prism 332 may be a reflective part, and may be a right-angle prism, but is not limited thereto.

The prism mover 334 may include a plurality of outer surfaces. For example, the prism mover 334 may include a first outer surface 334S1 and a second outer surface 334S2 extending upward from both edges of the seating portion 334A having an inclined surface.

In addition, the first outer surface 334S1 of the prism mover 334 may have a first recess 334R1, and the second outer surface 334S2 may have a second recess 334R2.

Figure 7A:
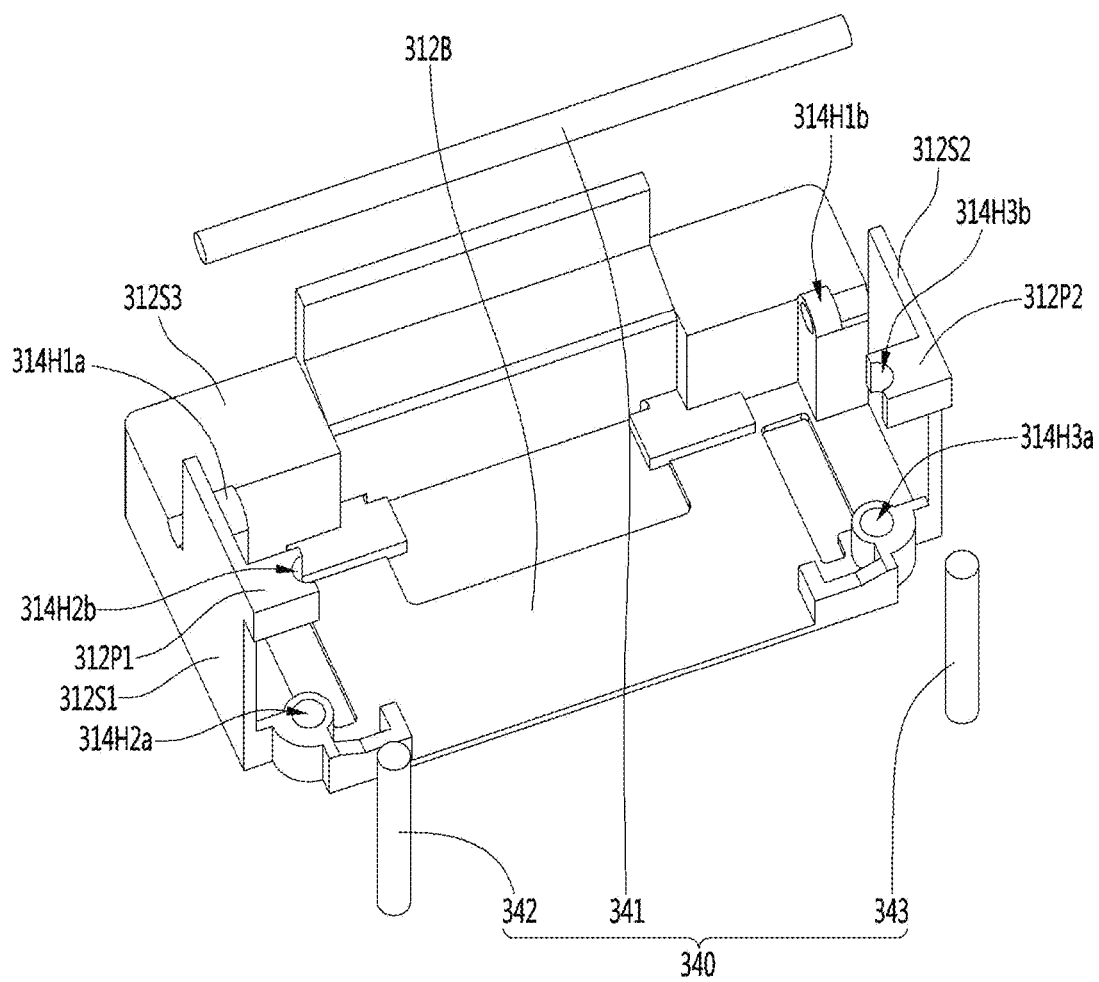
FIG. 7A is an exploded perspective view of a housing and a shaft unit in the second camera actuator shown in FIG. 6B.

A second shaft 342 and a third shaft 343 of the shaft unit 340 may be respectively disposed in the first recess 334R1 and the second recess 334R2 (see FIG. 7A for each shaft).

According to the embodiment, the prism driving unit 320 and the shaft unit 340 disposed in the housing 310 are provided to rotate the prism unit 330 in uniaxial or biaxial directions to implement OIS, so that in the lens assembly of the optical system, there is a technical effect that can provide an ultra-slim, ultra-small camera actuator and a camera module including the same by solving the size limitation.

Figure 5A:
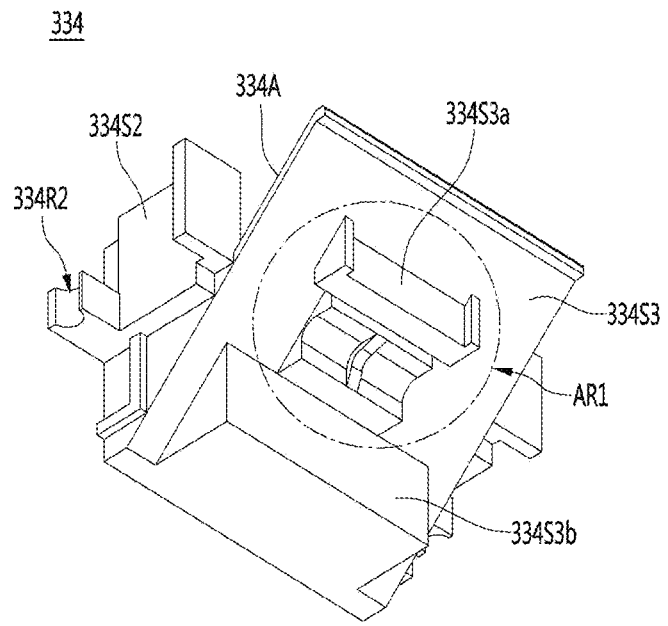
FIG. 5A is a perspective view in a second direction of a prism mover in the prism unit shown in FIG. 4B.
Figure 5B:
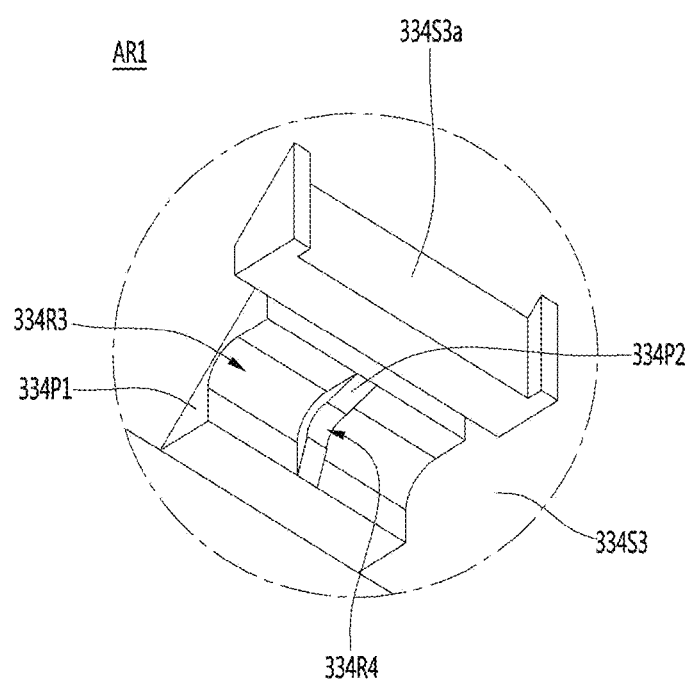
FIG. 5B is an enlarged view of the rotation guide area of the prism mover shown in FIG. 5A.

Next, FIG. 5A is a second direction perspective view of the prism mover 334 in the prism unit shown in FIG. 4B, and FIG. 5B is an enlarged view of the rotation guide area AR1 of the prism mover 334 shown in FIG. SA.

FIG. 5A, the prism mover 334 may include a third outer surface 334S3 between the first outer surface 334S1 and the second outer surface 334S2, and a rotation guide area AR1 may be disposed in the third outer surface 334S3.

In addition, the third outer surface 334S3 may include a third-first seating portion 334S3*a* and a third-second seating portion 334S3*b*. A fourth magnet 322M4 and a first magnet 322M1 may be respectively disposed in the third-first seating portion 334S3*a* and the third-second seating portion 334S3*b* (see FIG. 8 for each magnet).

According to the embodiment, by controlling the rotation of the prism unit 330 on the first axis or the second axis by electromagnetic force between the magnet arranged on the prism mover 334 and the coil unit arranged on the housing, there is a technical effect that can produce the best optical properties by minimizing the occurrence of the decent or tilt phenomenon while the OIS is implemented.

Next, referring to FIG. 5B, the rotation guide area AR1 may include a first guide protrusion 334P1 protruding from the third outer surface 334S3 and a second guide protrusion 334P2 protruding from the first guide protrusion 334P1.

The first guide protrusion 334P1 may include a third guide recess 334R3, and the second guide protrusion 334P2 may include a fourth guide recess 334R4.

According to the embodiment, the first shaft 341 (refer to FIG. 7A) of the shaft unit 340 can be disposed in the fourth guide recess 334R4 on the second guide protrusion 334P2 and can rotate or tilt in the first axis or second axis direction.

Figure 9A:
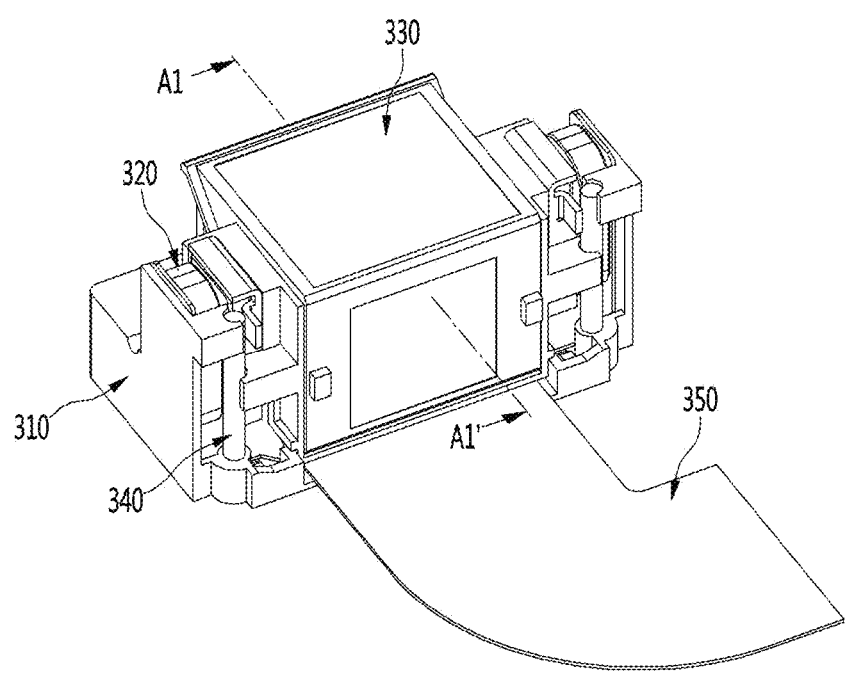
FIG. 9A is a perspective view of the second camera actuator shown in FIG. 1.
Figure 9B:
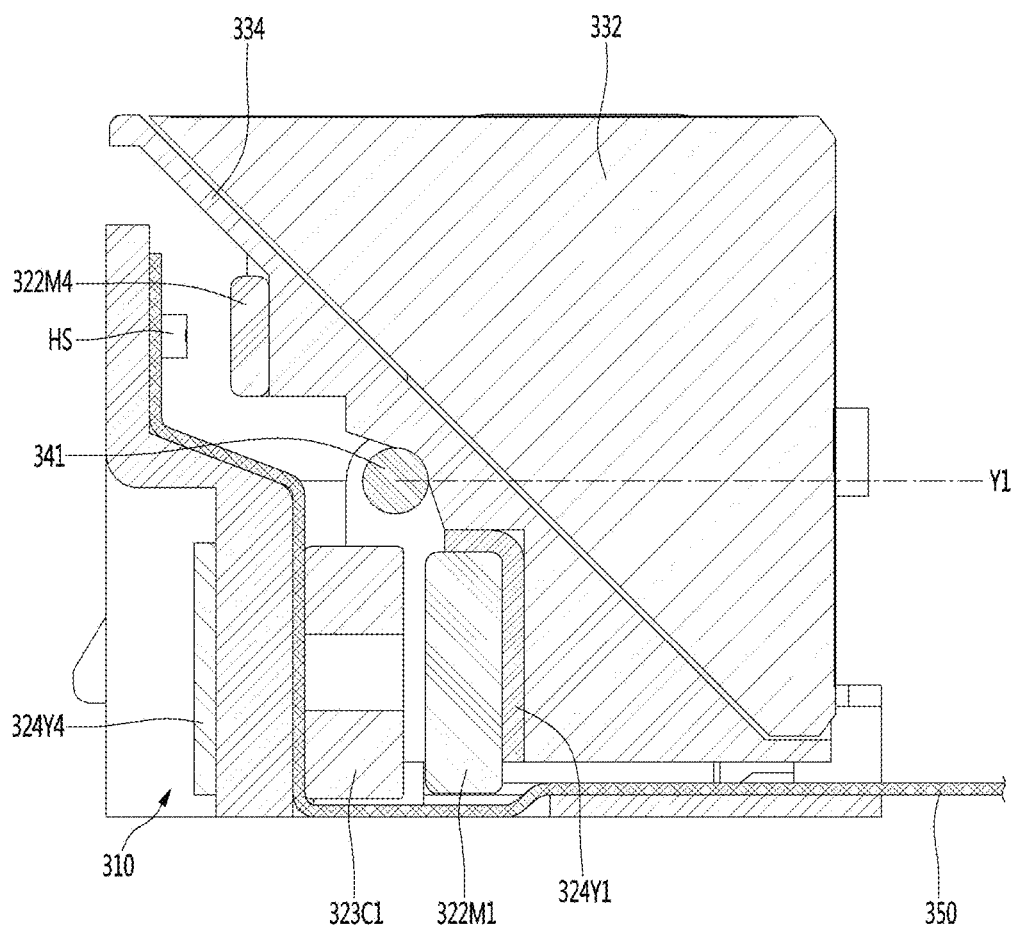
FIG. 9B is a first cross-sectional view of the second camera actuator shown in FIG. 9A.
Figure 9C:
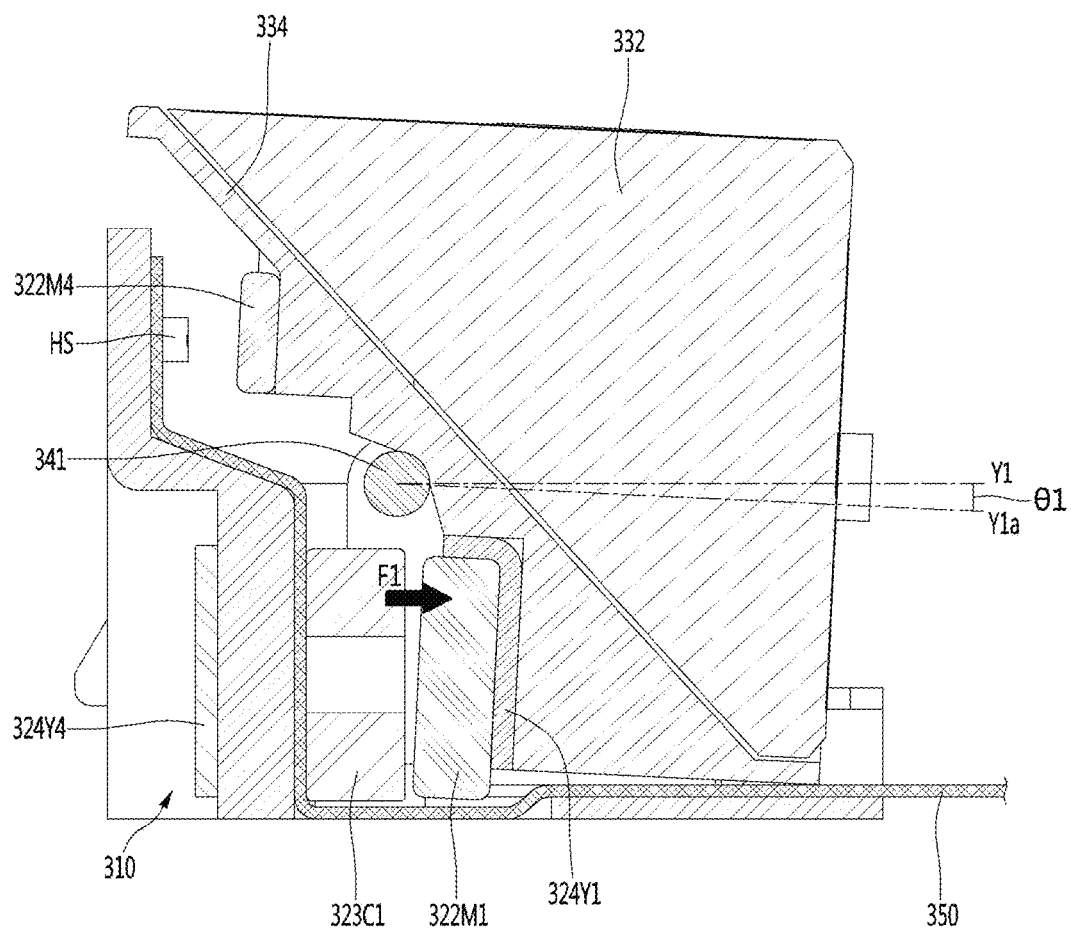
FIG. 9C is an exemplary view of rotation of the second camera actuator shown in FIG. 9B.

For example, by disposing the first shaft 341 on the fourth guide recess 334R4 on the second guide protrusion 334P2 that protrudes more than the first guide protrusion 334P1, rotation in the Y-axis direction or tilt control may be possible (see FIGS. 9A to 9C).

At this time, when the prism unit 330 can be rotated or tilted in the Y-axis direction, the second shaft 342 and the third shaft 343 may function as a stopper.

Also, the first shaft 341 may be disposed in the fourth guide recess 334R4 of the second guide protrusion 334P2 that protrudes more than the first guide protrusion 334P1. Accordingly, a spacing to be rotated or tilted in the X-axis direction can be secured, so that rotation or tilting control in the X-axis direction may be possible (refer to FIGS. 10A to 10C).

At this time, when the prism unit 330 is rotated or tilted in the X-axis direction, the first shaft 341 may function as a stopper by the third guide recess 334R3.

Figure 6A:
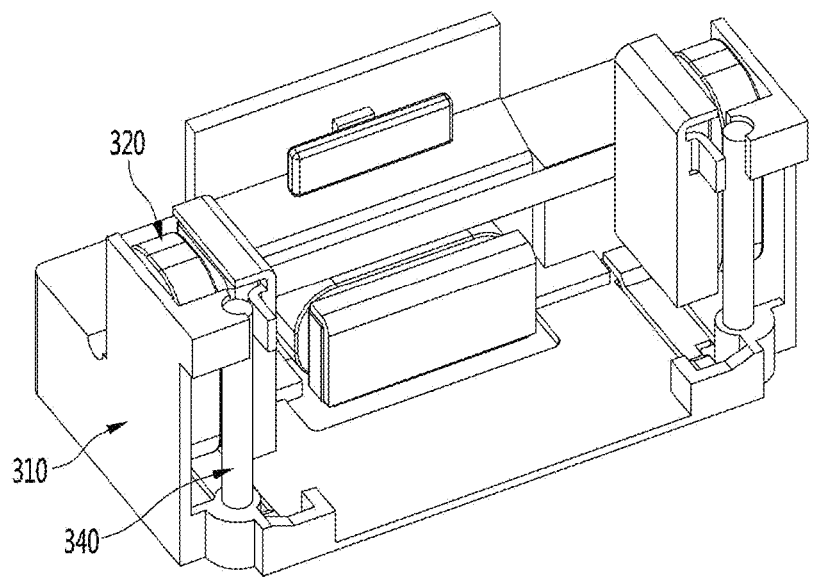
FIG. 6A is a perspective view in which a prism unit and a second circuit board are omitted in the second camera actuator shown in FIG. 3B.
Figure 6B:
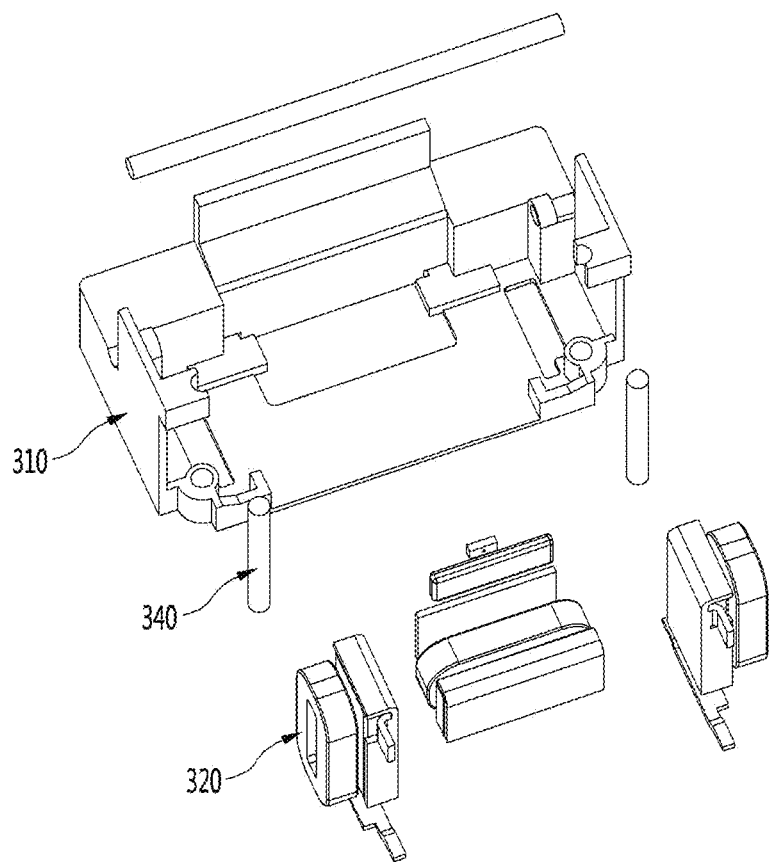
FIG. 6B is an exploded perspective view of the second camera actuator shown in FIG. 6A.

Next, FIG. 6A is a perspective view in which the prism unit 330 and the second circuit board 350 are omitted from the second camera actuator shown in FIG. 3B, and FIG. 6B is an exploded perspective view of the second camera actuator shown in FIG. 6A.

Referring to FIGS. 6A and 6B, the second camera actuator 300 may include a housing 310, and a prism driving unit 320, a shaft unit 340 disposed in the housing 310.

According to the embodiment, the lens of the optical system can be provided with the prism driving unit 320 and the shaft unit 340 disposed in the housing 310 to implement OIS by rotating the prism unit 330 in the first axis and second axis directions. There is a technical effect that can provide an ultra-slim, ultra-small camera actuator and a camera module including the same by eliminating the size limitation of the lens in the assembly.

Figure 7B:
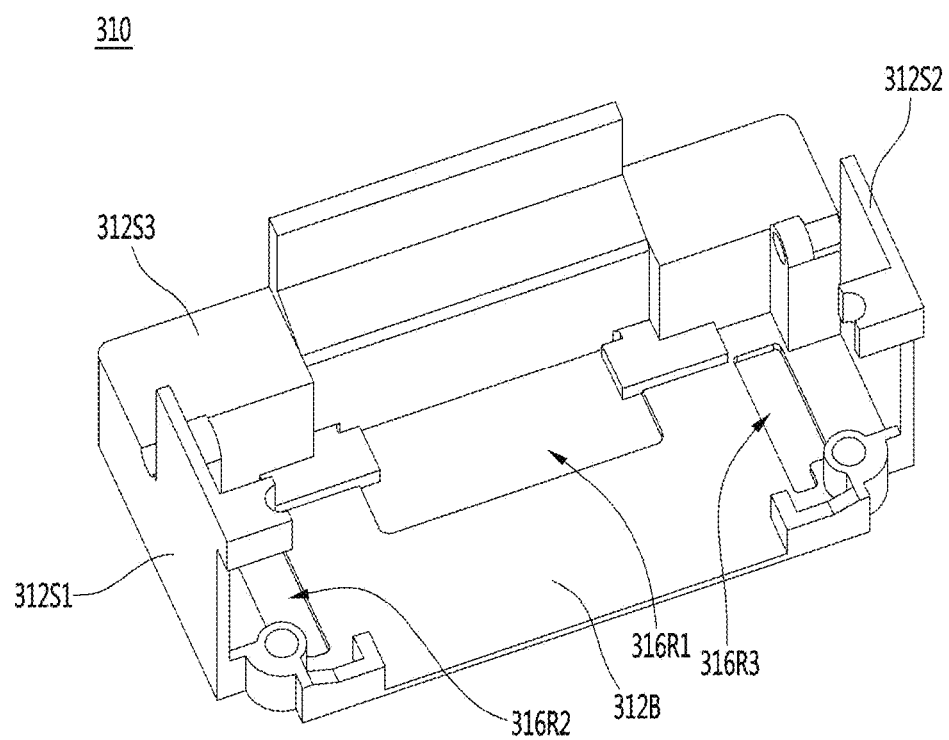
FIG. 7B is a detailed view of the housing shown in FIG. 7A.

Next, FIG. 7A is an exploded perspective view of the housing 310 and the shaft unit 340 in the second camera actuator shown in FIG. 6B, and FIG. 7B is a detailed view of the housing 310 shown in FIG. 7A.

Referring to FIG. 7A, the shaft unit 340 may include a first shaft 341, a second shaft 342, and a third shaft 343.

The first shaft 341 can be disposed in the fourth guide recess 334R4 (refer to FIG. 5B) on the second guide protrusion 334P2 of the prism mover 334 to rotate or tilt the first axis or the second axis direction.

In addition, the second shaft 342 and the third shaft 343 may be respectively disposed in a first recess 334R1 of the first outer surface 334S1 of the prism mover 334 and a second recess 334R2 of the second outer surface 334S2 of the prism mover 334 (see FIG. 4B).

According to the embodiment, the prism driving unit 320 and the shaft unit 340 disposed in the housing 310 are provided to rotate the prism unit 330 in uniaxial or biaxial directions to implement OIS, so that in the lens assembly of the optical system, there is a technical effect that can provide an ultra-slim, ultra-small camera actuator and a camera module including the same by solving the size limitation.

With continued reference to FIG. 7A, the housing 310 of the embodiment may include a housing body 312B, single or multiple housing side portions 312S1, 312S2, 312S3, and a housing upper portion 312T.

For example, the housing 310 may include a first housing side portion 312S1, a second housing side portion 312S2, and a third housing side portion 312S3 extending in one direction from the housing body 312B.

The housing body 312B may include a second-first guide groove 314H2a into which the lower portion of the second shaft 342 can be inserted and a third-first guide groove 314H3a into which the lower portion of the third shaft 343 can be inserted.

In this case, the first housing side portion 312S1 may include a first protrusion 312P1 and a second-second recess 314H2b disposed in the first protrusion 312P1. The second-second recess 314H2b may be formed at an upper position of the second-first guide groove 314H2a of the housing body 312B. An upper portion of the second shaft 342 may be disposed in the second-second recess 314H2b.

In addition, the second housing side portion 312S2 may include a second protrusion 312P2 and a third-second recess 314H3b disposed in the second protrusion 312P2. The third-second recess 314H3b may be formed at an upper position of the third-first guide groove 314H3a of the housing body 312B. An upper portion of the third shaft 343 may be disposed in the third-second recess 314H3b.

The second shaft 342 and the third shaft 343 may function as rotation axis when the prism unit 330 rotates or tilts in the X-axis direction. And when the prism unit 330 rotates or tilts in the X-axis direction, the first shaft 341 may function as a stopper.

Next, referring to FIG. 7A, the third housing side portion 312S3 has a first-first guide hole 314H1a and a first-second guide hole 314H1b into which the first shaft 341 can be inserted. The third housing side portion 312S3 may further include a first-first guide recess and a first-second guide recess outside the first-first guide hole 314H1a and the first-second guide hole 314H1b.

According to the embodiment, both sides of the first shaft 341 are inserted into the first-first guide hole 314H1a and the first-second guide hole 314H1b of the third housing side portion 312S3, and the first shaft 341 can be disposed in the fourth guide recess 334R4 on the second guide protrusion 334P2 of the prism mover 334, so that rotation or tilting control in the Y-axis direction can be possible (see FIGS. 9A to 9C). At this time, when the prism unit 330 is rotated or tilted in the Y-axis direction, the second shaft 342 and the third shaft 343 may function as a stopper.

According to the embodiment, the prism driving unit 320 and the shaft unit 340 disposed in the housing 310 are provided to rotate the prism unit 330 in uniaxial or biaxial directions to implement OIS, so that in the lens assembly of the optical system, there is a technical effect that can provide an ultra-slim, ultra-small camera actuator and a camera module including the same by solving the size limitation.

Next, referring to FIG. 7B, the housing body 312B may include a first opening 316R1, a second opening 316R2, and a third opening 316R3. A first coil unit 323C1 can be provided in the first opening 316R1, a second coil unit 323C2 can be provided in the second opening 316R2, and a third coil unit 323C3 can be provided in the third opening 316R3, respectively (see FIG. 8 for each coil unit). The first opening 316R1, the second opening 316R2, and the third opening 316R3 may each be in the form of a through hole in which the housing body 312B is partially removed, but is not limited thereto, and may also be in the form of a recessed region in which only a surface portion of the housing body 312B is removed.

According to the embodiment, by controlling the rotation of the prism unit 330 on the first axis or the second axis by the electromagnetic force between the magnet arranged on the prism mover 334 and the coil unit arranged on the housing, there is a technical effect that can produce the best optical properties by minimizing the occurrence of decent or tilt phenomena.

Next, FIG. 8 is an exploded perspective view of the prism driving unit 320 in the second camera actuator shown in FIG. 6B.

Referring to FIG. 8, the prism driving unit 320 functions as an OIS driving unit, and may include a first coil unit 323C1, a second coil unit 323C2, a third coil unit 323C3, a first magnet 322M1, a second magnet 322M2, a third magnet 322M3, a fourth magnet 322M4, and a position sensor HS. The position sensor HS may include a Hall sensor. In addition, the prism driving unit 320 may include a back yoke.

For example, the prism driving part 320 may include a first coil part 323C1 disposed in the first opening 316R1 of the housing body 312B, and a second coil unit 323C2 disposed in the second opening 316R2 of the housing body 312B and a third coil unit 323C3 disposed in the third opening 316R3 of the housing body 312B.

In addition, the prism driving unit 320 includes a first magnet 322M1 disposed at a position corresponding to the first coil unit 323C1, and a second magnet 322M2 disposed at a position corresponding to the second coil unit 323C2, a third magnet 322M3 disposed at a position corresponding to the third coil unit 323C3.

Also, the prism driver 320 may include a fourth magnet 322M4 at a position corresponding to the position sensor HS.

The first magnet 322M1 may be disposed on the third-second seating portion 334S3b of the third outer surface 334S3 of the prism mover, and the fourth magnet 322M4 may be disposed on the third-first seat portion 334S3a of the third outer surface 334S3 of the prism mover (see FIG. 5A).

In the embodiment, the first to third magnets 322M1, 322M2, and 322M3 function as a driving unit to form a driving force by electromagnetic force, and the fourth magnet 322M4 can sense a position with the position sensor HS.

For example, the first magnet 322M1 may form an electromagnetic force with the first coil unit 323C1 to tilt or rotate the prism unit 330 in the Y-axis direction (see FIGS. 9A to 9C).

Figure 10A:
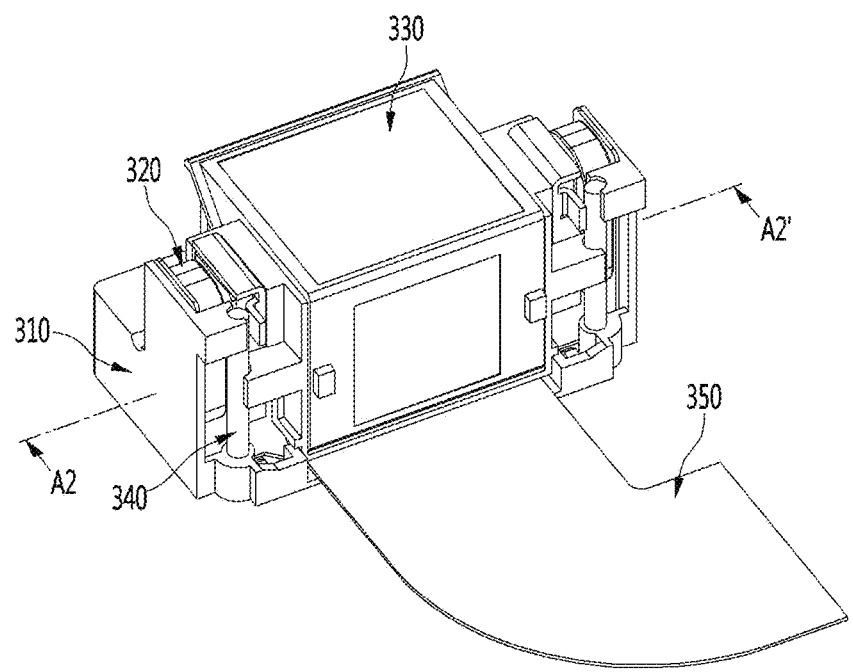
FIG. 10A is a perspective view of the second camera actuator shown in FIG. 1.
Figure 10B:
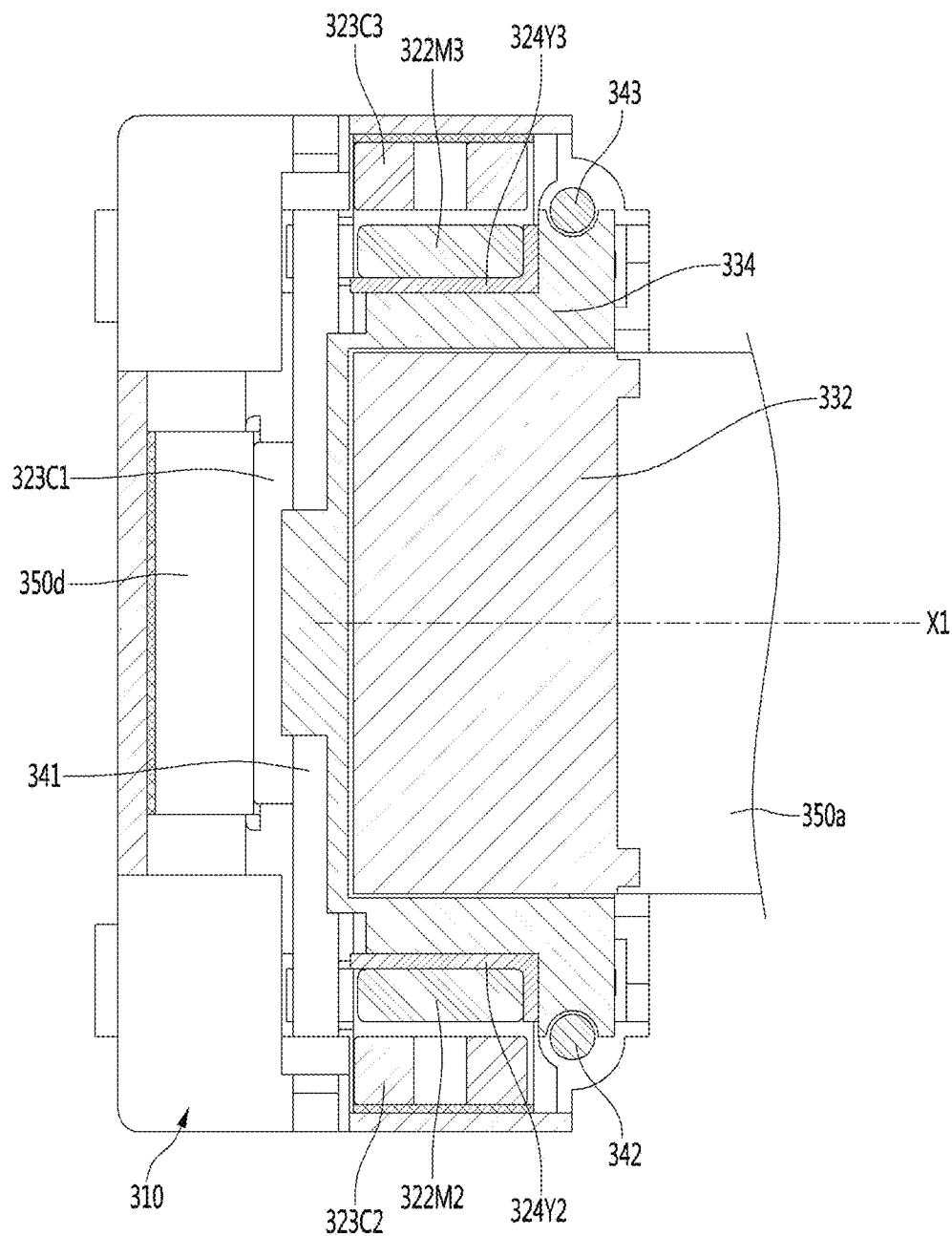
FIG. 10B is a second cross-sectional view of the second camera actuator shown in FIG. 10A.
Figure 10C:
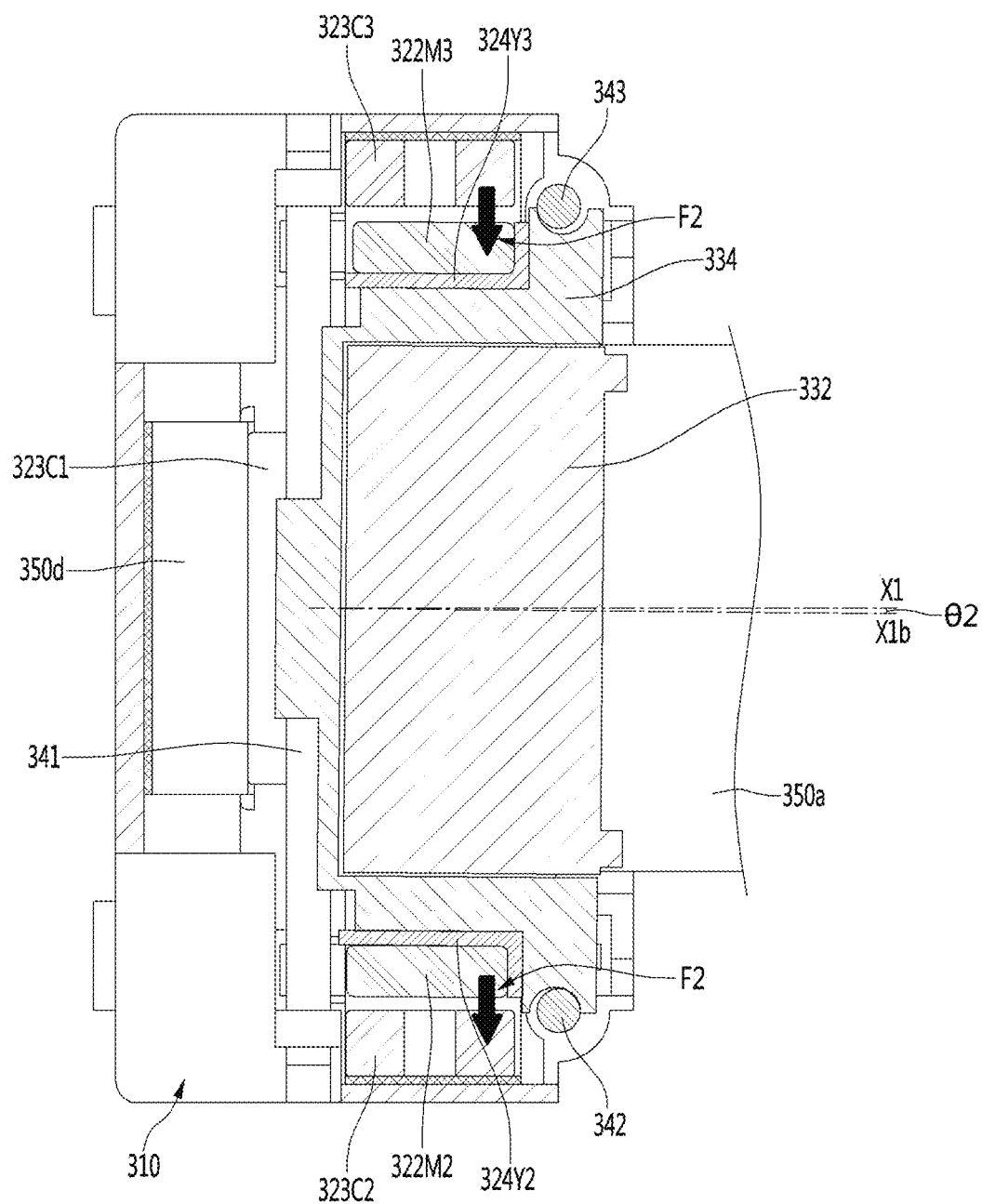
FIG. 10C is an exemplary view of rotation of the second camera actuator shown in FIG. 10B.

In addition, the second magnet 322M2 and the third magnet 322M3 form an electromagnetic force with the second coil part 323C2 and the third coil part 323C3, respectively, and the prism unit 330 can be tilted or rotated in the X-axis direction (see FIGS. 10A to 10C).

In addition, the prism driving unit 320 may include a first back yoke 324Y1 disposed on the rear surface of the first magnet 322M1 and a second back yoke 324Y2 disposed on the rear surface of the second magnet 322M2, and a third back yoke 324Y3 disposed on the rear surface of the third magnet 322M3. In addition, the embodiment may include a fourth back yoke 324Y4 disposed on the rear surface of the fourth magnet 322M4.

In addition, the prism driving unit 320 may include a second-second back yoke 324Y2b under the second back yoke 324Y2 and a third-second back yoke 324Y3b below the third back yoke 324Y3.

According to the embodiment, by controlling the rotation of the prism unit 330 on the first axis or the second axis by the electromagnetic force between the magnet and the coil unit, the occurrence of a decent or tilt phenomenon can be minimized when OIS is implemented, so that there is a technical effect that can produce the best optical properties.

In addition, according to the embodiment, the OIS can be implemented by having the prism driving unit 320 and the shaft unit 340 disposed in the housing 310, there is a technical effect that can provide an ultra-slim, ultra-small camera actuator and the camera module including the same, capable of eliminating the size limitation of the lens in the lens assembly of the optical system.

In addition, according to the embodiment, there is a technical effect of accurately measuring and controlling the position when tilting in the first and second axial directions only through the arrangement of one position sensor (HS) at the position corresponding to the fourth magnet 322M4.

Next, FIG. 9A is a perspective view of the second camera actuator 300 shown in FIG. 1, FIG. 9B is a first cross-sectional view of the second camera actuator 300 shown in FIG. 9A, and FIG. 9C is an exemplary view of the rotation of the second camera actuator 300 shown in FIG. 9B.

For example, FIG. 9B is a first cross-sectional view taken along the line A1-A1' of the second camera actuator 300 shown in FIG. 9A and perpendicular to the longitudinal direction of the first shaft 341.

For example, FIG. 9B is a cross-sectional view in a direction perpendicular to the X-axis when the longitudinal direction of the first shaft 341 is referred to as the X-axis.

Referring to FIG. 9B, while the prism mover 334 can be rotated in a first axis perpendicular to the X axis, for example, the Y axis direction, OIS may be implemented.

For example, the first magnet 322M1 disposed on the prism mover 334 forms an electromagnetic force with the first coil part 323C1 disposed on the housing 310 to tilt or rotate the prism unit 330 in the Y-axis direction.

Specifically, referring to FIG. 5A, the first magnet 322M1 may be disposed on the third-second seating portion 334S3b of the third outer surface 334S3 of the prism mover 334, and the fourth magnet 322M4 may be disposed on the third-first seating portion 334S3a of the third outer surface 334S3 of the prism mover.

Also, referring to FIG. 5B, in the embodiment, the first shaft 341 can be disposed in the fourth guide recess 334R4 of the second guide protrusion 334P2 that protrudes more than the first guide protrusion 334P1, so that the Y-axis Rotation or tilt control in a direction can be possible. At this time, when the prism unit 330 is rotated or tilted in the Y-axis direction, the second shaft 342 and the third shaft 343 may function as a stopper.

Next, referring to FIG. 9C, in the embodiment, in a state in which the first shaft 341 is disposed in the fourth guide recess 334R4 of the second guide protrusion 334P2 of the prism mover 334, a first electromagnetic force F1 may be generated between the first magnet 322M1 disposed in 334 and the first coil unit 323C disposed in the housing and OIS may be implemented by rotating the prism unit 330 (Y1→Y1a) at a first angle Θ1 in the Y-axis direction by this first magnetic force. The first angle Θ1 may be ±1° to 1.5°, that is, 2° to 3°.

At this time, when the prism unit 330 is rotated or tilted in the Y-axis direction, the second shaft 342 and the third shaft 343 may function as a stopper.

For example, referring to FIG. 4B, the diameter of the first recess 334R1 and the second recess 334R2 of the prism mover 334 is greater than the diameter of the second shaft 342 and the third shaft 343, respectively. This structure can provide a spacing for the prism unit 330 to rotate in the Y-axis direction, and the second shaft 342 and the third shaft 343 can function as a stopper when rotating in the Y-axis direction.

Next, FIG. 10A is a perspective view of the second camera actuator 300 shown in FIG. 1, FIG. 10B is a second cross-sectional view of the second camera actuator 300 shown in FIG. 10A, and FIG. 10C is an exemplary view of the rotation of the second camera actuator 300 shown in FIG. 10B. It is.

For example, when the longitudinal direction of the first shaft 341 is referred to as the X-axis, FIG. 10B is a cross-sectional view in a direction horizontal to the X-axis. Also, FIG. 10B is a cross-sectional view in a direction perpendicular to the second shaft 342 and the third shaft 343.

Referring to FIG. 10B, when the longitudinal directions of the second shaft 342 and the third shaft 343 are referred to as the Y-axis, the prism mover 334 can be rotated in a second axis direction perpendicular to the Y-axis, for example, in the X-axis direction and OIS implementation may be possible.

For example, the second magnet 322M2 and the third magnet 322M3 disposed on the prism mover 334 can respectively interact to form electromagnetic forces with the second coil part 323C2 and the third coil part 323C3 disposed on the housing 310 such that the prism unit 330 may be tilted or rotated in the X-axis direction by this electromagnetic force.

The second shaft 342 and the third shaft 343 may function as rotation axis when the prism unit 330 rotates or tilts in the X-axis direction, and when the prism unit 330 is rotated or tilted in the X-axis direction, the first shaft 341 may function as a stopper.

Specifically, referring to FIG. 10C, the second shaft 342 and the third shaft 343 may function as rotation axes in the X-axis direction of the prism unit 330. In this case, a second electromagnetic force F2 may occur between the second magnet 322M2, the third magnet 322M3 disposed on the prism mover 334 and the second coil part 323C2, the third coil part 323C3 disposed on the housing respectively. So, OIS can be implemented as the prism unit 330 rotates (Z1→Z1b) at a second angle Θ2 in the X-axis direction by the second electromagnetic force. The second angle Θ2 may be ±1° to 1.5°, that is, 2° to 3°.

At this time, when the prism unit 330 is rotated or tilted in the X-axis direction, the first shaft 341 may function as a stopper by the third guide recess 334R3.

For example, referring to FIG. 5B, the first shaft 341 can be disposed in the fourth guide recess 334R4 of the second guide protrusion 334P2 that protrudes more than the first guide protrusion 334P1 of the prism mover 334. Accordingly, by securing a gap to be rotated or tilted in the X-axis direction, rotation or tilting control in the X-axis direction may be possible.

According to the embodiment, there is a technical effect that can provide an ultra-slim, ultra-small camera actuator and a camera module including the same.

For example, according to the embodiment, as the OIS can be implemented by having the prism driving unit 320 and the shaft unit 340 disposed in the housing 310, there is a technical effect that can provide a ultra-slim, ultra-small camera actuator a camera module including the same, capable of eliminating the size limitation of the lens in the lens assembly of the optical system.

In addition, according to the embodiment, there is a technical effect that can provide a camera actuator and a camera module including the same, capable of securing a sufficient amount of light by solving the size limitation of the lens in the lens assembly of the optical system when OIS is implemented.

For example, according to the embodiment, by implementing OIS through rotation in the first and second axis directions of the prism unit 230 itself, there is a technical effect that can provide a possible camera actuator and a camera module including the same, which are possible to secure sufficient light quantity by solving the size limitation of the lens in the lens assembly of the optical system when implementing OIS.

In addition, according to the embodiment, by controlling the rotation of the prism unit 330 on the first axis or the second axis by the electromagnetic force between the magnet arranged on the prism mover 334 and the coil unit arranged on the housing while OIS is implemented, there is a technical effect that minimizes the occurrence of a decent or tilt phenomenon to produce the best optical characteristics.

In addition, according to the embodiment, there is a technical effect of providing a camera actuator and a camera module including the same, capable of providing the best optical characteristics by minimizing the occurrence of a decent or tilt phenomenon when implementing OIS.

For example, according to the embodiment, the prism unit 330 may be controlled to rotate along the first axis or the second axis by providing the prism driving unit 320 stably disposed on the housing 310. Accordingly, when implementing OIS, there is a technical effect of minimizing the occurrence of a decent or a tilt phenomenon to obtain the best optical characteristics.

In addition, according to the embodiment, there is a technical effect of providing a camera actuator and a camera module including the same, capable of implementing OIS with low power consumption.

For example, according to the embodiment, the prism driving unit 320 and the shaft unit 340 are provided to control the rotation of the prism unit 330 on the first axis or the second axis, unlike moving the plurality of solid lenses. there is a technical effect of providing a camera actuator and a camera module including the same, capable of implementing OIS with low power consumption.

<First Camera Actuator 100>

Hereinafter, the first camera actuator 100 will be described.

Figure 11:
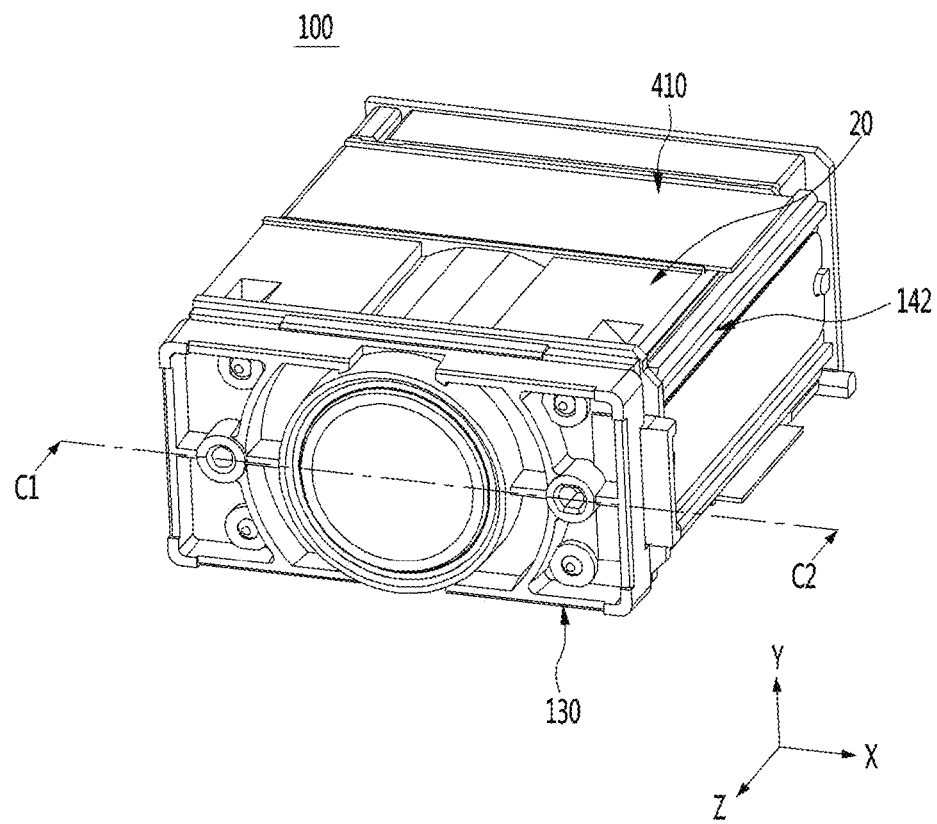
FIG. 11 is a perspective view of a first camera actuator according to an embodiment.
Figure 12:
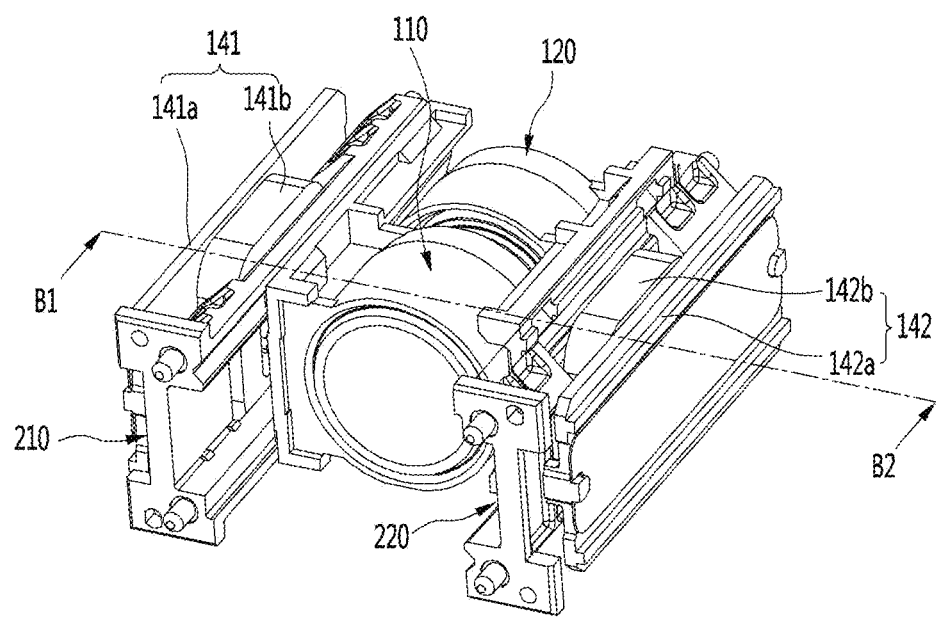
FIG. 12 is a perspective view in which some elements are omitted from the camera actuator according to the embodiment shown in FIG. 11.
Figure 13:
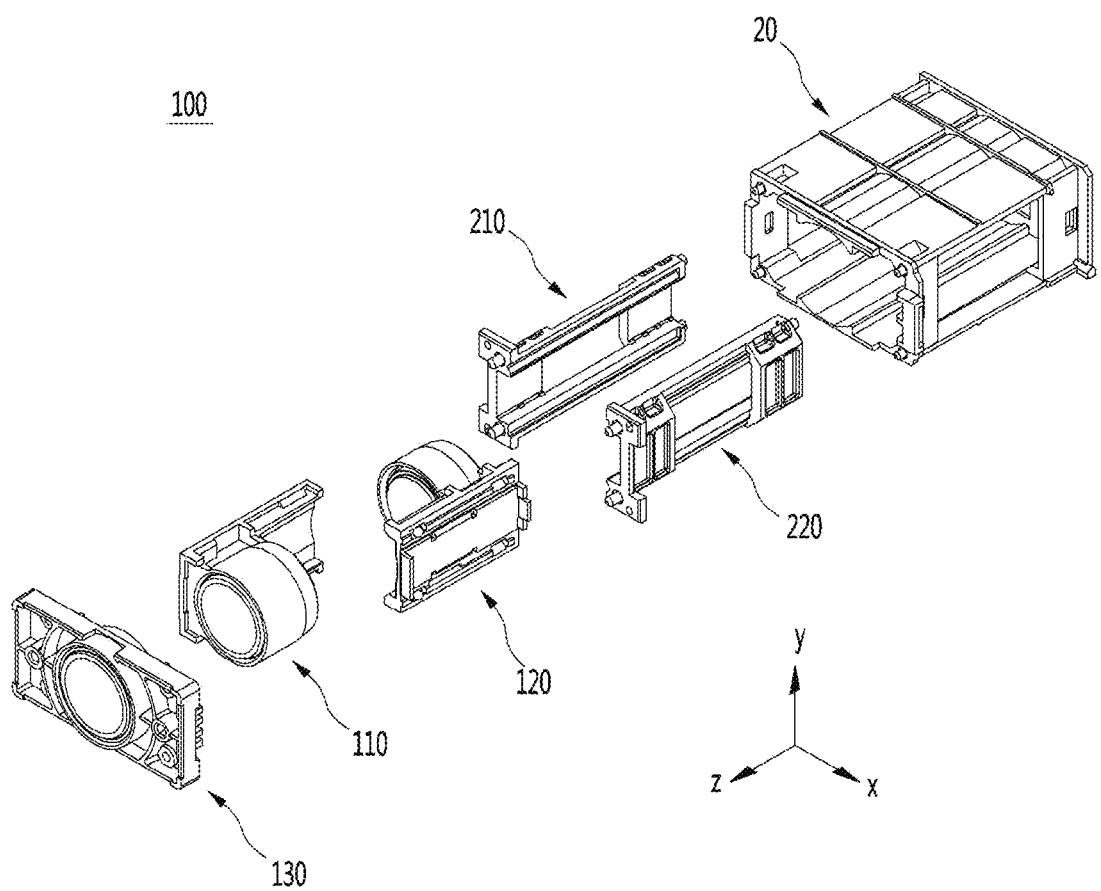
FIG. 13 is an exploded perspective view in which some elements are omitted from the camera actuator according to the embodiment shown in FIG. 11.

FIG. 11 is a perspective view of a first camera actuator 100 according to an embodiment, FIG. 12 is a perspective view in which a part of a configuration of the camera actuator according to the embodiment shown in FIG. 11 is omitted, and FIG. 13 is an exploded perspective view in which a part of the configuration of the camera actuator according to the embodiment shown in FIG. 11 is omitted.

Referring to FIG. 11, the first camera actuator 100 according to the embodiment may include a base 20, a circuit board 410 disposed outside the base 20, a fourth driving unit 142, and a third lens assembly 130.

FIG. 12 is a perspective view in which the base 20 and the circuit board 410 are omitted in FIG. 11. And referring to FIG. 12, a first camera actuator 100 according to an embodiment may include a first guide part 210, a second guide part 220, a first lens assembly 110, a second lens assembly 120, a third driving unit 141, and a fourth driving unit 142.

The third driving unit 141 and the fourth driving unit 142 may include a coil or a magnet.

For example, when the third driving unit 141 and the fourth driving unit 142 include the coil, the third driving unit 141 may include a first coil part 141b and a first yoke 141a, and the fourth driving unit 142 may include a second coil part 142b and a second yoke 142a.

Or, conversely, the third driving unit 141 and the fourth driving unit 142 may include the magnet.

In an x-y-z-axis direction shown in FIG. 13, the z-axis may refer to an optic axis direction or a direction parallel thereto, an xz plane represents the ground, and an x-axis may refer to a direction perpendicular to the z-axis on the ground (xz plane), and a y-axis may refer to a direction perpendicular to the ground.

Referring to FIG. 13, a first camera actuator 100 according to an embodiment may include a base 20, a first guide part 210, a second guide part 220, a first lens assembly 110, a second lens assembly 120, and a third lens assembly 130.

For example, the first camera actuator 100 according to the embodiment may include the base 20, the first guide part 210 disposed on one side of the base 20, the second guide part 220 disposed on the other side of the base 20, the first lens assembly 110 corresponding to the first guide part 210, the second lens assembly 120 corresponding to the second guide part 220, a first ball bearing 117 (see FIG. 15A) disposed between the first lens assembly 110 and the first guide part 210, and a second ball bearing (not shown) disposed between the second guide part 220 and the second lens assembly 120.

In addition, the embodiment may include the third lens assembly 130 disposed in front of the first lens assembly 110 in the optic axis direction.

Hereinafter, specific features of the camera device according to the embodiment will be described in detail with reference to the drawings.

<Guide Part>

Referring to FIG. 12 and FIG. 13, the embodiment may include a first guide part 210 disposed adjacent to the first side wall 21a of the base 20, and a second guide part 220 disposed adjacent to the second side wall 21b of the base 20.

The first guide part 210 may be disposed between the first lens assembly 110 and the first side wall 21a of the base 20.

The second guide part 220 may be disposed between the second lens assembly 120 and the second side wall 21b of the base 20. The first side wall 21a and the second side wall 21b of the base may be disposed to face each other.

According to the embodiment, a lens assembly can be driven in a state in which the first guide part 210 and the second guide part 220, which are precisely numerically controlled in the base, are coupled to each other, so that friction resistance can be reduced by reducing friction torque, and thus there are technical effects such as improvement of driving force, reduction of power consumption, and improvement of control characteristics during zooming.

Accordingly, according to the embodiment, there is a complex technical effect that image quality or resolution can be improved remarkably by inhibiting occurrence of a phenomenon that a decenter of a lens, tilt of the lens, and non-alignment between a central axis of a lens group and an image sensor while minimizing the friction torque during zooming, In the related art, when guide rails are disposed in the base itself, a gradient is generated along an injection direction, and thus there is difficulty in dimensional control, and there is a technical problem that friction torque increases and driving force decreases when injection is not performed normally.

On the other hand, according to the embodiment, the first guide part 210 and the second guide part 220 which are formed separately from the base 20 are applied separately without disposing the guide rails on the base itself, and thus there is a special technical effect that generation of a gradient along the injection direction may be inhibited.

The base 20 may be injected in a Z-axis direction. In the related art, when a rail is integrally formed with the base, there is a problem that a straight line of the rail is distorted due to a gradient generated while the rail is injected in the Z-axis direction.

According to the embodiment, since the first guide part 210 and the second guide part 220 are injected separately from the base 20, it is possible to inhibit generation of a gradient remarkably as compared with the related art, and thus there is a special technical effect that precise injection may be performed and generation of a gradient due to injection may be inhibited.

In the embodiment, the first guide part 210 and the second guide part 220 may be injected on an X-axis, and a length injected may be shorter than the base 20. In this case, when rails 212 and 222 are disposed on the first guide part 210 and the second guide part 220, generation of a gradient during injection can be minimized, and there is a technical effect that a possibility of the straight line of the rail distorted can be low.

Figure 14:
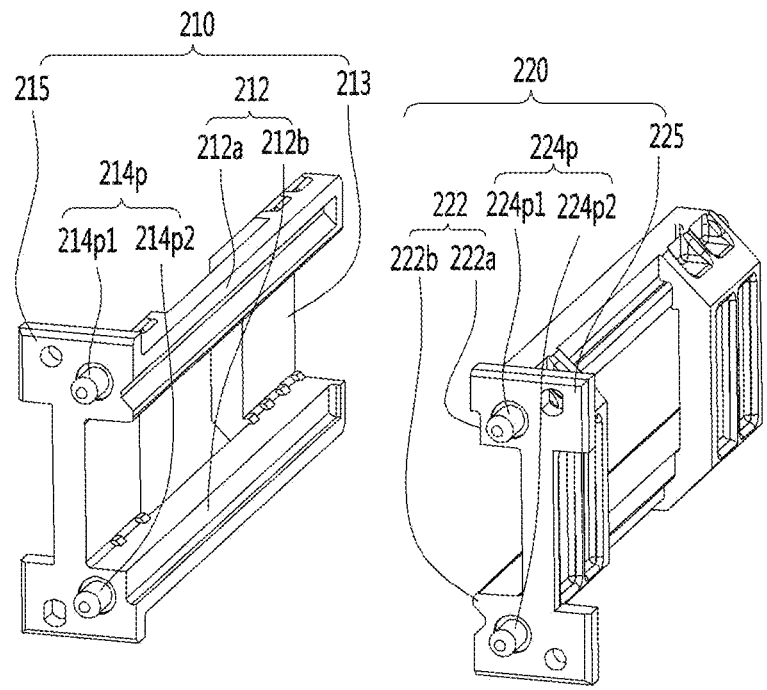
FIG. 14 is a perspective view of a first guide part and a second guide part in the camera actuator according to the embodiment shown in FIG. 13.

FIG. 14 is an enlarged perspective view of a first guide part 210 and a second guide part 220 of a camera actuator according to an embodiment.

Referring to FIG. 14, in the embodiment, the first guide part 210 may include a single or a plurality of first rails 212. In addition, the second guide part 220 may include a single or a plurality of second rails 222.

For example, the first rail 212 of the first guide part 210 may include a first-first rail 212a and a first-second rail 212b. The first guide part 210 may include a first support portion 213 between the first-first rail 212a and the first-second rail 212b.

According to the embodiment, two rails for each lens assembly are provided, and thus there is a technical effect that even though any one of the rails is distorted, the accuracy can be secured by the other one.

In addition, according to the embodiment, the two rails for each lens assembly are provided, and thus there is a technical effect that despite an issue of the frictional force of the ball described later at any one of the rails, the driving force can be secured as the rolling driving proceeds smoothly in the other one.

The first rail 212 may be connected from one surface of the first guide part 210 to the other surface thereof.

A camera actuator according to the embodiment and a camera module including the same can solve a problem of lens decenter or tilt generation during zooming, and can align a plurality of lens groups well to inhibit a change in an angle of view or occurrence of defocusing, and thus there is a technical effect that image quality or resolution is significantly improved.

For example, according to the embodiment, the first guide part 210 may include the first-first rail 212a and the first-second rail 212a. And the first-first rail 212a and the first-second rail 212a can guide the first lens assembly 110, and thus there is a technical effect that accuracy of alignment can be improved.

In addition, according to the embodiment, since the two rails for each lens assembly are provided, it is possible to secure widely a distance between balls described later, and accordingly, there is a technical effect that a driving force can be improved, an interference of a magnetic field may be inhibited, and a tilt may be inhibited when the lens assembly is stopped or moved.

In addition, the first guide part 210 may include a first guide protruding part 215 that extends in a side surface direction perpendicular to a direction in which the first rail 212 extends.

A first protrusion 214p may be included on the first guide protruding part 215. For example, the first protrusion 214p may include a first-first protrusion 214p1 and a first-second protrusion 214p2.

Also, referring to FIG. 14, in the embodiment, the second guide part 220 may include a single or a plurality of second rails 222.

For example, the second rail 222 of the second guide part 220 may include a second-first rail 222a and a second-second rail 222b. The second guide part 220 may include a second support portion 223 between the second-first rail 222a and the second-second rail 222b.

The second rail 222 may be connected from one surface of the second guide part 210 to the other surface thereof.

In addition, the second guide part 220 may include a second guide protruding part 225 that extends in a side surface direction perpendicular to a direction in which the second rail 222 extends.

A second protrusion 224p including a second-first protrusion 224p1 and a second-second protrusion 224p2 may be included on the second guide protruding part 225.

The first-first protrusion 214p1 and first-second protrusion 214p2 of the first guide part 210 and the second-first protrusion 224p1 and second-second protrusion 224p2 of the second guide part 220 may be coupled to a third housing 21 of a third lens assembly 130 described later.

According to the embodiment, the first guide part 210 may include the first-first rail 212a and the first-second rail 212b such that the first-first rail 212a and the first-second rail 212b guide the first lens assembly 110, and there is a technical effect that accuracy of alignment can be improved.

In addition, according to the embodiment, the second guide part 220 may include the second-first rail 222a and the second-second rail 222b, thus the second-first rail 222a and the second-second rail 222b guide the second lens assembly 120, and there is a technical effect that alignment accuracy may be increased.

Further, two rails for each lens assembly are provided, and thus there is a technical effect that even though any one of the rails is distorted, the accuracy can be secured by the other one.

In addition, according to the embodiment, since the two rails for each lens assembly are provided, it is possible to secure a wide distance between balls described later, and accordingly, there is a technical effect that a driving force can be improved, an interference of a magnetic field may be inhibited, and a tilt may be inhibited when the lens assembly is stopped or moved.

Further, according to the embodiment, since the two rails for each lens assembly are provided, there is a technical effect that the driving force may be secured as the rolling driving proceeds smoothly in the other one despite an issue of the frictional force of the ball described later at any one of the rails.

In addition, according to the embodiment, the guide rail is not arranged on the base itself, and the first guide part 210 and the second guide part 220 may be formed separately from the base 20 and assembled, and thus, there is a special technical effect of inhibiting the generation of gradients depending on the injection direction.

In the related art, when guide rails are disposed in the base itself, a gradient is generated along an injection direction, and thus there is difficulty in dimensional control, and there is a technical problem that friction torque increases and driving force decreases when injection is not performed normally.

Figure 15A:
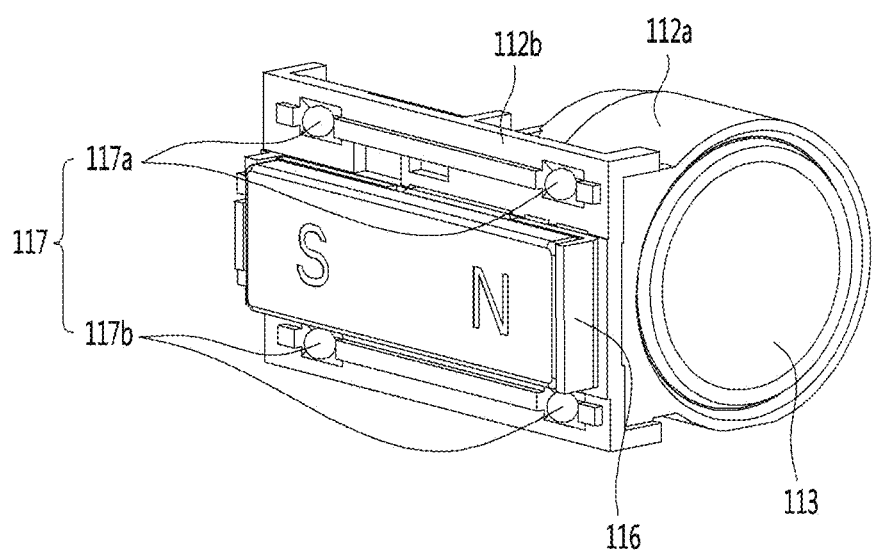
FIG. 15A is a perspective view of a first lens assembly in a camera actuator according to the embodiment shown in FIG. 13.
Figure 15B:
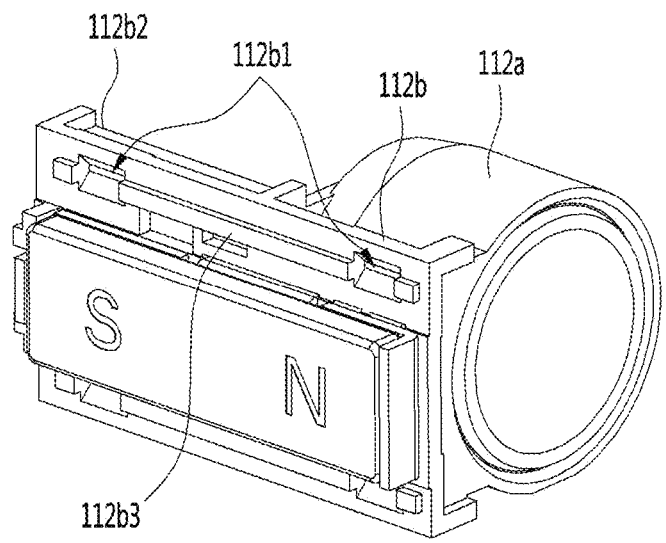
FIG. 15B is a perspective view with some elements removed from the first lens assembly shown in FIG. 15A.

Next, FIG. 15A is a perspective view of a first lens assembly 110 of the camera actuator according to the embodiment shown in FIG. 13, and FIG. 15B is a perspective view in which a part of a configuration of the first lens assembly 110 shown in FIG. 15A is removed.

Referring briefly to FIG. 13, the embodiment may include a first lens assembly 110 moving along the first guide part 210 and a second lens assembly 120 moving along the second guide part 220.

Referring again to FIG. 15A, the first lens assembly 110 may include a first lens barrel 112a on which a first lens 113 is disposed and a first driving unit housing 112b on which a first driving unit 116 is disposed. The first lens barrel 112a and the first driving unit housing 112b may be a first housing, and the first housing may be in a barrel shape or a lens-barrel shape. The first driving unit 116 may be a magnet driving unit, but the embodiment is not limited thereto, and in some cases, a coil may be disposed therein.

In addition, the second lens assembly 120 may include a second lens barrel (not shown) on which a second lens (not shown) is disposed and a second driving unit housing (not shown) on which a second driving unit (not shown) is disposed. The second lens barrel (not shown) and the second driving unit housing (not shown) may be a second housing, and the second housing may be in a barrel shape or a lens-barrel shape. The second driving unit may be a magnet driving unit, but the embodiment is not limited thereto, and in some cases, a coil may be disposed therein.

The first driving unit 116 may correspond to the two first rails 212, and the second driving unit may correspond to the two second rails 222.

In the embodiment, it is possible to drive using a single or a plurality of balls. For example, the embodiment may include a first ball bearing 117 disposed between the first guide part 210 and the first lens assembly 110 and a second ball bearing (not shown) disposed between the second guide part 220 and the second lens assembly 120.

For example, in the embodiment, the first ball bearing 117 may include a single or a plurality of first-first ball bearings 117a disposed above the first driving unit housing 112b and a single or a plurality of first-second ball bearings 117b below the first driving unit housing 112b.

In the embodiment, the first-first ball bearing 117a of the first ball bearing 117 may move along a first-first rail 212a which is one of the first rails 212, and the first-second ball bearing 117b of the first ball bearings 117 may move along a first-second rail 212b which is another one of the first rails 212.

A camera actuator according to the embodiment and a camera module including the same can solve a problem of lens decenter or tilt generation during zooming, and can align a plurality of lens groups well to inhibit a change in an angle of view or occurrence of defocusing, and thus there is a technical effect that image quality or resolution is significantly improved.

For example, according to the embodiment, the first guide part may include the first-first rail and the first-second rail, and the first-first rail and the first-second rail may guide the first lens assembly 110, and thus there is a technical effect that accuracy of alignment between the second lens assembly 110 and an optic axis can be improved when the first lens assembly 110 moves.

Referring also to FIG. 15B, in an embodiment, the first lens assembly 110 may include a first assembly groove 112b1 on which the first ball bearing 117 is disposed. The second lens assembly 120 may include a second assembly groove (not shown) on which the second ball bearing is disposed.

The first assembly groove 112b1 of the first lens assembly 110 may be in plural. In this case, a distance between two first assembly grooves 112b1 of the plurality of first assembly grooves 112*b*1 with respect to an optic axis direction may be longer than a thickness of the first lens barrel 112*a*.

In the embodiment, the first assembly groove 112*b*1 of the first lens assembly 110 may be in a V-shape. Further, the second assembly groove (not shown) of the second lens assembly 120 may be in a V-shape. The first assembly groove 112*b*1 of the first lens assembly 110 may be in a U-shape in addition to the V-shape, or a shape that contacts the first ball bearing 117 at two or three points. In addition, the second assembly groove (not shown) of the second lens assembly 120 may be in a U-shape in addition to the V-shape, or a shape that contacts the first ball bearing 117 at two or three points.

Figure 16:
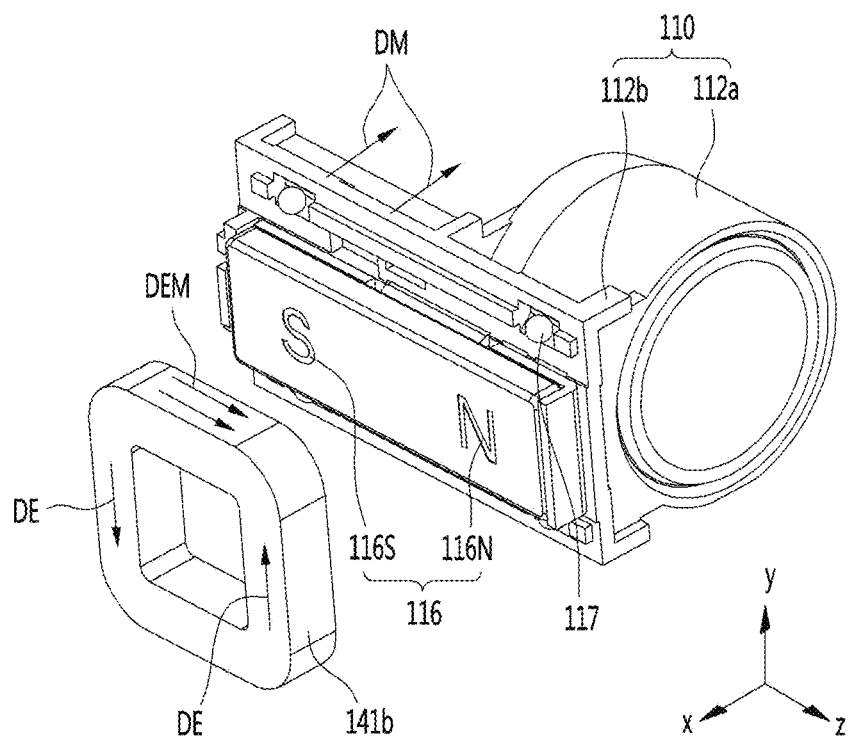
FIG. 16 is an exemplary view of driving in a camera actuator according to an embodiment.

Next, FIG. 16 is a driving example view of the camera actuator according to the embodiment.

An interaction in which an electromagnetic force DEM is generated between a first magnet 116 and a first coil part 141*b* in the camera module according to the embodiment will be described with reference to FIG. 16.

As shown in FIG. 16, a magnetization method of the first magnet 116 of the camera module according to the embodiment may be a vertical magnetization method. For example, in the embodiment, all of an N-pole 116N and an S-pole 116S of the first magnet 116 may be magnetized so as to face the first coil part 141*b*. Accordingly, the N-pole 116N and the S-pole 116S of the first magnet 116 may be respectively disposed so as to correspond to a region in which current flows in a y-axis direction perpendicular to the ground at the first coil part 141*b*.

Referring to FIG. 16, in the embodiment, a magnetic force DM is applied in a direction opposite to an x-axis at the N-pole 116N of the first magnet 116, and when a current DE flows in a y-axis direction in a region of the first coil part 141*b* corresponding to the N-pole 116N, the electromagnetic force DEM may act in a z-axis direction with respect to the Fleming's left-hand rule.

In addition, in the embodiment, the magnetic force DM is applied in the x-axis direction at the S-pole 116S of the first magnet 116, and when the current DE flows in a direction opposite to the y-axis perpendicular to the ground at the first coil part 141*b* corresponding to the S pole 116S, the electromagnetic force DEM may act in a z-axis direction with respect to the Fleming's left-hand rule.

At this time, since a third driving unit 141 including the first coil part 141*b* is in a fixed state, the first lens assembly 110, which is a moving portion on which the first magnet 116 is disposed, may be moved back and forth along a rail of the first guide part 210 in a direction parallel to the z-axis direction by the electromagnetic force DEM according to a current direction. The electromagnetic force DEM may be controlled in proportion to the current DE applied to the first coil part 141*b*.

Likewise, an electromagnetic force DEM may be generated between a second magnet (not shown) and the second coil part 142*b* of the camera module according to the embodiment, and thus the second lens assembly 120 may be moved along a rail of the second guide part 220 horizontally with respect to the optic axis.

As described above, when implementing AF or Zoom in the related art, a plurality of lens assemblies are driven by the electromagnetic force between a magnet and a coil, and in order to obtain the position information of the lens assembly, a hall sensor is disposed inside the winding of the coil. The inside of the winding of the coil in which the hall sensor is disposed may be hollow. The hall sensor may obtain a position information of the lens assembly by sensing a change in magnetic flux of the magnet disposed in the lens assembly. However, when the hall sensor is positioned inside the coil, a distance between the hall sensor and the magnet is determined by a height of the coil.

However, in the related art, thrust is required for the movement of the lens assembly, and in order to secure such thrust, the height of the coil is required to be higher than a predetermined height.

However, when the height of the coil is increased as described above, the distance between the hall sensor and the magnet is increased by the heightened coil. Accordingly, since the magnetic flux of the magnet is blocked, there is a technical contradiction in which the sensitivity of the magnetic flux sensed by the hall sensor disposed inside the coil is lowered. On the contrary, when the height of the coil is reduced, the electromagnetic force between the magnet and the coil is weakened, so the thrust for AF or Zoom driving may be deteriorated.

According to the unpublished internal technology of the applicant, in order to solve this problem, the optimum point of the sensitivity and thrust of the Hall sensor is set by a coil of an appropriate height. However, a decrease in thrust or a decrease in the sensitivity of the hall sensor may cause problems in the precision of camera control and may cause a decent or tilt phenomenon of the camera module, resulting in resulting in direct impact on the safety or life of the user including the driver or pedestrian.

Figure 17:
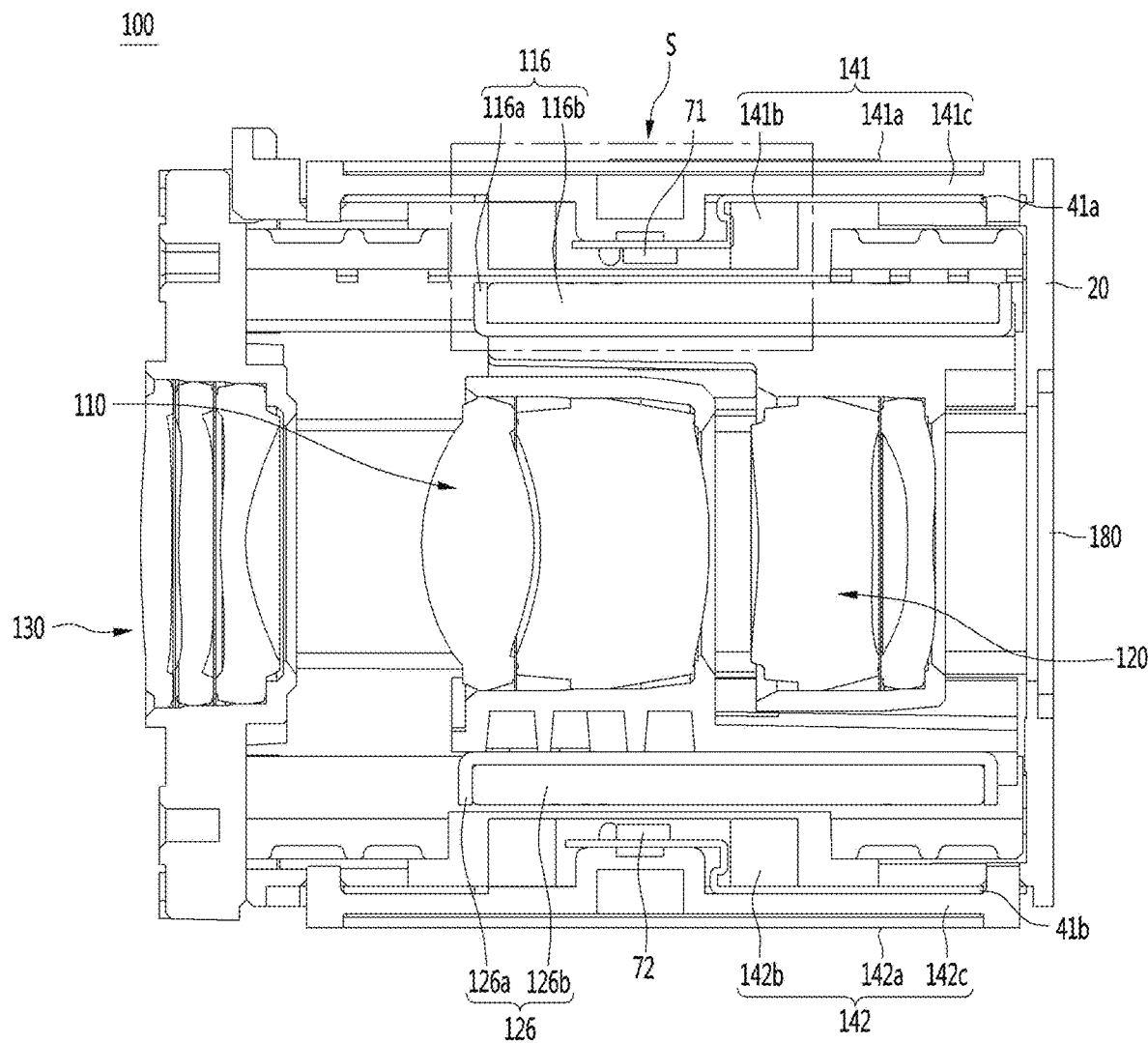
FIG. 17 is a cross-sectional view taken along line C1-C2 in the camera actuator according to the embodiment shown in FIG. 11.

One of technical problems of the embodiment is to provide a camera actuator, and a camera module including the same, capable of improving simultaneously the sensitivity of the hall sensor while increasing the thrust FIG. 17 is a cross-sectional view taken along line C1-C2 in the camera actuator according to the embodiment shown in FIG. 11.

Referring to FIG. 17, the first camera actuator 100 according to the embodiment may include a base 20 and a lens assembly disposed in the base 20. For example, a third lens assembly 130, a first lens assembly 110, and a second lens assembly 120 may be sequentially disposed in the base 20 based on a light incident direction, and an image sensor 180 may be disposed on a rear side of the second lens assembly 120.

As described above, the first camera actuator 100 according to the embodiment may be driven by an electromagnetic force of a predetermined magnet and a coil part.

For example, referring to FIG. 17, in the camera actuator according to the embodiment, the first lens assembly 110 may include a first driving unit 116 and a third driving unit 141, and the second lens assembly 120 may include a second driving unit 126 and a fourth driving unit 142.

The first driving unit 116 and the second driving unit 126 may be magnet driving units, and the third driving unit 141 and the fourth driving unit 142 may be coil driving units, but the embodiment is not limited thereto.

Hereinafter, it will be described as a case in which the first driving unit 116 and the second driving unit 126 are magnet driving units, respectively, and the third driving unit 141 and the fourth driving unit 142 are coil driving units, respectively.

In the camera module according to the embodiment, in the first lens assembly 110, the first driving unit 116 may include a first magnet 116*b* and a first yoke 116*a*, and the third driving unit 141 may include a first coil part 141*b* and a third yoke 141*a*. The third driving unit 141 may include a first circuit board 41 between the first coil part 141*b* and the third yoke 141*a*.

In addition, the embodiment may include a first spacer 141*c* disposed in the base 20 and a first position detection sensor 71 disposed on the first spacer 141*c*. The first spacer 141*c* may be formed of any one or more of polycarbonate (PC), polyethylene terephthalate glycol (PETG), polyethylene (PE) and polypropylene (PP), but the embodiment is not limited thereto.

The first position detection sensor 71 may be a magnetic sensor. For example, the first position detection sensor 71 may be any one of solid magnetic sensors such as a hall sensor, a coiled magnetic sensor, a resonance magnetic sensor, and the like, but the embodiment is not limited thereto.

In addition, in the camera module according to the embodiment, in the second lens assembly 120, the second driving unit 126 may include a second magnet 126*b* and a second yoke 126*a*, and the fourth driving unit 142 may include a second coil part 142*b* and a fourth yoke 142*a*. The fourth driving unit 142 may include a second circuit board 42 between the second coil part 142*b* and the fourth yoke 142*a*.

In addition, the embodiment may include a second spacer 142*c* disposed in the base 20 and a second position detection sensor 72 disposed on the second spacer 142*c*. The second spacer 142*c* may be formed of any one or more of polycarbonate (PC), polyethylene terephthalate glycol (PETG), polyethylene (PE) and polypropylene (PP), but the embodiment is not limited thereto.

The second position detection sensor 72 may be any one magnetic sensor of a coiled magnetic sensor, a solid magnetic sensor such as a hall sensor, a resonance magnetic sensor, and the like, but the embodiment is not limited thereto.

Hereinafter, technical features of a disposition structure of a position sensor in the embodiment will be described with reference to FIGS. 17-18C.

Figure 18A:
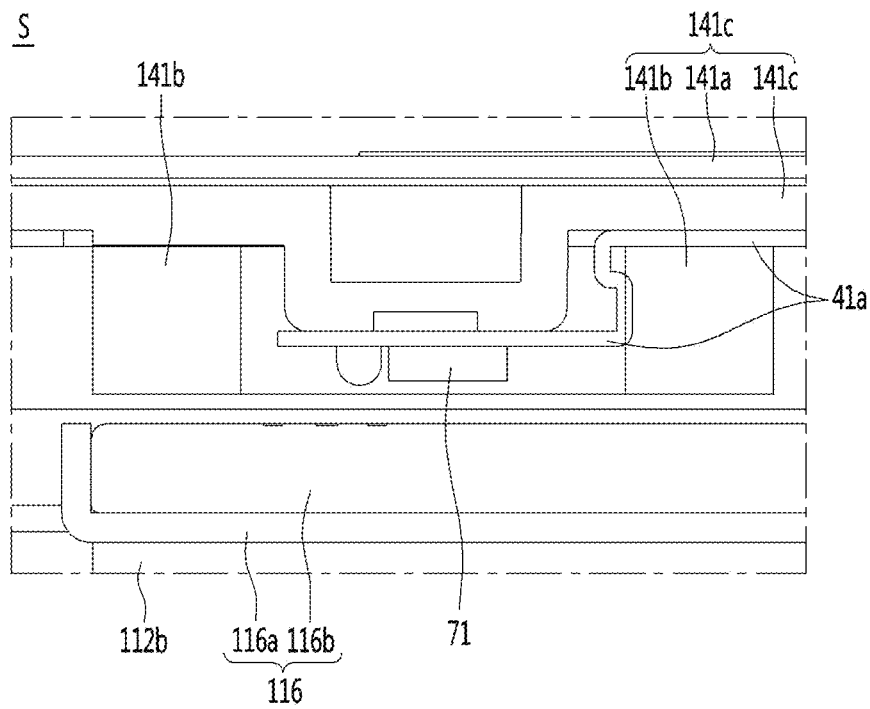
FIG. 18A is an enlarged view of region S shown in FIG. 17.
Figure 18B:
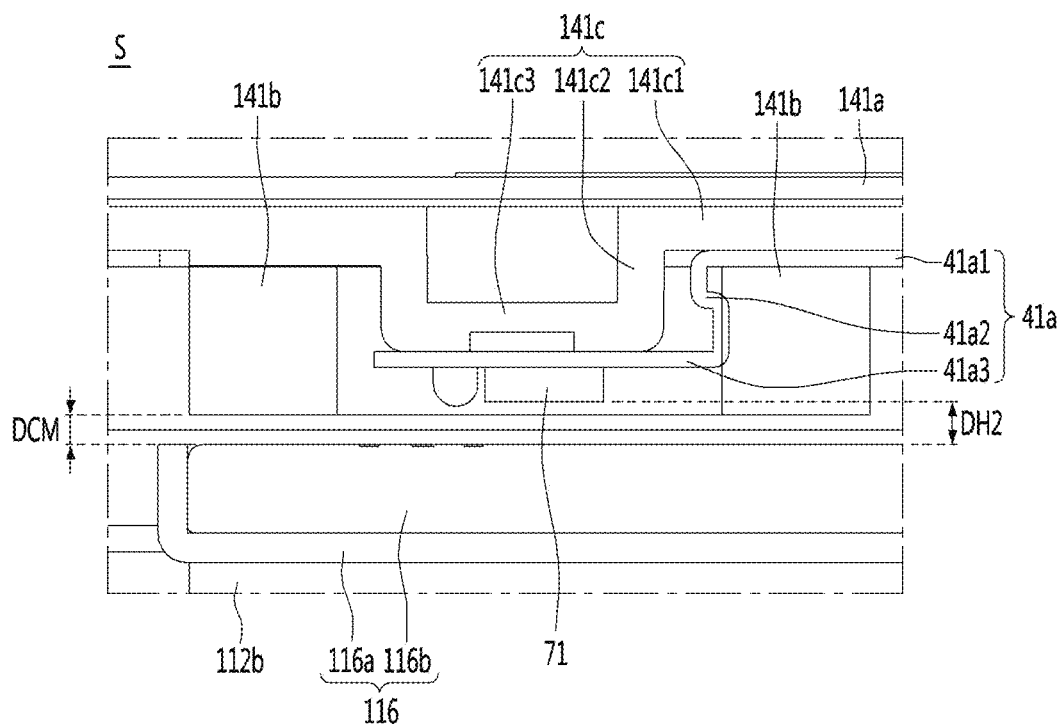
FIG. 18B is a detailed view of the Region S shown in FIG. 17.

FIG. 18A is an enlarged view of the S region shown in FIG. 17, and FIG. 18B is a detailed view of the S region shown in FIG. 18A.

First, referring to FIGS. 17 and 18A, the embodiment may include a base 20, a first lens assembly 110 disposed in the base 20, the third driving unit 141 which is a coil driving unit disposed in the base 20, a first spacer 141*c* disposed in the base 20, and a first position detection sensor 71 disposed on the first spacer 141*c*.

The third driving unit 141 may include a first circuit board 41*a* disposed between the first coil part 141*b* and the third yoke 141*a*.

The first coil part 141*b* and the first position detection sensor 71 may be electrically connected to the first circuit board 41*a*.

Next, referring to FIG. 18B, the first spacer 141*c* may include a first support portion 141*c*1 and a first protruding part 141*c*3 protruding from the first support portion 141*c*1, the first position detection sensor 71 may be disposed on the first protruding part 141*c*3, and the first protruding part 141*c*3 may be disposed in the hollow of the first coil part 141*b* which is the coil driving portion.

In this case, the embodiment may include a first connecting portion 141*c*2 connecting the first protruding part 141*c*3 and the first support portion 141*c*1.

Referring to FIG. 18B, the first circuit board 41*a* may include a first substrate region 41*a*1 disposed on the first spacer 141*c* and a second substrate region 41*a*3 disposed to be spaced apart from the first substrate region 41*a*1. The first circuit board 41*a* may include a second-second substrate region 41*a*2 connecting the first substrate region 41*a*1 and the second substrate region 41*a*3. The first position detection sensor 71 may be disposed on the second substrate region 41*a*3, and the second substrate region 41*a*3 may be disposed in the hollow of the first coil part 141*b* which is the coil driving unit.

In addition, referring to FIG. 17, the embodiment may include the base 20, a second lens assembly 120 disposed in the base 20, the fourth driving unit 142 which is a coil driving unit disposed in the base 20, the second spacer 142*c* disposed in the base 20, and the second position detection sensor 72 disposed on the second spacer 142*c*.

In addition, the second spacer 142*c* may also adopt technical features of the first spacer 141*c*. For example, referring to FIG. 17, the second spacer 142*c* may include a second protruding part (not shown) protruding from a second support portion (not shown), the second position detection sensor 72 may be disposed on the second protruding part, and the second protruding part may be disposed in the hollow of the fourth driving unit 142 which is the coil driving unit.

The second protruding part may include a second seating portion (not shown), and the second position detection sensor 72 may be disposed on the second seating portion.

In addition, referring to FIG. 17, the second circuit board 41*b* may include a third substrate region (not shown) disposed on the second spacer 142*c* and a fourth substrate region disposed to be spaced apart from the third substrate region. The second circuit board 41*b* may include a fourth-second substrate region connecting the third substrate region and the fourth substrate region.

The second position detection sensor 72 may be disposed on the fourth-second substrate region, and the fourth-second substrate region may be disposed in the hollow of the fourth driving unit 142 which is the coil driving unit.

Referring to FIG. 18B again, the first lens assembly 110 may be driven in the optical axis direction by the electromagnetic force (DEM) between the first magnet 116*b* of the first driving unit 116 and the first coil part 141*b* of the third driving unit 141.

At this time, the electromagnetic force (DEM) might be affected by a distance (DCM) between the first magnet 116*b* and the first coil part 141*b*.

The magnetic flux of the magnet sensed by the hall sensor can be changed according to a spacing between the hall sensor and the magnet, and thus the performance of position detection of the hall sensor can be affected.

Figure 18C:
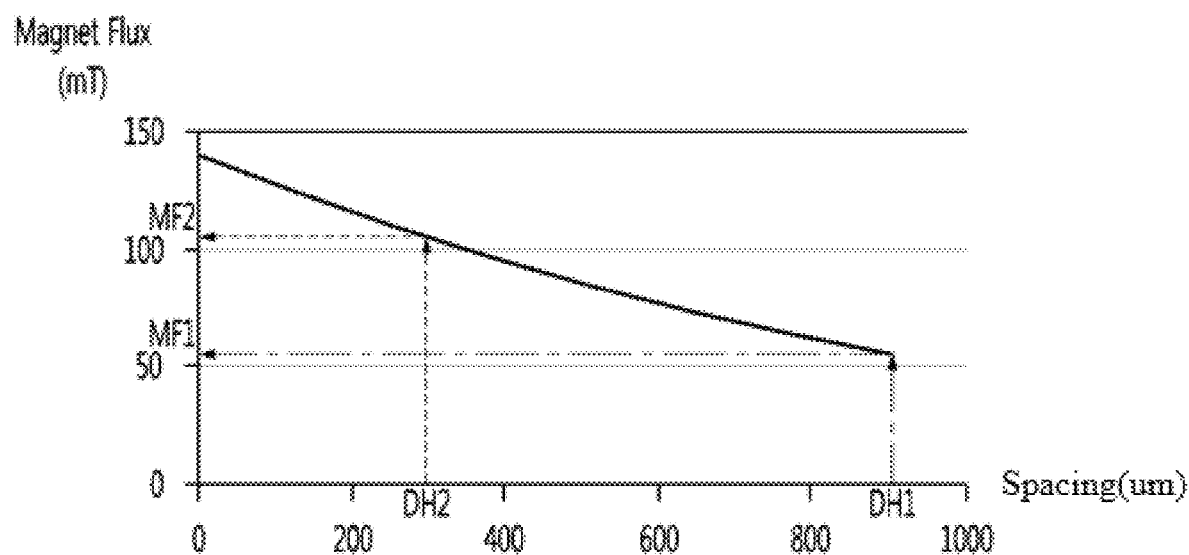
FIG. 18C is magnetic flux data according to the spacing between the magnet and the position detection sensor in embodiments and reference examples.

For example, FIG. 18C is magnetic flux data according to the spacing between the magnet and the first position detection sensor 71 in embodiment and reference example.

In the related internal technology, the height of the coil part should be guaranteed to some extent to secure thrust. However, as the hall sensor is disposed on the PCB at the bottom of the coil part, the higher the height of the coil part, the greater the spacing between the magnet and the hall sensor. Accordingly, there is a technical limit in that the first distance DH1 spaced apart between the magnet and the Hall sensor must be at least 800 μm.

Accordingly, in the related internal technology (reference example), the magnetic flux detected by the hall sensor was a level of securing about 50 mT.

In addition, in the related internal technology, when the height of the coil increases, the magnetic flux of the magnet, which may be introduced into the hall sensor disposed in the hollow portion of the coil, is partially blocked, so that the sensitivity of the hall sensor is lowered.

On the other hand, according to the embodiment, the first spacer 141*c* may include a first protruding part 141*c*3 protruding from the first support portion 141*c*1, and the first position detection sensor 71 is disposed on the first protruding part 141c3, and accordingly, a second distance DH2 between the first magnet 116b and the first position detection sensor 71 can be significantly reduced, and thus there is a technical effect that the magnetic flux of the first magnet 116b sensed by the first position detection sensor 71 can be significantly improved.

For example, according to the embodiment, as the first position detection sensor 71 is disposed on the first protruding part 141c3, it is possible to secure the second distance DH2 between the first magnet 116b and the first position detection sensor 71 to 400 um or less, which is more than two times shorter than that of reference example. Accordingly, there is a unique technical effect that the magnetic flux between the first magnet 116b and the first position detection sensor 71 may be secured up to about 150 mT, which is about three times higher than that of reference example.

In addition, according to the embodiment, as the first position detection sensor 71 is disposed on the first protruding part 141c3, the first position detection sensor 71 is almost exposed to the first magnet 116b even though it is disposed in the hollow of the first coil part 141b, and thus there is a special technical effect that blocking of magnetic flux by the first coil part 141b can be significantly reduced.

Accordingly, the camera actuator according to the embodiment and the camera module including the same can have a unique technical effect of simultaneously increasing the thrust and the sensitivity of the hall sensor.

Next, one of technical problems of the embodiments is, when implementing AF or Zoom, to provide a camera actuator and a camera module including the same, capable of inhibiting a magnetic field interference between magnets mounted on each lens assembly when a plurality of lens assemblies are driven by an electromagnetic force between a magnet and a coil.

In addition, one of the technical problems of the embodiments is to provide a camera actuator, and a camera module including the same, capable of inhibiting detachment of a magnet and a yoke.

Hereinafter, a structure of inhibiting magnetic field interference of an embodiment will be described with reference to FIGS. 19A to 19B.

Figure 19A:
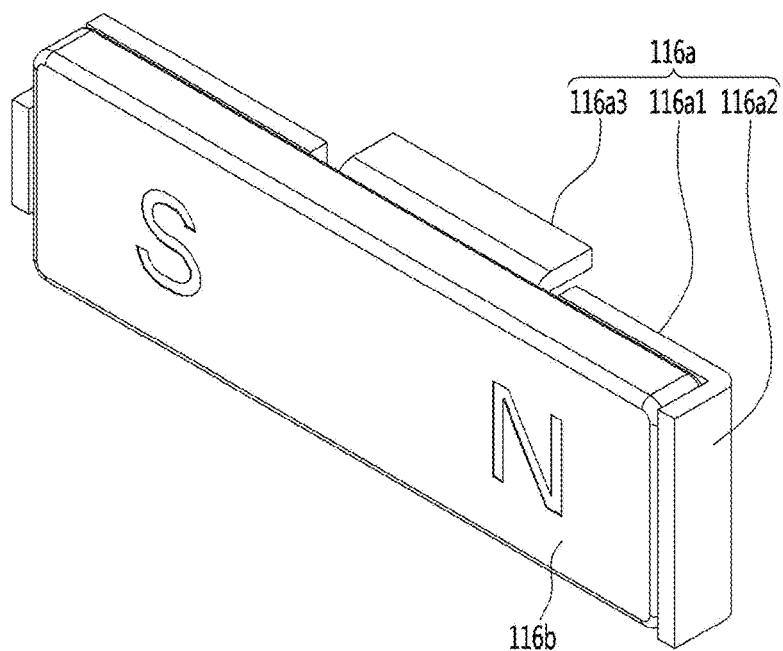
FIG. 19A is a perspective view of a first driving unit 116 in a camera actuator according to an embodiment.

Next, FIG. 19A is a perspective view of a first driving unit 116 of a camera module according to an embodiment.

Referring to FIG. 19A, in the embodiment, the first driving unit 116 may include a first magnet 116b and a first yoke 116a, and the first yoke 116a may include a first support portion 116a1 and a first side protruding part 116a2 extending from the first support portion 116a1 toward a side surface of the first magnet 116b.

The first side protruding part 116a2 may be disposed on both side surfaces of the first magnet 116b.

In addition, the first yoke 116a may include a first fixed protruding part 116a3 extending in a different direction, for example, in a direction opposite to the first side protruding part 116a2.

The first fixed protruding part 116a3 may be disposed at a position about a middle of the first support portion 116a1, but the embodiment is not limited thereto.

Similarly, in the embodiment, the second driving unit 126 may include a second magnet 126b and a second yoke 126a, and the second yoke 126a may include a second support portion (not shown) and a second side protruding part extending from the second support portion toward a side surface of the second magnet 126b (hereinbefore, see a structure of the second yoke 126a in FIG. 17).

The second side protruding part may be disposed on both side surfaces of the second magnet 126b. In addition, the second yoke 126a may include a second fixed protruding part (not shown) extending in a different direction, for example, in a direction opposite to the second side protruding part. The second fixed protruding part may be disposed at a position about a middle of the second support portion, but the embodiment is not limited thereto.

In the related art, in addition, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon can be induced, it may directly affect the safety or life of a driver who is a user or pedestrian.

Figure 19B:
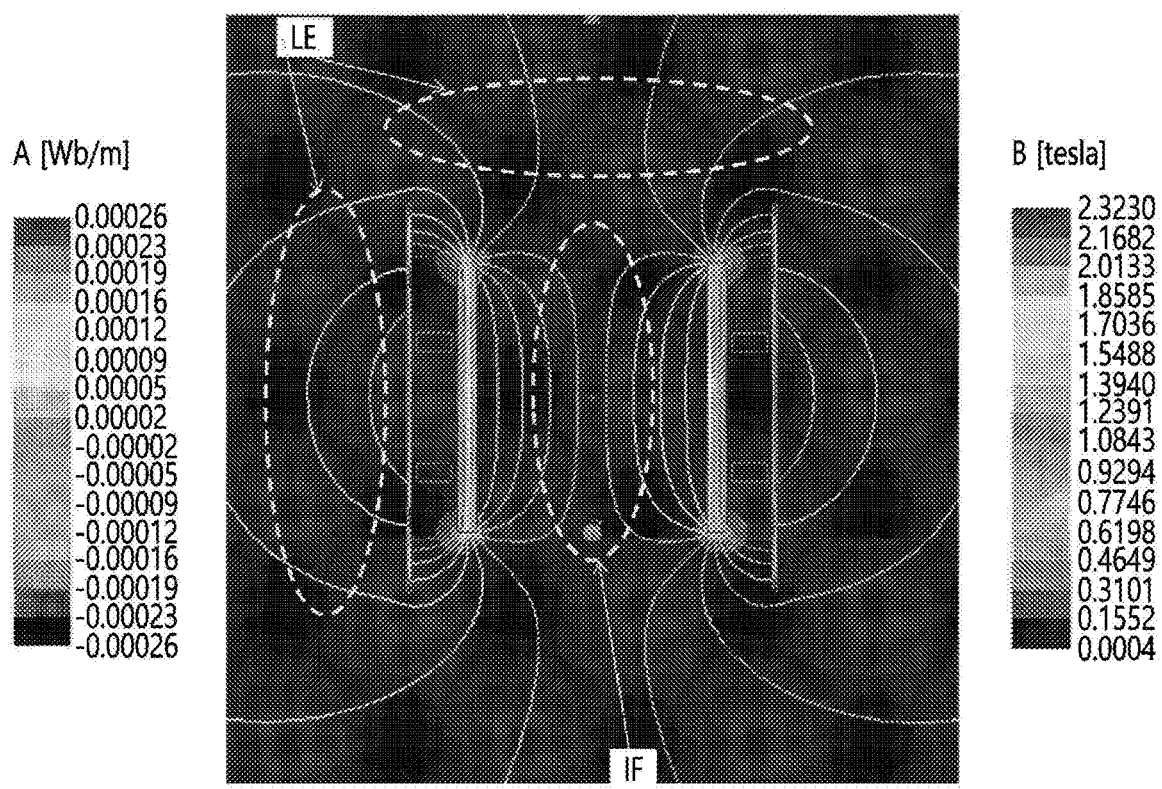
FIG. 19B is magnetic flux density distribution data in a reference example.

For example, FIG. 19B shows data of a magnetic flux density distribution in reference example.

Reference example of FIG. 19B is a non-disclosed internal technology of an applicant, and has a structure applied so as to perform a shielding function of magnetic flux by disposing a back yoke for a magnet. A shielding performance of the magnetic flux can be improved by applying back yoke technology for the magnet, but there are technical problems as follows.

For example, referring to FIG. 19B, it is magnetic flux density data between respective magnets mounted in the first lens assembly and the second lens assembly, and thus there is a problem that magnetic field interference (IF) occurs between the respective magnets, and loss of thrust occurs due to leakage (LE) of the magnetic flux generated in each magnet.

In particular, in case of a high-magnification Zoom Actuator applied recently, there is a problem that not only magnetic field interference occurs between permanent magnets of the first lens assembly and the second lens assembly, which are moving lenses, but also the magnetic field interference (IF) with a magnet of the OIS actuator occurs.

Movement of each group is disturbed due to the magnetic field interference (IF), and as a result, there is a problem that an input current is also increased.

According to the embodiment, a yoke in a magnet driving unit of the first lens assembly 110 or the second lens assembly 120 may include a side protruding part extending to a side surface of the magnet, and thus there is a special technical effect that it is possible to provide a camera actuator and a camera module including the same, capable of inhibiting a magnetic field interference between magnets mounted on each lens assembly when a plurality of lens assemblies are driven by an electromagnetic force between a magnet and a coil when AF or Zoom is implemented.

Figure 19C:
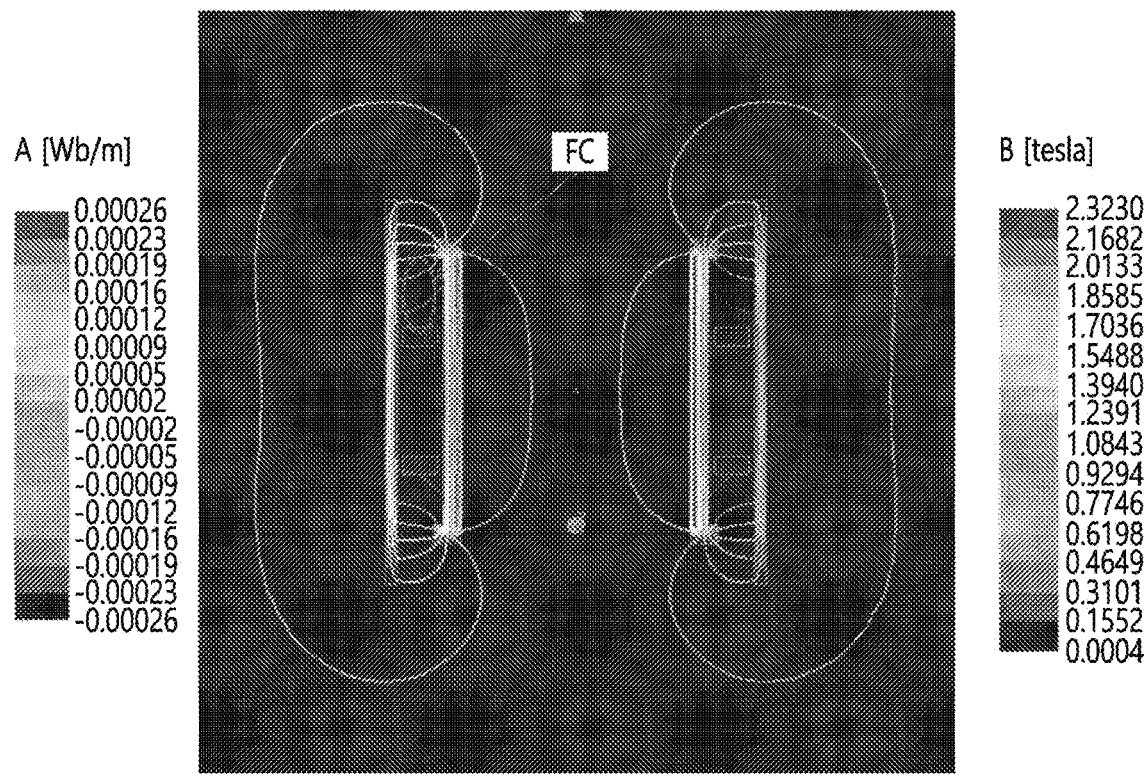
FIG. 19C is magnetic flux density distribution data in the embodiment.

For example, FIG. 19C shows data of a magnetic flux density distribution in embodiment.

Referring to FIG. 19C, it is magnetic flux density data between respective magnets mounted in the first lens assembly and the second lens assembly, and a yoke in a magnet driving unit of the first lens assembly 110 and the second lens assembly 120 may include a side protruding part extending to a side surface of the magnet, and thus the precision of camera control is improved significantly.

In addition, according to the embodiment, the yoke in the magnet driving unit of the first lens assembly 110 or the second lens assembly 120 may include the side protruding part extending to the side surface of the magnet to inhibit leakage flux generated in the magnet, and the side protruding part is disposed in a region having a high magnetic flux density so that the magnetic flux is concentrated (FC), and thus there is a technical effect that thrust is significantly improved by increasing a density between a flux line and the coil to increase the Lorentz Force.

Figure 20:
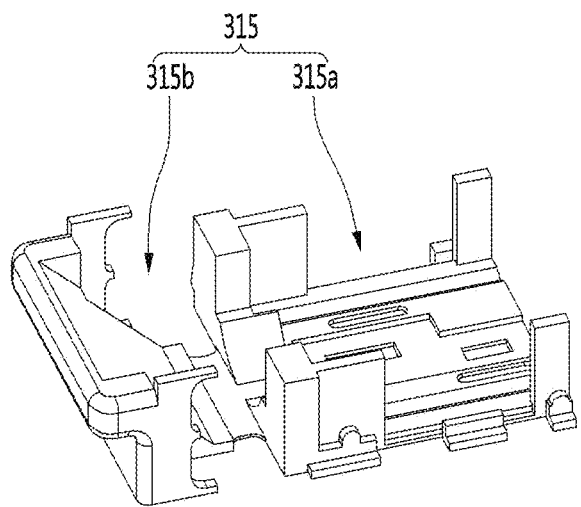
FIG. 20 is an exemplary view of an integrated body in a camera module according to another embodiment.

Next, FIG. 20 is an illustrative view of an integrated body 315 of a camera module according to another embodiment.

A first camera actuator 100 may be disposed in a first body region 315a of the integrated body 315 of the camera module according to another embodiment, and a second camera actuator 300 may be disposed in a second body region 315b.

Second Embodiment

Hereinafter, 'second embodiment' may be referred to as 'embodiment', and the technical features of 'the embodiment' described above may be employed.

Figure 21:
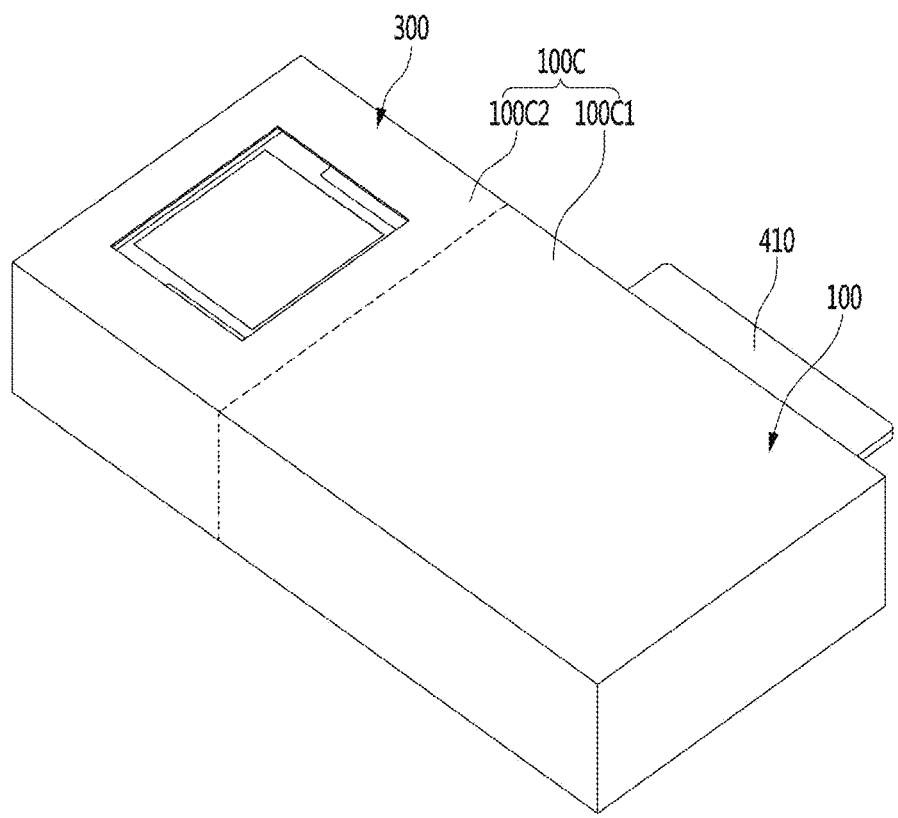
FIG. 21 is a perspective view of a camera module according to an embodiment.

FIG. 21 is a perspective view of a camera module 1000A according to an embodiment, and corresponds to FIG. 1.

Referring to FIG. 21, the camera module 1000A of the embodiment may include a single or a plurality of camera actuators. For example, the camera module 1000A of the embodiment may include a first camera actuator 100 and a second camera actuator 300.

The embodiment may include a case 100C for protecting the first camera actuator 100 and the second camera actuator 300. For example, the case 100C may include a first case 100C1 protecting the first camera actuator 100 and a second case 100C2 protecting the second camera actuator 300. The first case 100C1 and the second case 100C2 may be integrally formed or formed separately from each other.

The first camera actuator 100 may be electrically connected to a first circuit board 410, and the second camera actuator 300 may be electrically connected to a second circuit board 350 (see FIG. 22) to be described later. The first circuit board 410 and the second circuit board may also be electrically connected.

The first camera actuator 100 may support one or a plurality of lenses and may perform an auto-focusing function or a zoom function by moving the lenses up and down in response to a control signal from a predetermined control unit. In addition, the second camera actuator 300 may be an OIS (Optical Image Stabilizer) actuator, but is not limited thereto.

Hereinafter, the OIS actuator as the second camera actuator 300 will be mainly described, and thereafter, the first camera actuator 100 will be described.

<Second Camera Actuator>

Figure 22:
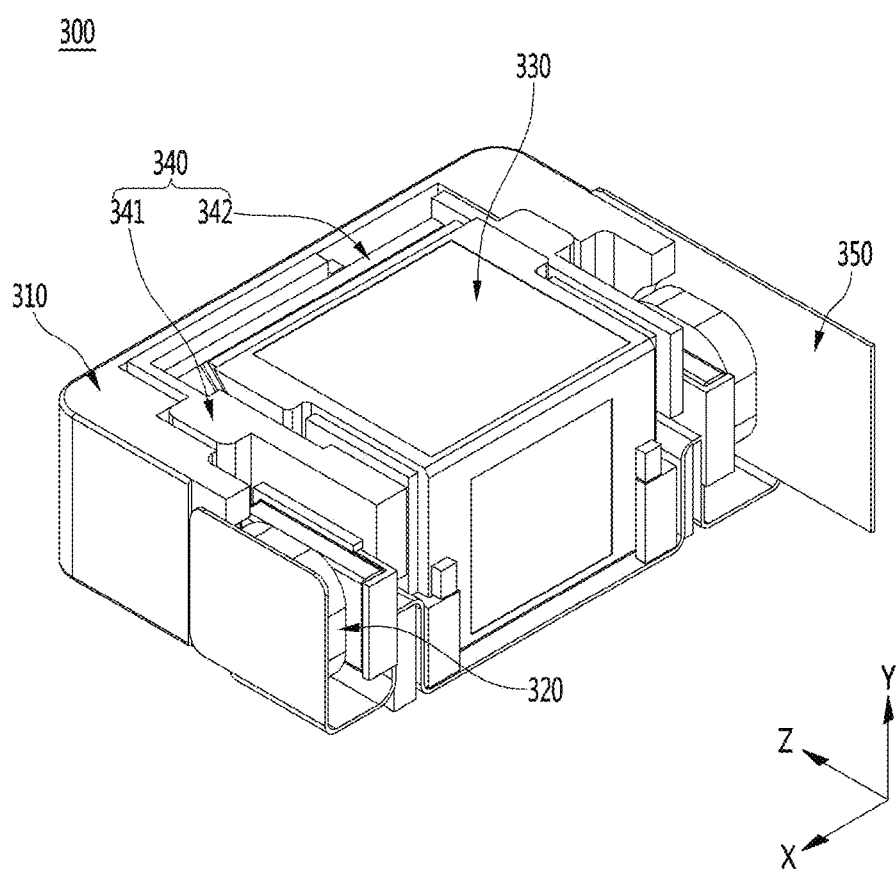
FIG. 22 is a perspective view in which a second case is omitted from the second camera actuator shown in FIG. 21.
Figure 23:
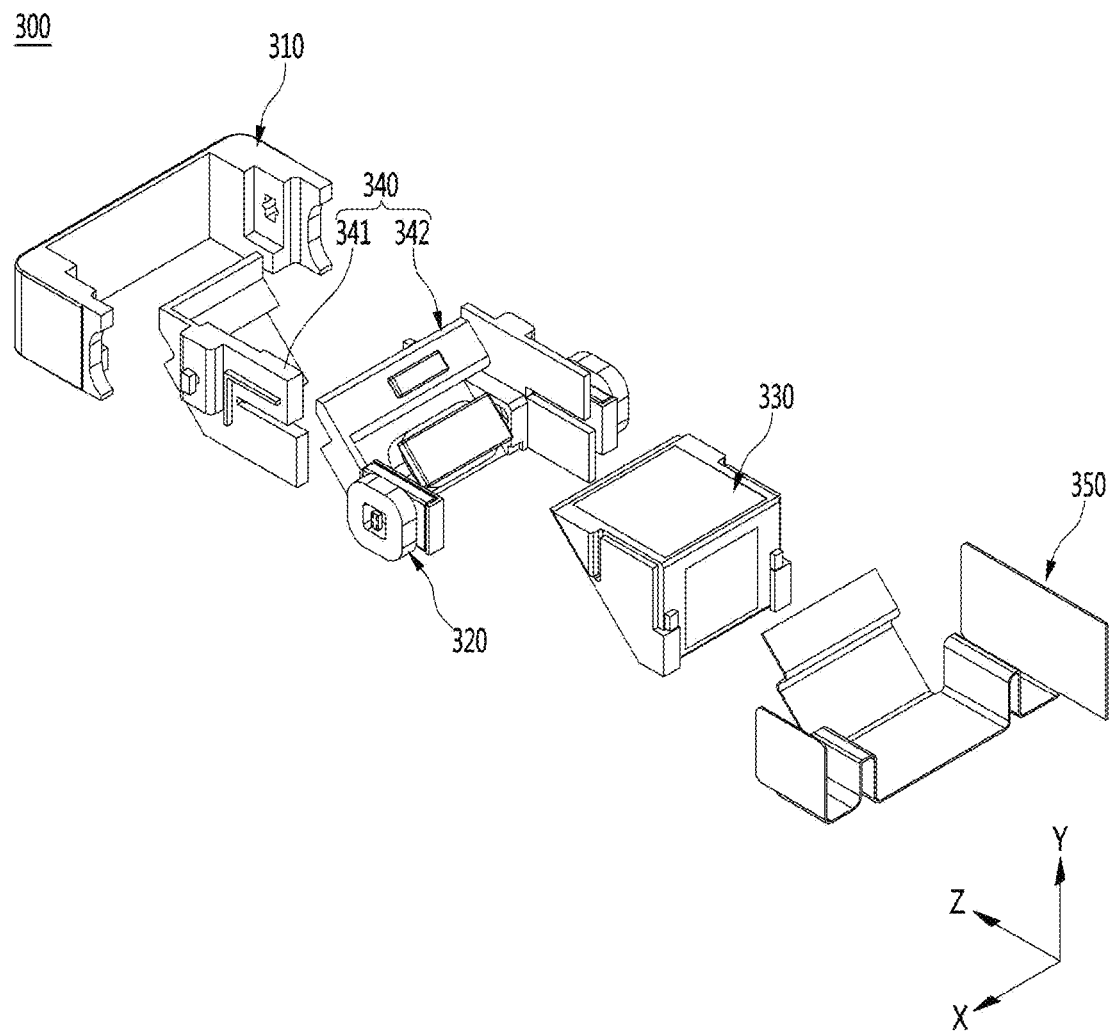
FIG. 23 is an exploded perspective view of the second camera actuator shown in FIG. 22.

FIG. 22 is a perspective view in which the second case 100C2 is omitted from the second camera actuator 300 shown in FIG. 21, and FIG. 23 is an exploded perspective view of the second camera actuator 300 shown in FIG. 22.

Referring to FIGS. 22 and 23, the second camera actuator 300 of the embodiment may include a housing 310, a prism driving unit 320, a prism unit 330, and a rotating unit 340 disposed in the housing 310 and a second circuit board 350 electrically connected to the prism driving unit 320. The rotating unit 340 may include a first rotating unit 341 and a second rotating unit 342.

According to the embodiment, the OIS can be implemented by having the prism driving unit 320 and the rotating unit 340 disposed in the housing 310, thereby solving the size limitation of the lens in the lens assembly of the optical system, so there is a technical effect that can provide including an ultra-slim, ultra-small camera actuator and the same and a camera module including the same.

In addition, according to the embodiment, the OIS can be implemented by providing the prism driving unit 320 and the rotating unit 340 stably disposed on the housing 310 to control the rotation of the prism unit 330 on the first axis or the second axis such that there is a technical effect of minimizing the occurrence of a decent or a tilt phenomenon to produce the best optical properties.

In addition, according to the embodiment, unlike moving a plurality of existing solid lenses, the prism driving unit 320 and the rotating unit 340 can be provided to control the rotation of the prism unit 330 to the first axis or the second axis to implement OIS such that embodiment has the technical effect of realizing OIS with low power consumption.

<Second Camera Actuator 300>

The second camera actuator 300 of the embodiment will be described in detail with reference to the drawings below.

Figure 24A:
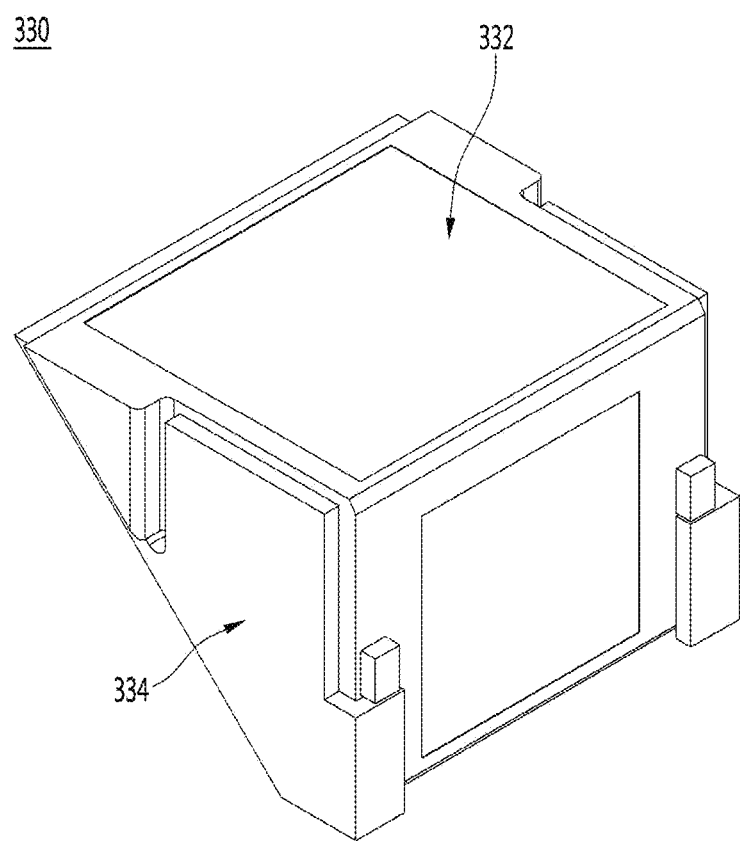
FIG. 24A is a perspective view of the prism unit in the second camera actuator shown in FIG. 23.
Figure 24B:
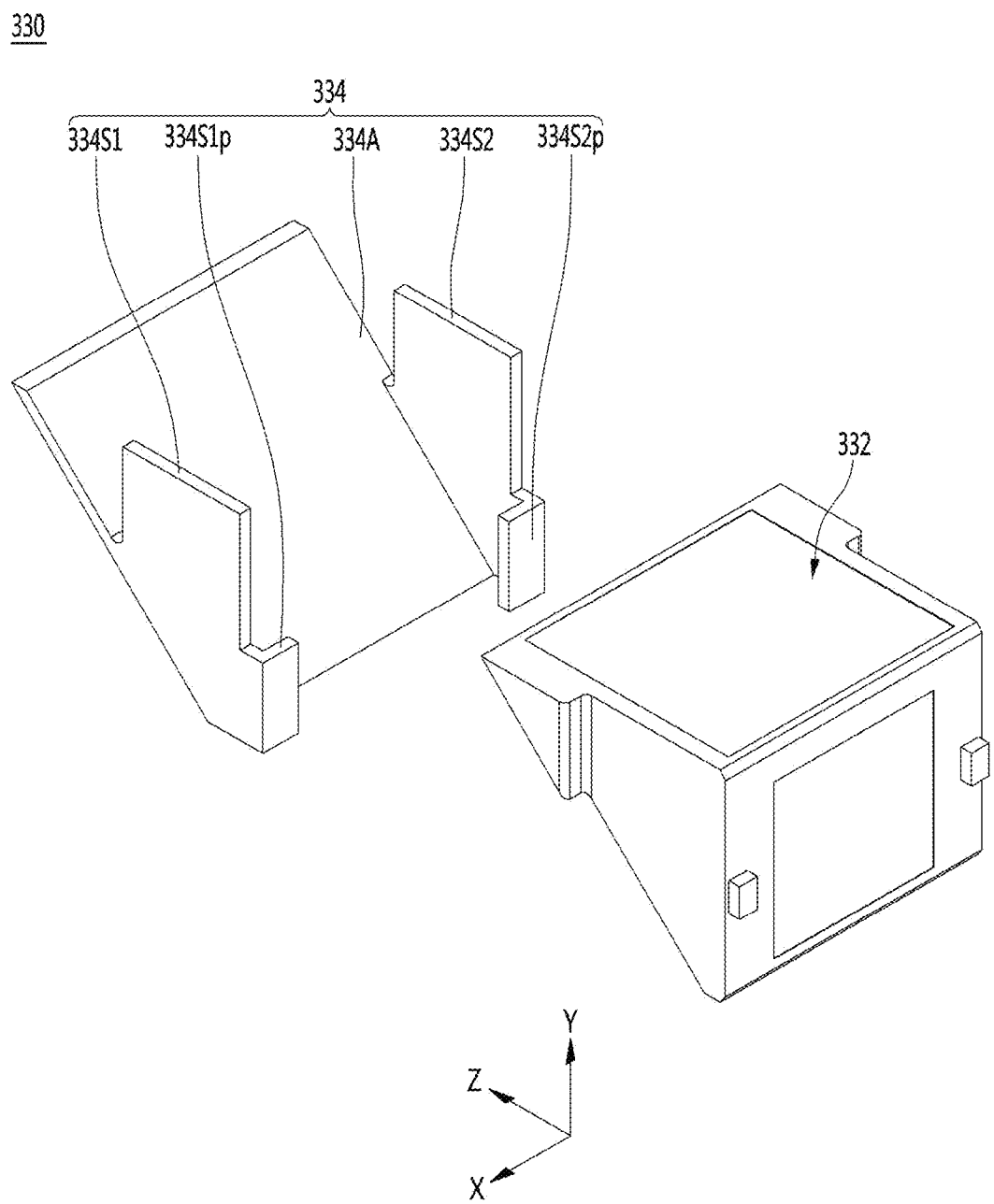
FIG. 24B is an exploded perspective view in a first direction of the prism unit shown in FIG. 24A.

FIG. 24A is a perspective view of the prism unit 330 in the second camera actuator 300 shown in FIG. 23, and FIG. 24B is a first direction, for example, an exploded perspective view of the prism unit 330 shown in FIG. 24A.

Referring to FIG. 24B, in the second camera actuator of the embodiment, the prism unit 330 may include a prism mover 334 having a seating portion 334A, and a prism 332 disposed on the seating portion 334A of the prism mover 334. The prism 332 may be a reflective part, and may be a right-angle prism, but is not limited thereto.

The prism mover 334 may include a plurality of outer surfaces. For example, the prism mover 334 may include a first outer surface 334S1 and a second outer surface 334S2 extending upward from both edges of the seating portion 334A having an inclined surface.

In addition, the first outer surface 334S1 of the prism mover 334 may include a first rotation guide 334P1, and the second outer surface 334S2 may include a second rotation guide 334P2.

The prism 332 may be stably seated and fixed on the prism mover 334 by the first rotation guide 334P1 and the second rotation guide 334P2.

Figure 25:
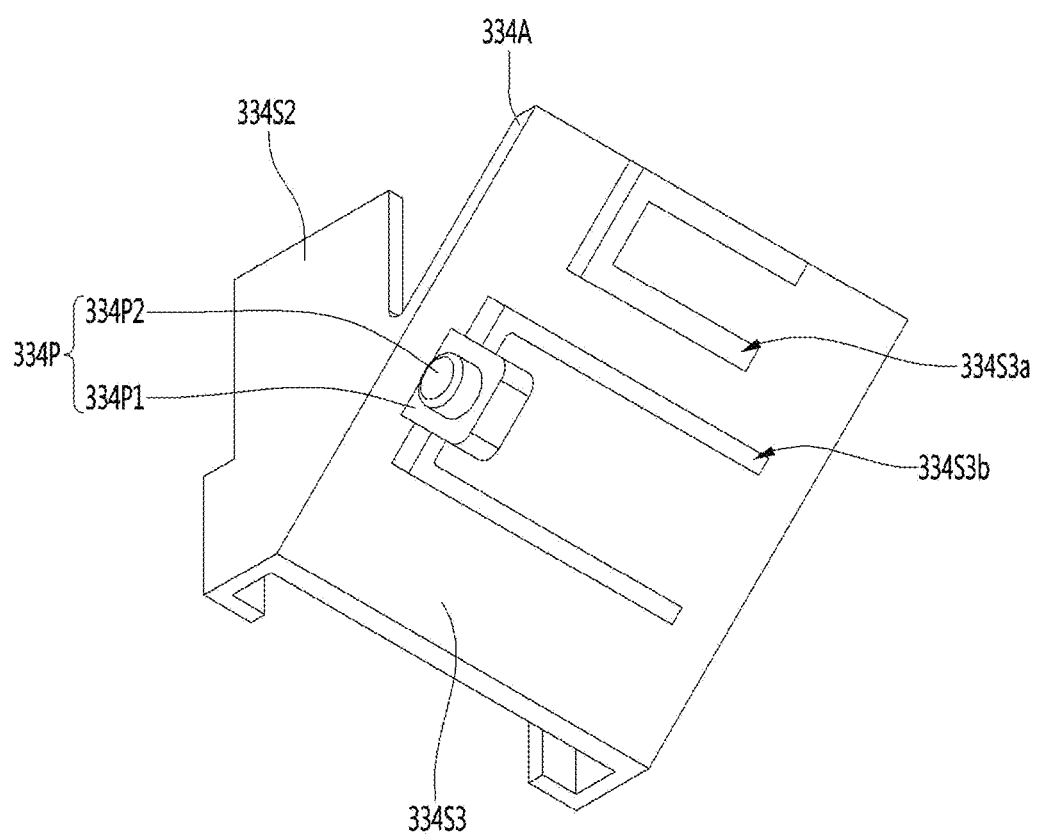
FIG. 25 is a perspective view in a second direction of the prism mover in the prism unit shown in FIG. 24B.

Next, FIG. 25 is a second direction perspective view of the prism mover 334 in the prism unit shown in FIG. 24B.

Referring to FIG. 25, the prism mover 334 may include a third outer surface 334S3 between the first outer surface 334S1 and the second outer surface 334S2, and a rotation guide (334P) may be disposed at the third outer surface 334S3.

The rotation guide 334P may include a first rotation guide 334P1 and a second rotation guide 334P2. The first rotation guide 334P1 may extend and protrude in a vertical direction from the third outer surface 334S3, and the second rotation guide 334P2 may extend and protrude in a vertical direction from the first rotation guide 334P1.

The second rotation guide 334P2 may function as a rotation shaft. For example, the second rotation guide 334P2 may be coupled to a first rotation hole 342R1 of a second rotation unit 342 to be described later so that the prism unit 330 can be rotated or tilted. (See FIGS. 26I and 26J).

Referring back to FIG. 25, the third outer surface 334S3 of the prism mover may include a third-first seating portion 334S3a and a third-second seating portion 334S3b. A fourth magnet 322M4 and a first magnet 322M1 may be disposed on the third-first seating portion 334S3*a* and the third-second seating portion 334S3*b*, respectively (refer to FIG. 26I).

According to the embodiment, by controlling the rotation of the prism unit 330 to the first axis or the second axis by the electromagnetic force between the magnet arranged on the prism mover 334 and the coil unit arranged on the housing, any occurrence of a decent or a tilt phenomenon can be minimized while the OIS is implemented, so there is a technical effect that can produce the best optical properties.

Figure 26A:
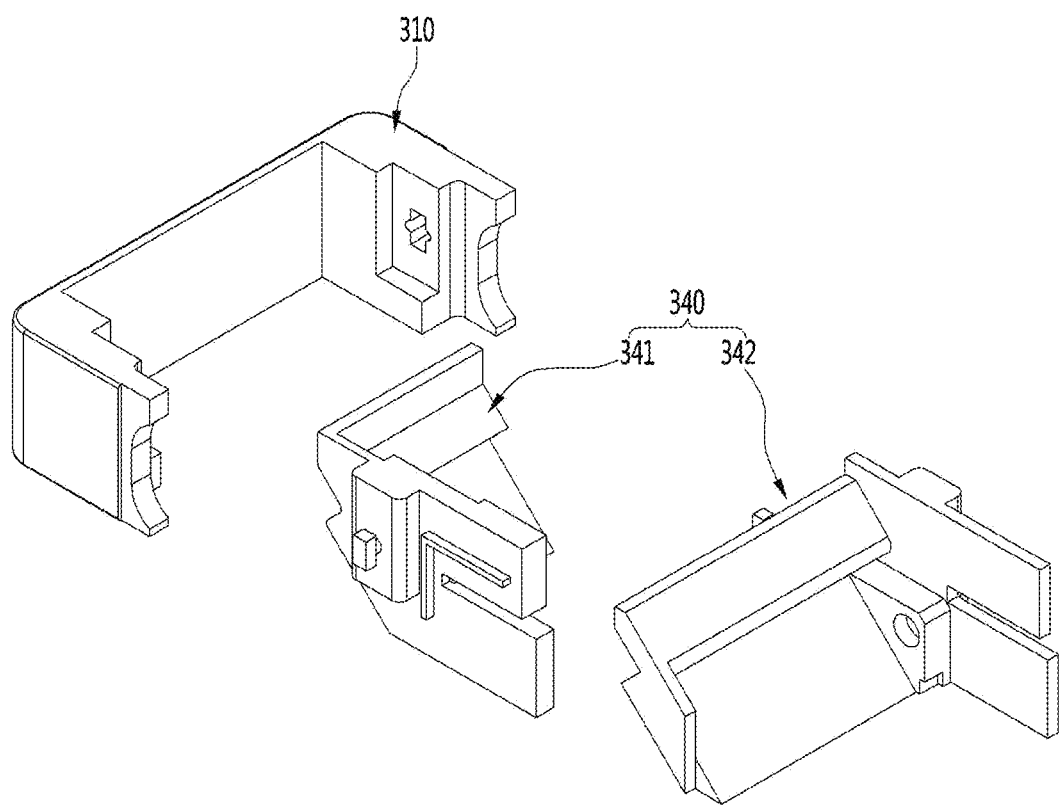
FIG. 26A is an exploded perspective view of a housing and a rotation unit in the second camera actuator shown in FIG. 23.
Figure 26B:
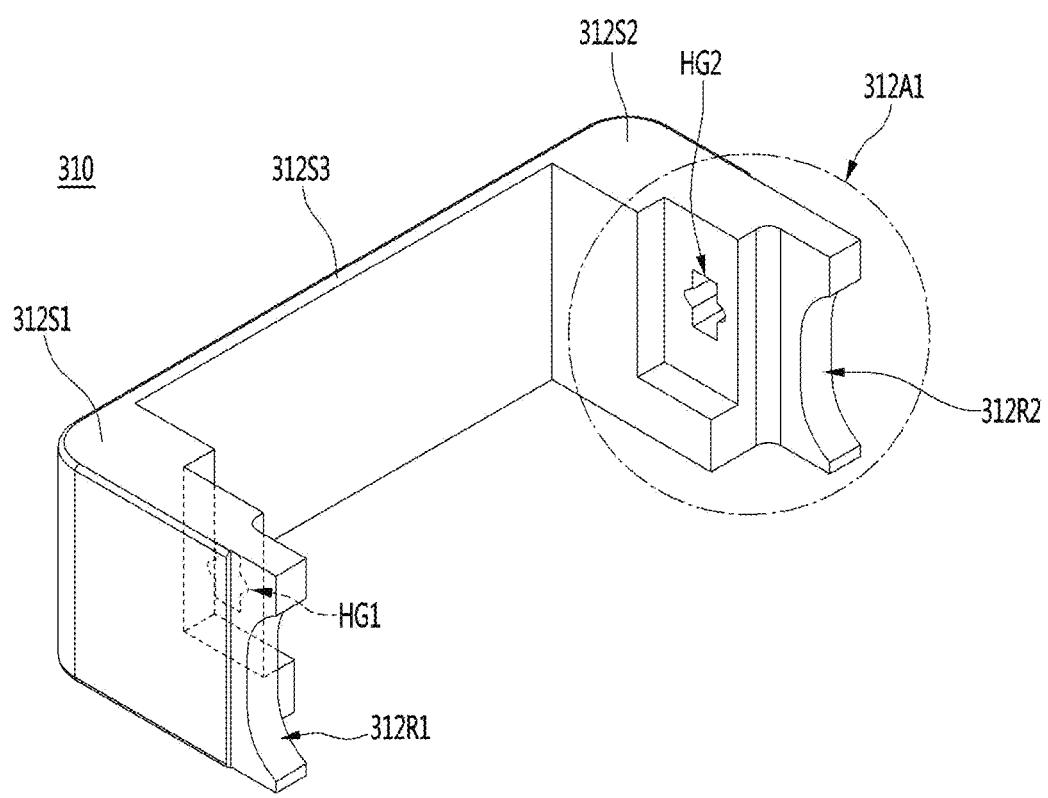
FIG. 26B is a detailed perspective view of the housing shown in FIG. 26A.

Next, FIG. 26A is an exploded perspective view of the housing 310 and the rotation unit 340 in the second camera actuator shown in FIG. 23, and FIG. 26B is a detailed perspective view of the housing 310 shown in FIG. 26A.

Referring to FIG. 26B, the housing 310 of the embodiment may include a single or a plurality of housing sides 312S1, 312S2, 312S3.

For example, the housing 310 may include a first housing side portion 312S1, a second housing side portion 312S2, and a third housing side portion 312S3 disposed between the first and second housing sides 312S1, 312S2.

In an embodiment, the first housing side portion 312S1 of the housing may have a first housing recess 312R1, and the second housing side portion 312S2 may have a second housing recess 312R2.

A second coil unit 323C2 and a third coil unit 323C3 to be described later may be respectively disposed in the first housing recess 312R1 and the second housing recess 312R2 (see FIGS. 27 and 30B)

Continuing to refer to FIG. 26B, the first housing side portion 312S1 may include a first hinge groove HG1, and the second housing side portion 312S2 may include a second hinge groove HG2.

A first hinge shaft 341B of a first rotation unit 341 to be described later may be coupled to the first hinge groove HG1 (see FIGS. 26E and 30B), and a second hinge shaft 342B of the second rotation unit 342 to be described later may be coupled to the second hinge groove HG2 (see FIGS. 26K and 30B).

According to the embodiment, electromagnetic force between the magnet disposed on the prism mover 334 and the coil unit disposed on the housing 310 may be generated. By this electromagnetic force, rotation of the prism unit 330 in the first axis direction or the second axis direction may be controlled using the first rotation unit 341 and the second rotation unit 342. Accordingly, when implementing OIS, there is a technical effect of minimizing the occurrence of a decent or a tilt phenomenon to obtain the best optical characteristics.

Figure 26C:
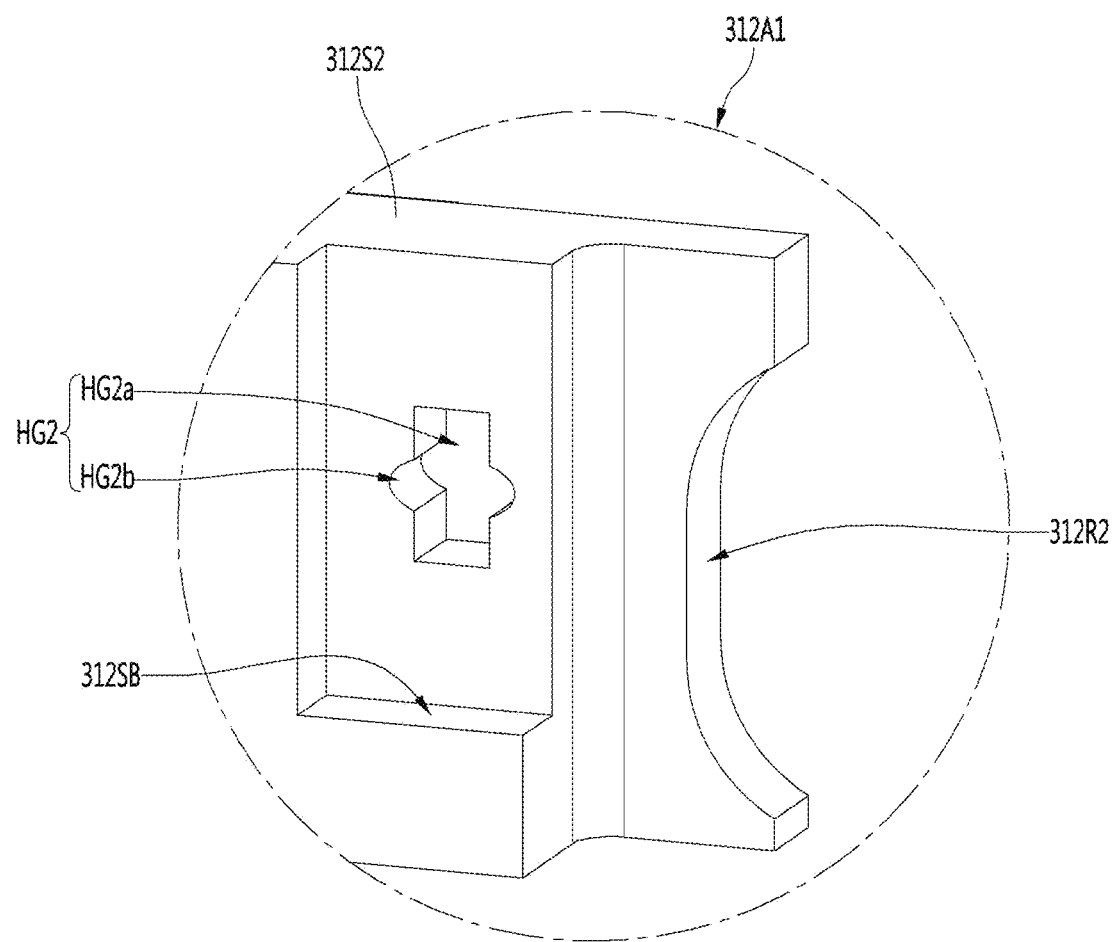
FIG. 26C is a detailed view of the first housing area shown in FIG. 26B.

Next, FIG. 26C is a detailed view of the first housing area 312A1 shown in FIG. 26B.

Referring to FIG. 26C, the second housing side portion 312S2 of the housing may include a second hinge groove HG2 in the second recess region 312SB, and the second hinge groove HG2 may include a second-first hinge groove HG2*a* and a second-second hinge groove HG2*b*.

The second-first hinge groove HG2*a* may extend in a first axial direction and have a rectangular cross-section, and the second-second hinge groove HG2*b* may extend in a second axial direction perpendicular to the fist axial direction. Both ends may have a circular or hemispherical cross-section.

Figure 30A:
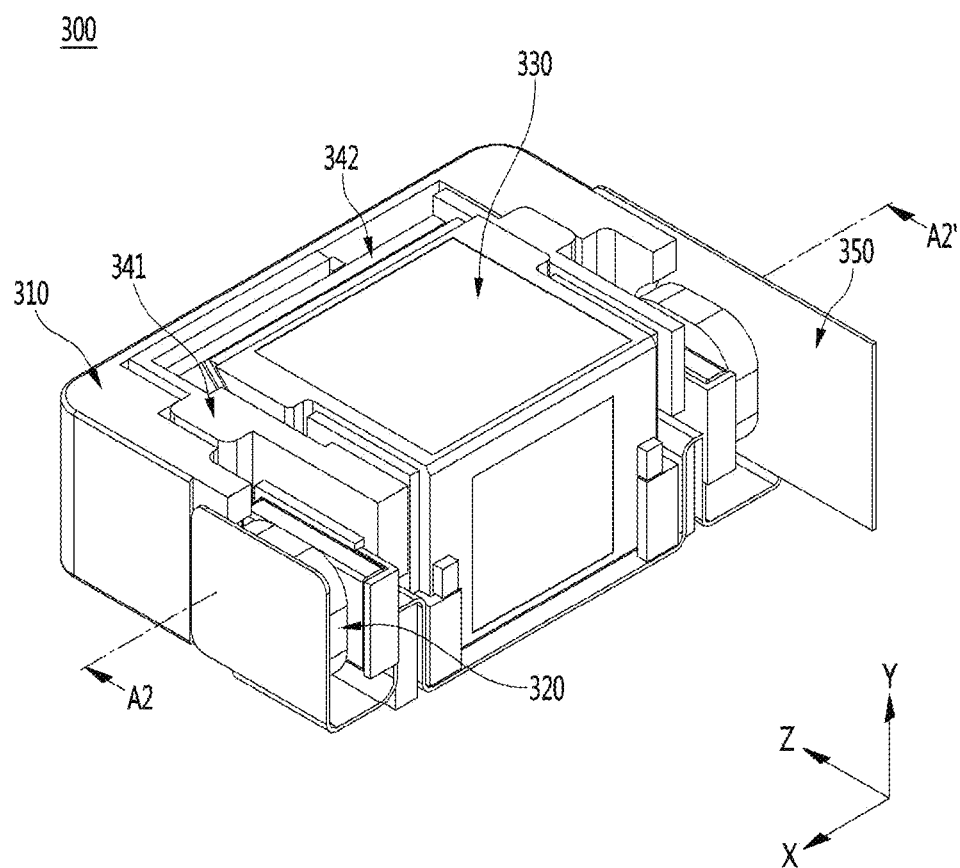
FIG. 30A is a perspective view of the second camera actuator shown in FIG. 21.
Figure 30B:
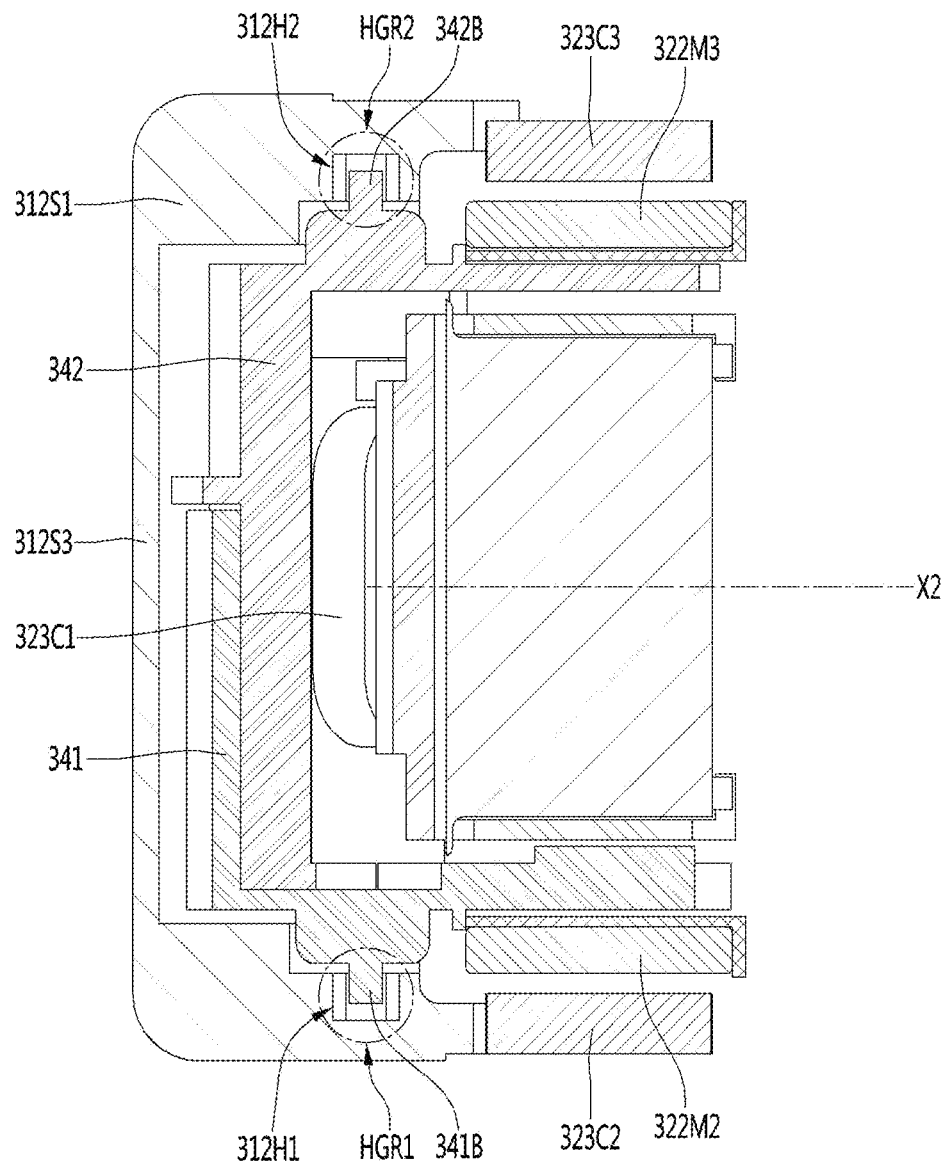
FIG. 30B is a cross-sectional view in the second axial direction of the second camera actuator shown in FIG. 30A.

Referring briefly to FIG. 30B, the second hinge shaft 342B of the second rotation unit 342 may be coupled to the second hinge groove HG2.

In FIG. 30B, a region in which the second hinge shaft 342B is coupled to the second hinge groove HG2 may be referred to as a second hinge region HGR2. Meanwhile, a region in which the first hinge shaft 341B is coupled to the first hinge groove HG1 may be referred to as a first hinge region HGR1.

Figure 30C:
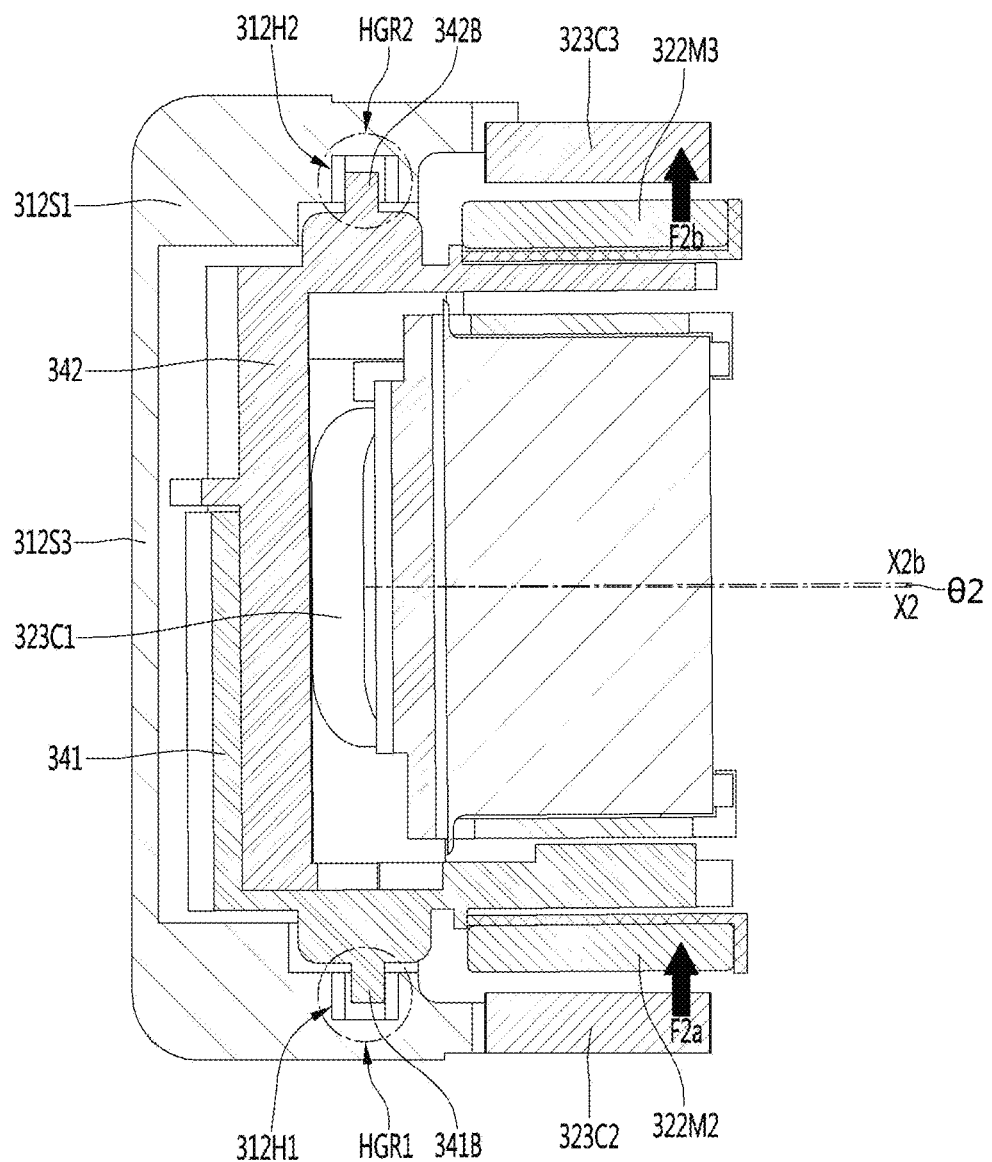
FIG. 30C is an exemplary view of the rotation of the second camera actuator shown in FIG. 30B.

Referring to FIG. 30C, the first rotation unit 341 and the second rotation unit 342 can be rotated or tilted in the second axial direction, for example, the X-axis direction by the first hinge region HGR1 and the second hinge region HGR2, and accordingly, the prism unit 330 may be rotated or tilted in the second axis direction.

According to the embodiment, the first rotation unit 341 and the second rotation unit 342 of the prism unit 330 can be controlled in the second axis direction, for example, in the X axis direction by electromagnetic force between the magnet disposed on the prism mover 334 and the coil unit disposed on the housing 310. Accordingly, when implementing OIS, there is a technical effect of minimizing the occurrence of a decent or a tilt phenomenon to obtain the best optical characteristics.

Figure 26D:
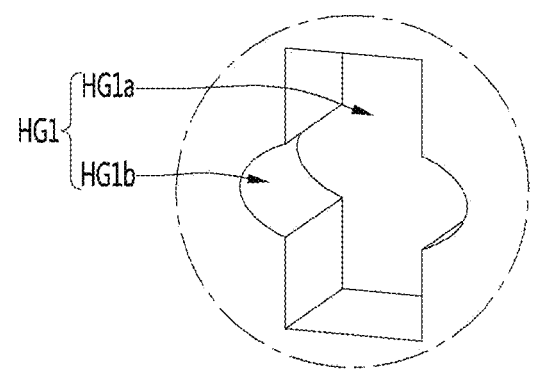
FIG. 26D is a detailed view of the first hinge groove shown in FIG. 26B.

Next, FIG. 26D is a detailed view of the first hinge groove HG1 shown in FIG. 26B.

Referring to FIG. 26D, the first housing side portion 312S1 may include a first hinge groove HG1, and the first hinge groove HG1 may include a first-first hinge groove HG1*a* and a first-second groove HG1*b*.

The first-first hinge groove HG1*a* may extend in a fist axial direction and have a rectangular cross-section, and the first-second hinge groove HG1*b* extends in a second axial direction perpendicular to the first axial direction. Both ends may have a circular or hemispherical cross-section.

Referring to FIG. 30B, the first hinge shaft 341B of the first rotation unit 341 may be coupled to the first hinge groove HG1, and the coupled area will be referred to as a first hinge area HGR1.

Figure 26E:
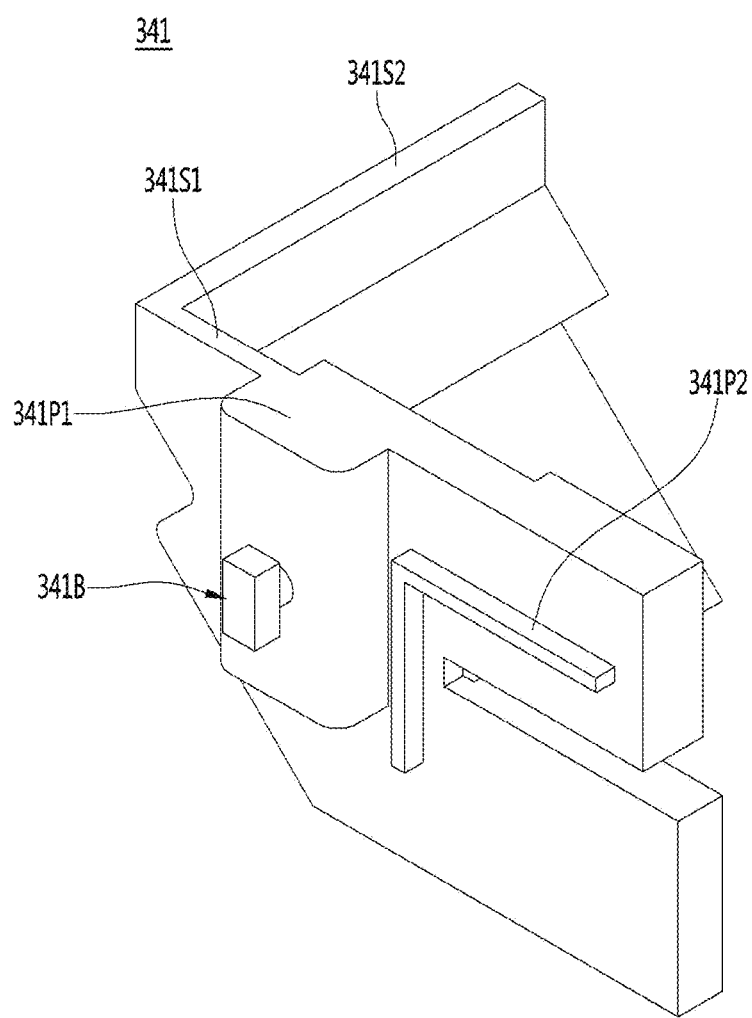
FIG. 26E is a detailed perspective view of the first rotation unit shown in FIG. 26A.

Next, FIG. 26E is a detailed perspective view of the first rotation unit 341 shown in FIG. 26A.

The first rotation unit 341 may include a first-first rotation side part 341S1 and a first-second rotation side part 341S2. The first-second rotation side part 341S2 may extend in a direction perpendicular to the first-first rotation side part 341S1 and may include an inclined surface. A portion of the prism mover 334 may be seated on an inclined surface of the first-second rotation side part 341S2.

The first-first rotation side part 341S1 of the first rotation unit 341 may include a first-first rotation protrusion part 341P1 and a first-second rotation protrusion part 341P2.

A first hinge shaft 341B may be disposed on the first-first rotation protrusion 341P1, and a second magnet 322M2 and a second yoke 324Y2 to be described later may be provided on the first-second rotation protrusion 341P2 (see FIG. 30B).

Figure 26F:
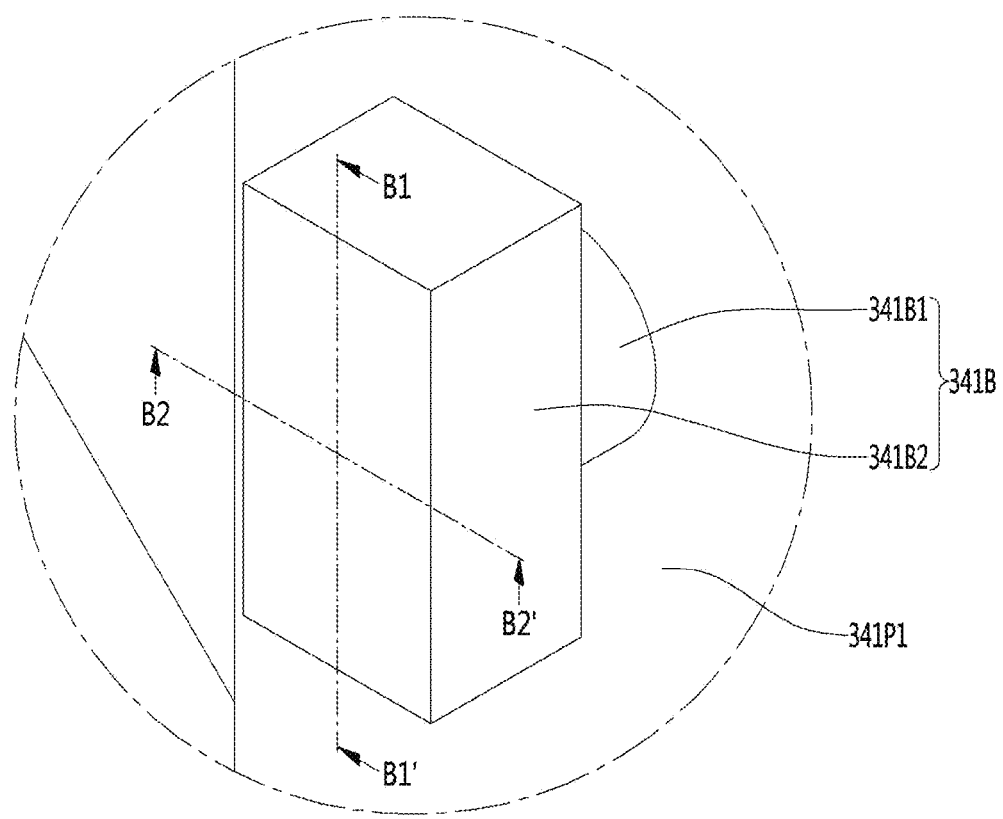
FIG. 26F is a detailed view of the first hinge guide of the first rotation unit shown in FIG. 26E.

Next, FIG. 26F is a detailed view of the first hinge shaft 341B of the first rotation unit 341 shown in FIG. 26E.

The first hinge shaft 341B of the first rotation unit 341 may include a first-first hinge shaft 341B1 and a first-second hinge shaft 341B2 extending and protruding from the first-first rotation protrusion 341P1.

The cross-section of the first-first hinge shaft 341B1 may have a circular cross-section, and the cross-section of the first-second hinge shaft 341B2 may have a rectangular cross-section, but is not limited thereto.

A width of a circular cross-section of the first-first hinge shaft 341B1 may be smaller than a width of a rectangular cross-section of the first-second hinge shaft 341B2.

A first hinge shaft 341B of the first rotation unit 341 may be coupled to the first hinge groove HG1.

Figure 26G:
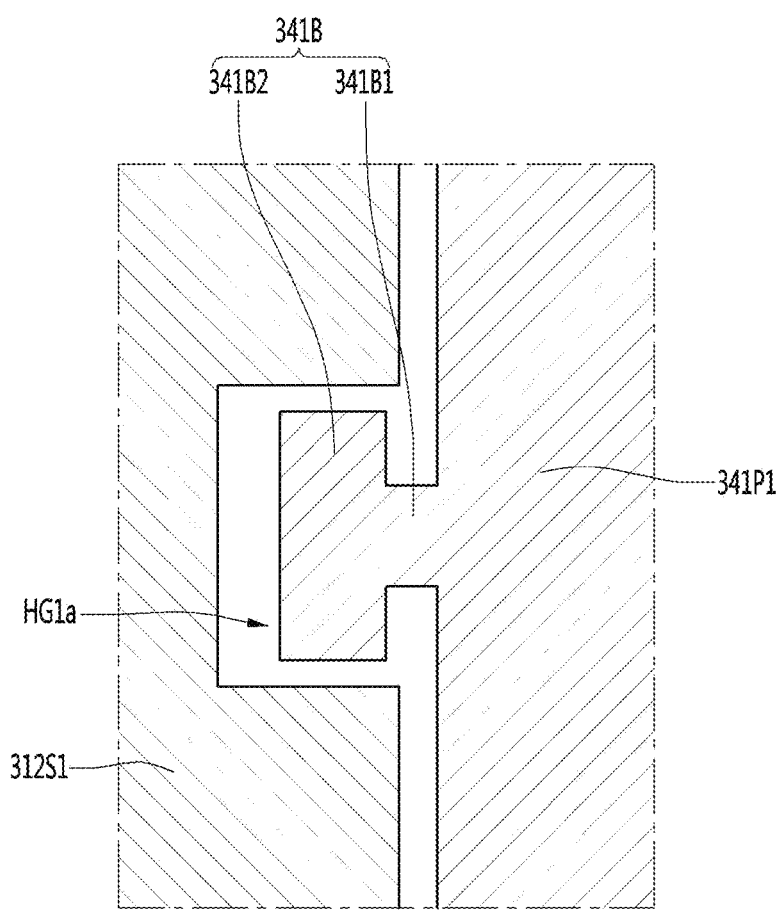
FIG. 26G is a cross-sectional view taken along line B1-B1' in a state in which the first hinge guide shown in FIG. 26F and the first-first hinge groove shown in FIG. 26D are coupled.

Specifically, FIG. 26G is a cross-sectional view taken along line B1-B1' in a state in which the first hinge shaft 341B shown in FIG. 26F and the first-first hinge groove HG1a shown in FIG. 26D are coupled.

FIG. 26D, the first hinge groove HG1 of the first housing side portion 312S1 may include a first-first hinge groove HG1a and a first-second hinge groove HG1b.

For example, a first-second hinge shaft 341B2 may be inserted into the first-first hinge groove HG1a.

The vertical width of the first-first hinge groove HG1a may be greater than the vertical width of the first-second hinge shaft 341B2.

Figure 26H:
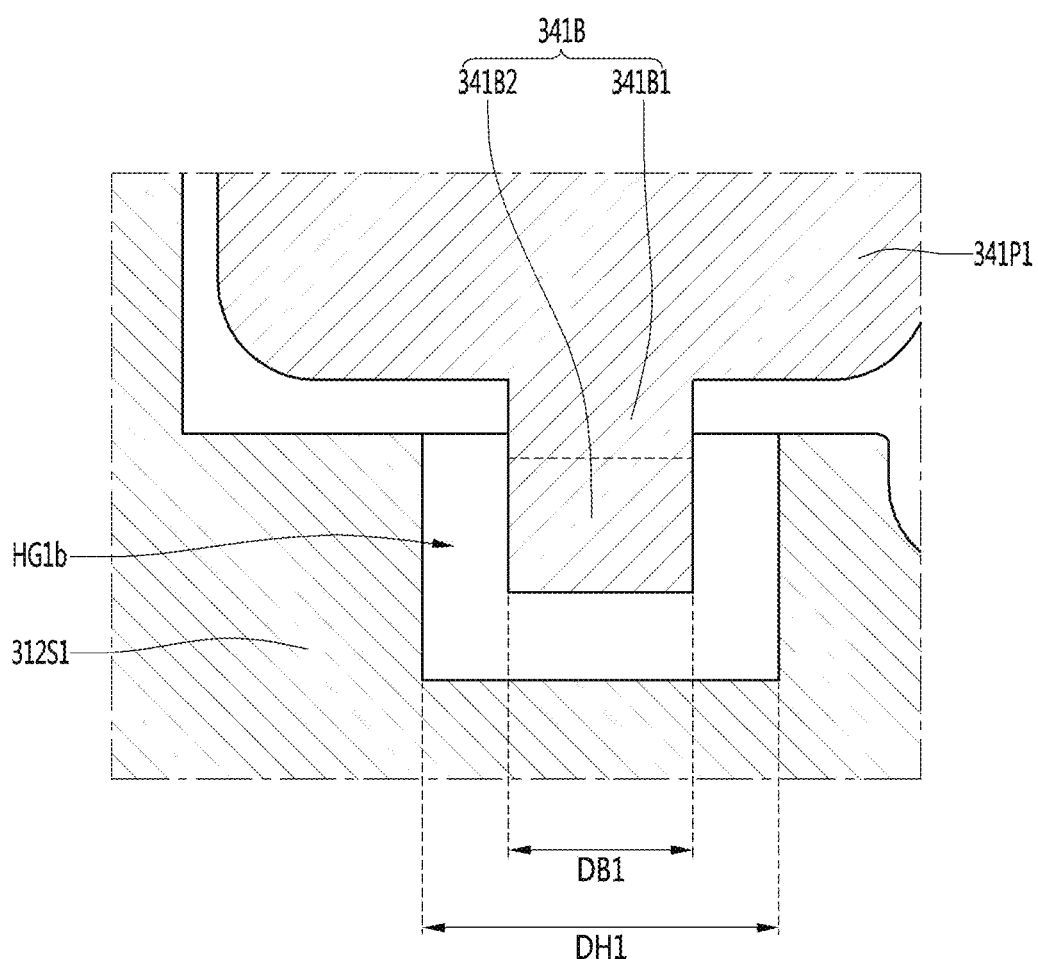
FIG. 26H is a cross-sectional view taken along line B2-B2' in a state in which the first hinge guide shown in FIG. 26G and the second hinge groove shown in FIG. 26D are coupled.

Also, FIG. 26H is a cross-sectional view taken along line B2-B2' in the coupled state between the first hinge shaft 341B shown in FIG. 26G and the first-second hinge groove HG1b shown in FIG. 26D (see first hinge area HGR1 in FIG. 30B).

Referring back to FIG. 26H, the horizontal width DH1 of the first-second hinge groove HG1b may be greater than the horizontal width DB1 of the first-second hinge shaft 341B2.

In an exemplary embodiment, the horizontal width DB1 of the first-second hinge shaft 341B2 may be equal to or greater than the horizontal width DB1 of the first-first hinge shaft 341B1.

According to the embodiment, as the horizontal width DH1 of the first-second hinge groove HG1b is controlled to be greater than the horizontal width DB1 of the first-second hinge shaft 341B2, the first rotation unit 341 may be tilted or rotated in the second axis direction.

For example, referring to FIG. 30C, the first rotation unit 341 and the second rotation unit 342 can be rotated or tilted in the second axial direction, for example, in the X-axis direction, by the first hinge region HGR1 and the second hinge region HGR2. Accordingly, the prism unit 330 may be rotated or tilted in the second axis direction.

According to the embodiment, the first rotation unit 341 and the second rotation unit 342 of the prism unit 330 can be controlled to rotate in the second axis direction, for example, in the X axis direction by electromagnetic force between the magnet disposed on the prism mover 334 and the coil unit disposed on the housing 310. Accordingly, when implementing OIS, there is a technical effect of minimizing the occurrence of a decent or a tilt phenomenon to obtain the best optical characteristics.

Figure 26I:
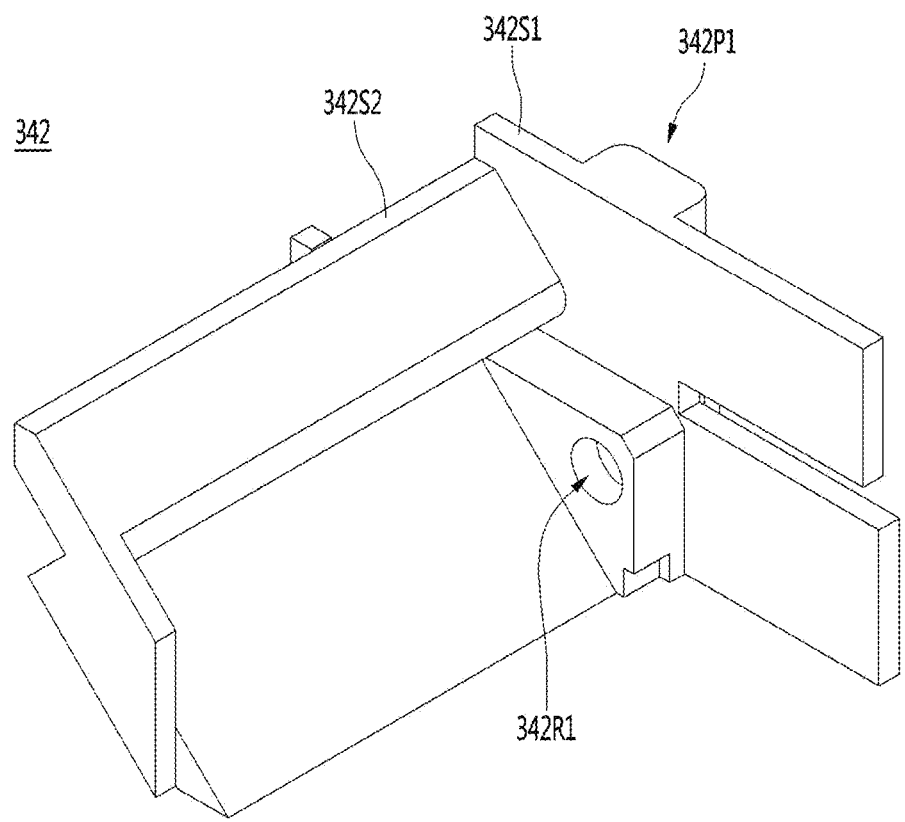
FIG. 26I is a detailed view of the second rotation unit shown in FIG. 26A.
Figure 26J:
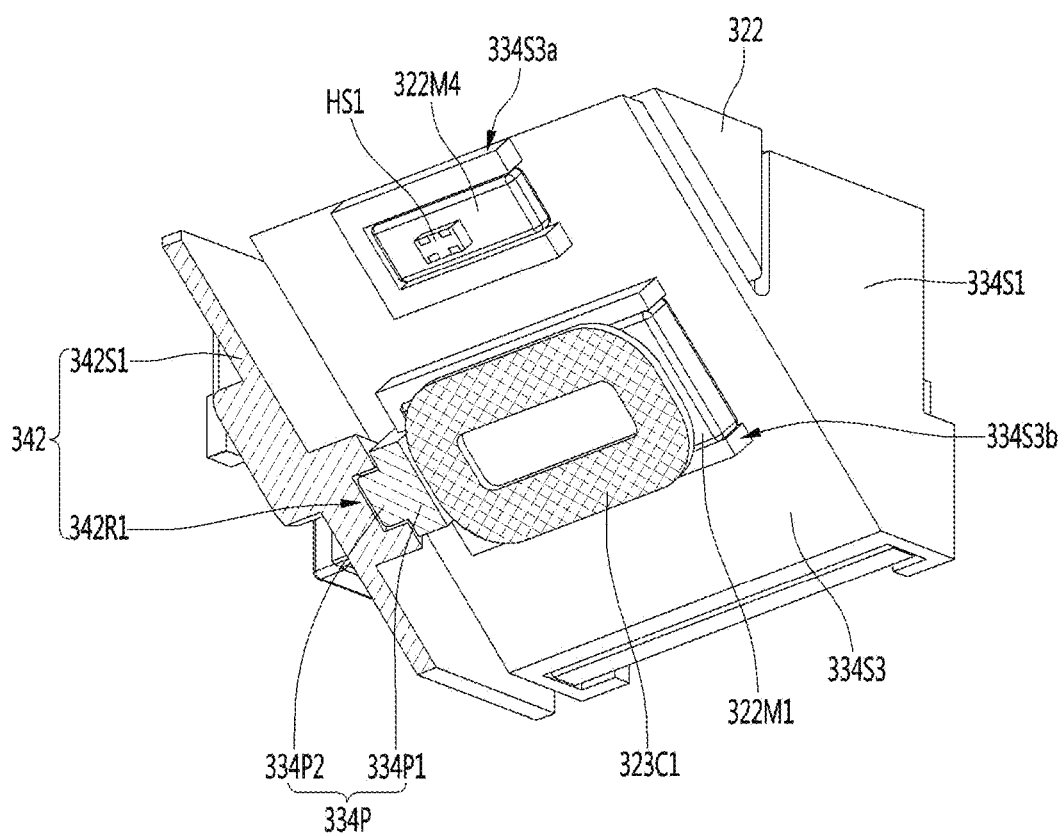
FIG. 26J is a perspective view in which the prism unit 340 and a part of the driving unit are coupled to the second rotation unit shown in FIG. 26I.

Next, FIG. 26I is a detailed view of the second rotation unit 342 shown in FIG. 26A, and FIG. 26J is a perspective view in which the prism unit 340 and a part of the driving unit are coupled to the second rotation unit 342 shown in FIG. 26I. FIG. 26K is a second direction detail view of the second rotation unit 342 shown in FIG. 26I.

Figure 26K:
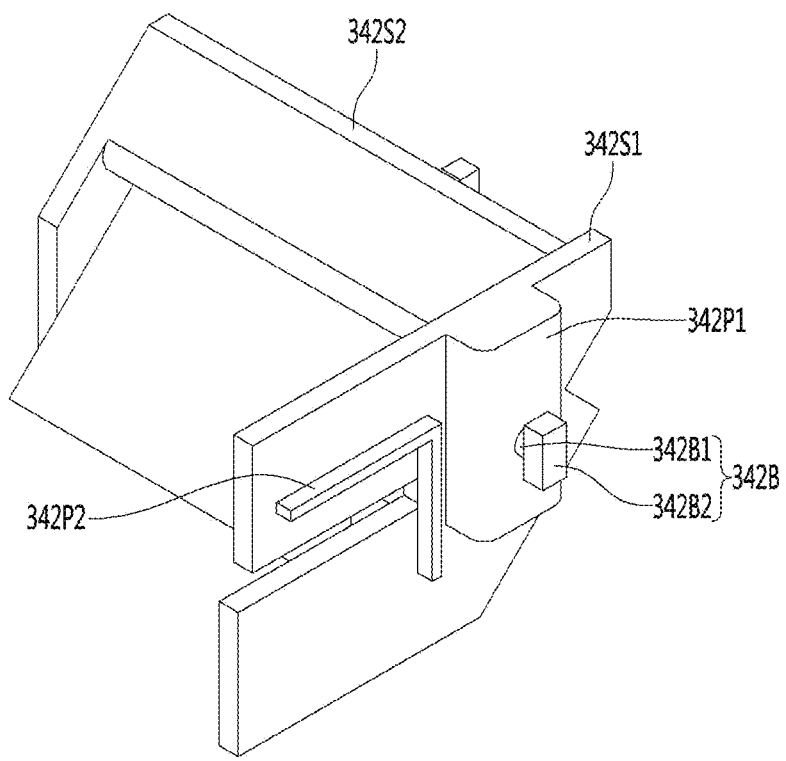
FIG. 26K is a second direction detail view of the second rotation unit shown in FIG. 26I.

Firstly referring to FIG. 26K, the second rotation unit 342 may include a second-first rotation side part 342S1 and a second-second rotation side part 342S2. The second-second rotation side part 342S2 may extend in a direction perpendicular to the second-second rotation side part 342S1 and may include an inclined surface. A portion of the prism mover 334 may be seated on an inclined surface of the second-second second rotation side part 342S2.

The second-first rotation side part 342S1 of the second rotation unit 342 may include a second-first rotation protrusion part 342P1 and a second-second rotation protrusion part 342P2.

A second hinge shaft 342B may be disposed on the second-first rotation protrusion 342P1, and a third magnet 322M3 and a third yoke 324Y3 to be described later may be provided on the second-second rotation protrusion 342P2 (see FIG. 30B).

Referring to FIG. 26K, the second hinge shaft 342B of the second rotation unit 342 may include a second-first hinge shaft 342B1 and a second-second hinge shaft 342B2 extending and protruding from the second-first rotation protrusion 342P1.

The cross-section of the second-first hinge shaft 342B1 may be a circular cross-section, and the cross-section of the second-second hinge shaft 342B2 may have a quadrangular cross-section, but is not limited thereto.

A width of a circular cross-section of the second-first hinge shaft 342B1 may be smaller than a width of a rectangular cross-section of the second-second hinge shaft 342B2.

In the embodiment, the second hinge shaft 342B of the second rotation unit 342 may be coupled to the second hinge groove HG2 of the housing shown in FIG. 26C.

Referring briefly to FIG. 26C, the second hinge groove HG2 of the second housing side portion 312S2 may include a second-first hinge groove HG2a and a second-second hinge groove HG2b. The second-second hinge shaft 342B2 may be inserted into the second-first hinge groove HG2a, and the second-first hinge shaft 342B1 may be inserted into the second-second hinge groove HG2b.

Referring briefly to FIG. 30C, a region in which the second hinge shaft 342B of the second rotation unit 342 is coupled to the second hinge groove HG2 of the housing may be referred to as a second hinge region HGR2.

According to the embodiment, the first rotation unit 341 and the second rotation unit 342 can be rotated or tilted in the second axial direction, for example, in the X-axis direction by the first hinge region HGR1 and the second hinge region HGR2 and accordingly, the prism unit 330 may be rotated or tilted in the second axis direction.

According to the embodiment, the first rotation unit 341 and the second rotation unit 342 of the prism unit 330 can be controlled the rotation in the second axis direction, for example, in the X axis direction by electromagnetic force between the magnet disposed on the prism mover 334 and the coil unit disposed on the housing 310

Next, FIG. 26J is a perspective view in which the prism unit 340 and a part of the driving unit are coupled to the second rotation unit shown in FIG. 26I, and as shown in FIG. 26I, the second rotation unit 342 may include a first rotation hole 342R1 provided inside the a second-first rotation side 342S1.

Referring to FIG. 26J, the prism mover 334 may include a rotation guide 334P (see FIG. 25), and the second rotation guide 334P2 of the rotation guide 334P can function as a rotation shaft, and the prism unit 330 may be rotated or tilted by being coupled to the first rotation hole 342R1 of the second rotation unit 342.

For example, the prism unit 330 may be tilted in the first axis direction (see FIGS. 29B and 29C) by electromagnetic force between the first magnet 322M1 disposed on the third-second seating portion 334S3b of the prism mover and the first coil part 323C1 disposed on the second circuit board 350.

Driving may be controlled through position sensing between the fourth magnet 322M4 disposed on the third-first seating portion 334S3a and the first Hall sensor HS1 disposed on the second circuit board 350.

According to the embodiment, the rotation guide 334P of the prism unit 330 can be rotatably coupled to the first rotation hole 342R1 of the second rotation unit 342 to move the prism unit 330 in the first axial direction, for example, it may be rotated or tilted in the Y-axis direction.

According to the embodiment, by controlling the rotation of the prism unit 330 in the first axial direction, for example, in the Y-axis direction, by electromagnetic force between the magnet arranged in the prism mover 334 and the coil unit arranged in the housing 310. So when implementing OIS, there is a technical effect of minimizing the occurrence of a decent or a tilt phenomenon to produce the best optical characteristics.

In addition, the technical features from another viewpoint of the camera actuator according to the embodiment are described with reference to FIGS. 26A to 26K as follows, and when other terms from the technical configuration terms described above are described, it can be interpreted as various features of the invention.

The camera actuator according to the embodiment may include a housing 310, a prism unit 330 disposed in the housing 310, a driving unit 320 for tilting the prism unit 330, and a rotation guide part 340 surrounding the prism unit 330.

The rotation guide unit 340 may include a first rotation guide 341 and a second rotation guide 342 coupled to the first rotation guide 341.

The first rotation guide 341 may include a first protrusion 341B, and the second rotation guide 342 may include a prism mover recess and a second protrusion 342B.

The prism unit 330 may include a prism 332 and a prism mover 334,

The prism mover 334 may include an inclined surface on which the prism is seated. In addition, the inclined surface may include magnet seating portions 334S3a and 334Sb on a surface opposite to the surface 334A on which the prism is mounted. Also, the prism mover 334 may include a prism mover protrusion 334P that is seated in the prism mover recess of the second rotation guide 342 from the magnet seating portion to rotate the prism unit around a first axis.

The housing 310 may include a first sidewall 312S1 and a second sidewall 312S2 opposite to the first sidewall 312S1, and the first sidewall 312S1 may include a first recess HG1 accommodating the first protrusion 341B and the second sidewall 312S2 may include a second recess HG2 accommodating the second protrusion 342B.

The movement of the first protrusion 341B and the second protrusion 342B with respect to the first recess HG1 and the second recess HG2 may rotate the prism unit about the second axis.

Figure 27:
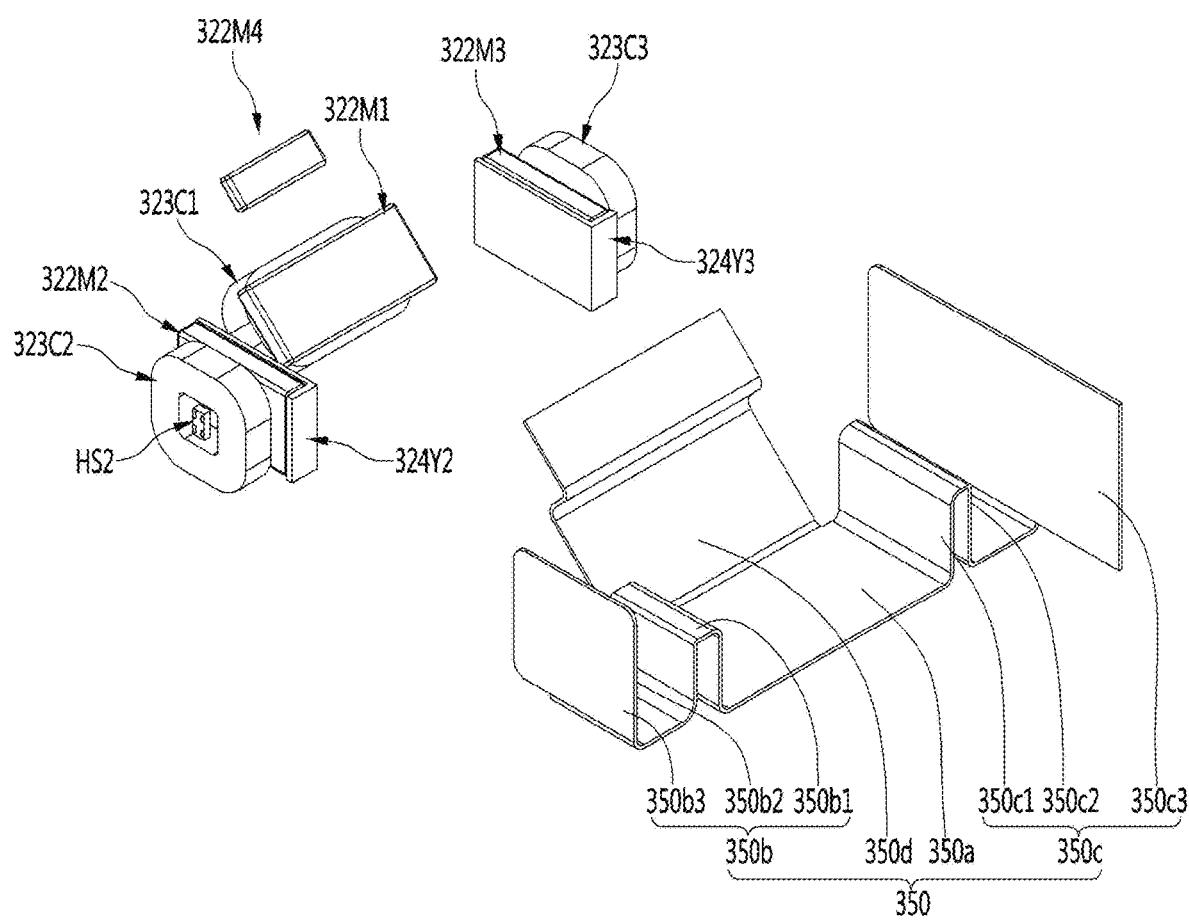
FIG. 27 is an exploded perspective view in a first direction of a driving unit and a second circuit board in the second camera actuator shown in FIG. 23.
Figure 28:
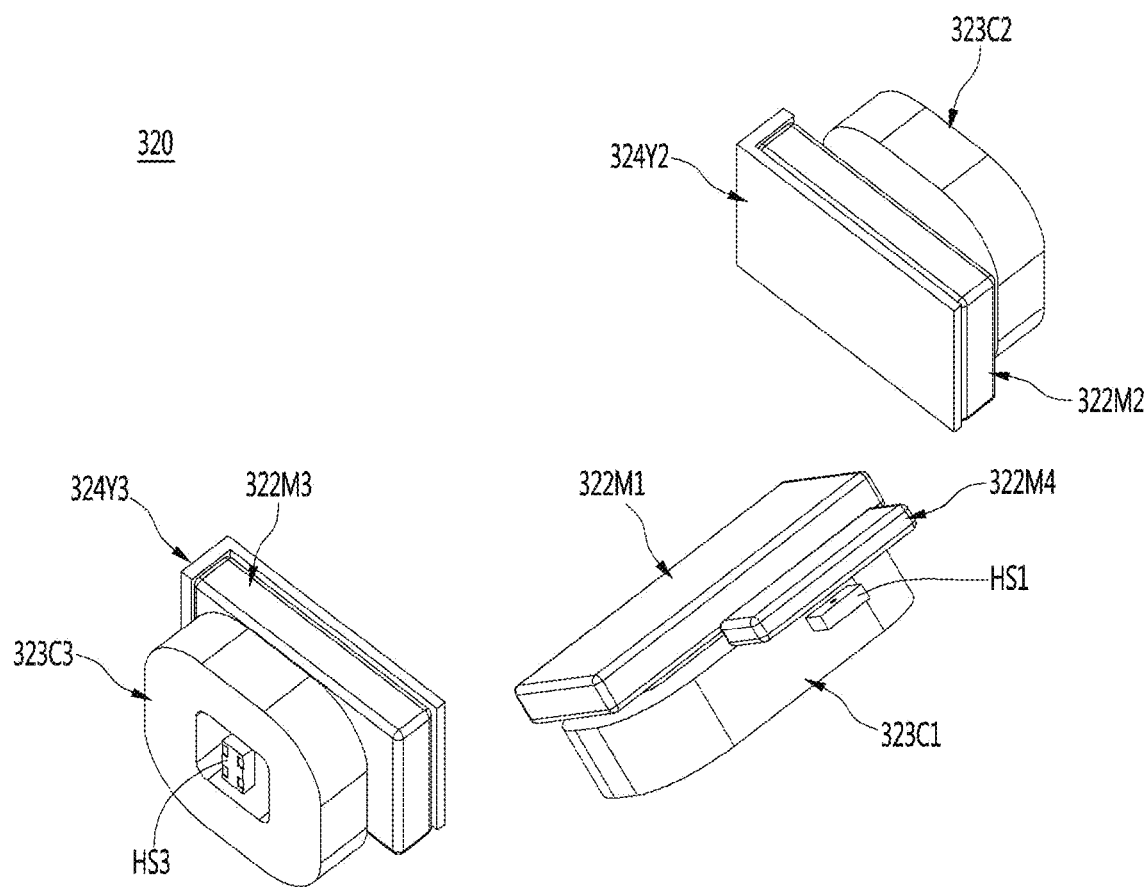
FIG. 28 is an exploded perspective view in a second direction of the driving unit shown in FIG. 27.

Next, FIG. 27 is an exploded perspective view in the first direction of the driving unit 320 and the second circuit board 350 in the second camera actuator shown in FIG. 23. And FIG. 28 is an exploded perspective view in a second direction of the driving unit 320 shown in FIG. 27.

First, referring to FIG. 27, in the embodiment, the second circuit board 350 may be electrically connected to a circuit board having a possible wiring pattern such as a rigid printed circuit board (Rigid PCB), a flexible printed circuit board (Flexible PCB), a rigid flexible printed circuit board (Rigid Flexible PCB), etc.

The second circuit board 350 may include a body substrate 350a, a first extended substrate 350b extending in a first direction from the body substrate 350a, a second extended substrate 350c extending in a second direction, and a third extended substrate 350d extending in a third direction.

The first extended substrate 350B, the second extended substrate 350C, and the third extended substrate 350d can respectively apply power to a second coil unit 323C2, a third coil unit 323C3, and a first coil unit 323C1 to be described later.

The first extended substrate 350b may include a first-first extension part 350b1, a first-second extension part 350b2, and a first-third extension part 350b3.

For example, the first extended substrate 350b may include the first-first extension part 350b1 extending in a vertical direction from the body substrate 350a, the first-second extension part 350b2 extending in a vertical direction from the first-first extension part 350b1, and a first-third extension part 350b3 extending in a vertical direction from the first-second extension part 350b2.

Accordingly, the extension direction of the first-second extension part 350b2 may be parallel to the extension direction of the body substrate 350a. And the extending direction of the first-first extension part 350b1 and the first-third extension part 350b3 may be perpendicular to the extending direction of the body substrate 350a, but is not limited thereto.

In addition, the second extended substrate 350c may include a second-first extension part 350c1, a second-second extension part 350c2, and a second-third extension part 350c3. For example, the second extended substrate 350c may include the second-first extension part 350c1 extending in a vertical direction from the body substrate 350a, the second-second extension portion 350c2 extending in the vertical direction in a vertical direction from the second-first extension 350c1, and a second-third extension part 350c3 extending in a vertical direction from the second-second extension part 350c2.

Accordingly, the extending direction of the second-second extension part 350c2 may be parallel to the extension direction of the body substrate 350a. And the extending direction of the second-first extension part 350c1 and the second-third extension part 350c3 may be perpendicular to the extending direction of the body substrate 350a, but is not limited thereto.

Next, referring to FIGS. 27 and 28, in the embodiment, the prism driving unit 320 can function as an OIS driving unit. In addition, the prism driving unit 320 may include a first coil unit 323C1, a second coil unit 323C2, a third coil unit 323C3, a first magnet 322M1, a second magnet 322M2, and a third magnet 322M3, a fourth magnet 322M4, and a position sensor HS. The position sensor HS may include a Hall sensor, and may include a first position sensor HS1, a second position sensor HS2, and a third position sensor HS3. In addition, the prism driver 320 may include a back yoke.

The prism driving unit 320 may include a first magnet 322M1 disposed at a position corresponding to the first coil unit 323C1, and a second magnet 322M2 disposed at a position corresponding to the second coil unit 323C2, a third magnet 322M3 disposed at a position corresponding to the third coil unit 323C3.

Also, the prism driver 320 may include a fourth magnet 322M4 at a position corresponding to the first position sensor HS1.

The first magnet 322M1 may be disposed on the third-second seating portion 334S3b of the third outer surface 334S3 of the prism mover, and the fourth magnet 322M4 may be disposed on the third-first seat portion 334S3a of the third outer surface 334S3 of the prism mover. (see FIGS. 26A-26K).

In the embodiment, the first to third magnets 322M1, 322M2, and 322M3 can function as a driving unit to form a driving force by electromagnetic force, and the fourth magnet 322M4 can sense a position together with the position sensor HS.

Figure 29A:
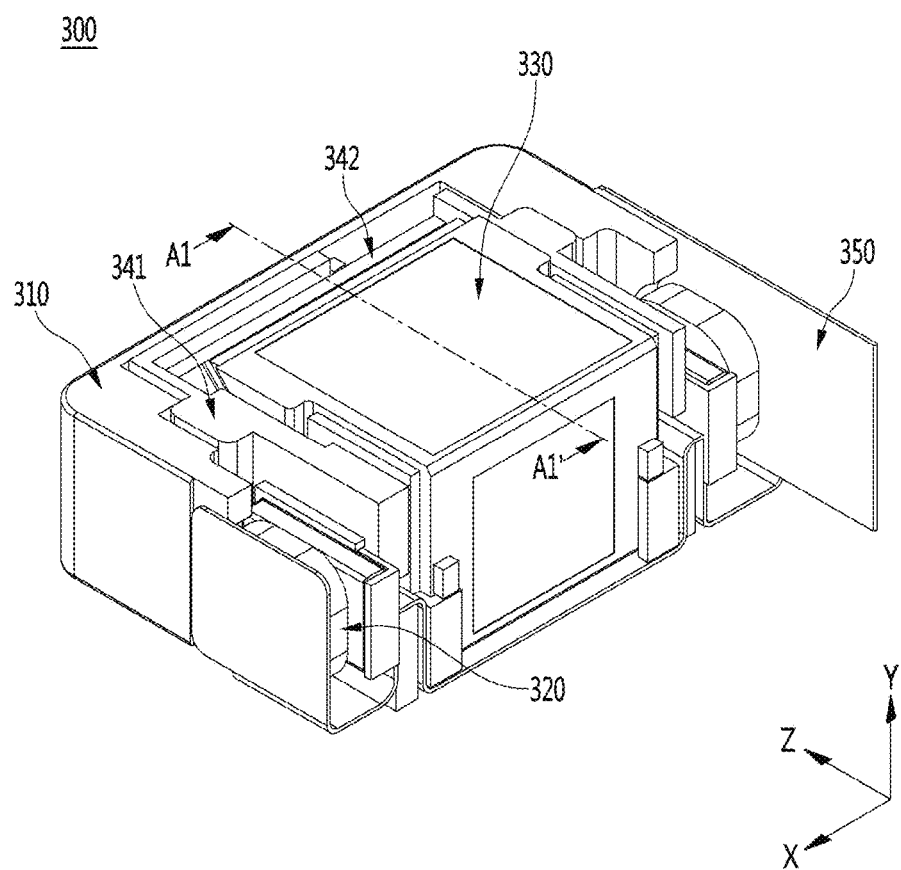
FIG. 29A is a perspective view of the second camera actuator shown in FIG. 21.
Figure 29B:
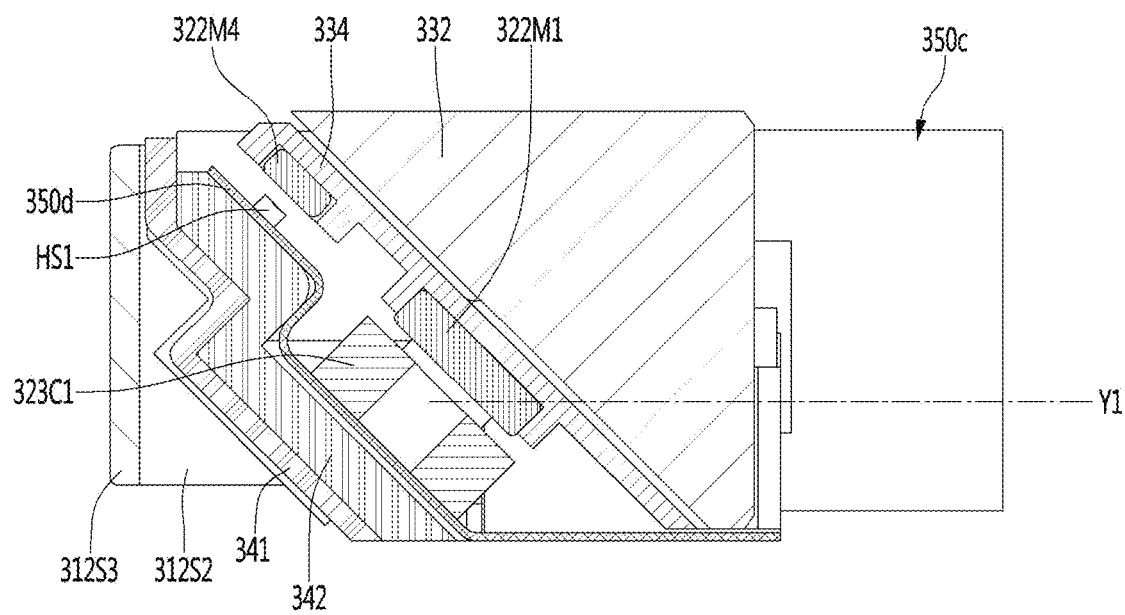
FIG. 29B is a cross-sectional view in the first axial direction of the second camera actuator shown in FIG. 29A.
Figure 29C:
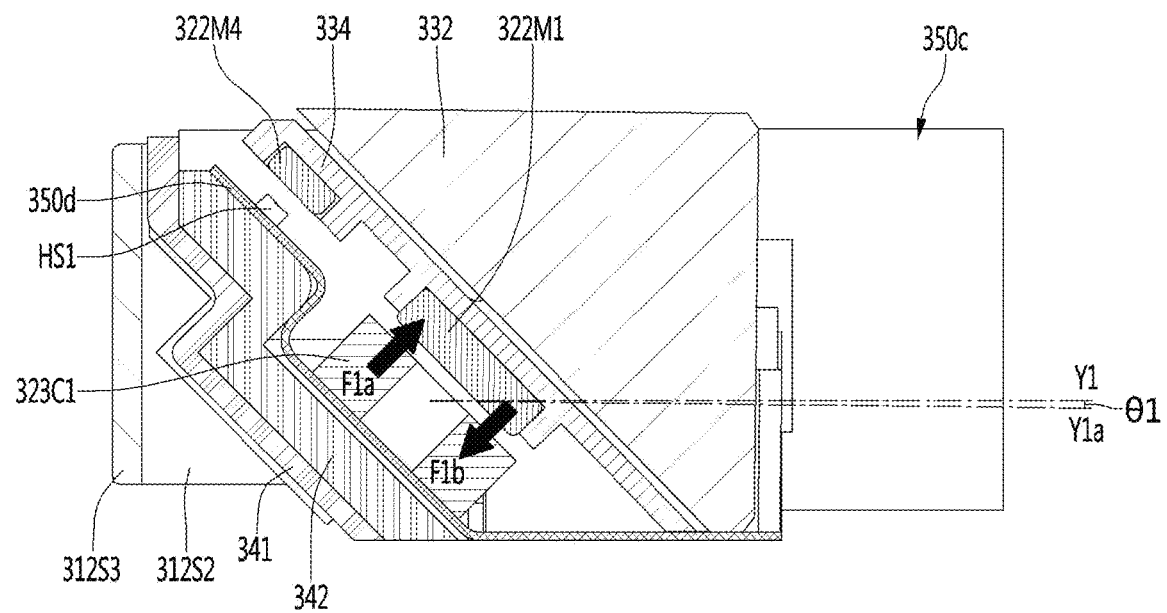
FIG. 29C is an exemplary view of rotation of the second camera actuator shown in FIG. 29B.

For example, the first magnet 322M1 can form an electromagnetic force with the first coil unit 323C1 to tilt or rotate the prism unit 330 in the Y-axis direction (see FIGS. 29A to 29C).

In addition, the second magnet 322M2 and the third magnet 322M3 can form an electromagnetic force with the second coil part 323C2 and the third coil part 323C3, respectively such that the prism unit 330 in the X-axis direction can be tilted or rotated (see FIGS. 30A to 30C).

In addition, the prism driving unit 320 may include a second back yoke 324Y2 disposed on the rear surface of the second magnet 322M2 and a third back yoke 324Y3 disposed on the rear surface of the third magnet 322M3.

According to the embodiment, by controlling the rotation of the prism unit 330 on the first axis or the second axis by the electromagnetic force between the magnet and the coil unit, the occurrence of a decent or tilt phenomenon can be minimized when OIS is implemented, so that there is a technical effect that can produce the best optical properties.

In addition, according to the embodiment, because the OIS can be implemented by having the prism driving unit 320 and the rotating unit 340 disposed in the housing 310, there is a technical effect of providing an ultra-slim, ultra-small camera actuator and a camera module including the same, capable of eliminating the size limitation of the lens in the lens assembly of the optical system.

Next, FIG. 29A is a perspective view of the second camera actuator shown in FIG. 21, FIG. 29B is a cross-sectional view in the first axial direction of the second camera actuator shown in FIG. 29A, and FIG. 29C is an example diagram of the rotating of the second camera actuator shown in FIG. 29B.

For example, FIG. 29B is a first cross-sectional view taken along line A1-A1' of the second camera actuator 300 shown in FIG. 29A.

Referring to FIG. 29B, OIS can be implemented while the prism mover 334 is rotated in the first axis, for example, the Y-axis direction.

For example, the first magnet 322M1 disposed on the prism mover 334 may form an electromagnetic force with the first coil unit 323C1 to tilt or rotate the prism unit 330 in the Y-axis direction.

Specifically, referring to FIGS. 26J and 29C, the prism mover 334 can include a rotation guide 334P, and the second rotation guide 334P2 of the rotation guide 334P can function as a rotation shaft, and the prism unit 330 may be rotated or tilted by being coupled to the first rotation hole 342R1 of the second rotation unit 342.

For example, the first electromagnetic force F1a, F1b between the first magnet 322M1 disposed on the third-second seating part 334S3b of the prism mover and the first coil part 323C1 disposed on the second circuit board 350 can be made. So OIS can be implemented by rotating the prism unit 330 at a first angle Θ1 in the Y-axis direction by the first electromagnetic force (Y1→Y1a). The first angle Θ1 may be ±1° to 1.5°, that is, 2° to 3°.

Next, FIG. 30A is a perspective view of the second camera actuator shown in FIG. 21, and FIG. 30B is a cross-sectional view taken along line A2-A2' in the second axis direction of the second camera actuator shown in FIG. 30A, and FIG. 30C is a rotation example of the second camera actuator shown in FIG. 30B.

Referring to FIG. 30B, OIS can be implemented while the prism mover 334 is tilted or rotated in the X-axis direction.

For example, the second magnet 322M2, the third magnet 322M3 disposed in the first rotation unit 341, the second rotation unit 342 can form an electromagnetic force, respectively with the second coil unit 323C2, the third coil unit 323C3 disposed in the housing 310. So the prism unit 330 can be tilted or rotated by tilting the first rotation unit 341 and the second rotation unit 342 in the X-axis direction by this electromagnetic force, Specifically, referring to FIG. 30C, the first hinge region HGR1 and the second hinge region HGR2 may function as tilting or rotating axes in the X-axis direction.

At this time, a second electromagnetic force F2a and F2b may be respectively generated between the second magnet 322M2, the third magnet 322M3 disposed on the first rotation unit 341, the second rotation unit 342 and the second coil unit 323C2, the third coil part 323C3 disposed on the housing.

The first rotation unit 341 and the second rotation unit 342 can be tilted by this second electromagnetic force, and by this tilting, the prism unit 330 can be rotated by a second angle Θ2 in the X-axis direction (X2→X2b), OIS implementation may be possible. The second angle Θ2 may be ±1° to 1.5°, that is, 2° to 3°.

According to the embodiment, there is a technical effect that can provide an ultra-slim, ultra-small camera actuator and a camera module including the same.

For example, according to the embodiment, the OIS can be implemented by having a prism driving unit 320 and a shaft unit 340 disposed in a housing 310, thereby eliminating a size limitation of the lens in the lens assembly of the optical system, so that and there is a technical effect that can provide the ultra-slim, ultra-small camera actuator and a camera module including the same.

For example, according to the embodiment, electromagnetic force between the magnet disposed on the prism mover 334 and the coil unit disposed on the housing 310 may be generated. The rotation of the prism unit 330 in the first axis direction or the second axis direction using the first rotation unit 341 and the second rotation unit 342 may be controlled by this electromagnetic force. Accordingly, when implementing OIS, there is a technical effect of minimizing the occurrence of a decent or a tilt phenomenon to obtain the best optical characteristics.

Also, according to the embodiment, the first rotation unit 341 and the second rotation unit 342 can be rotated or tilted in the second axial direction, for example, in the X-axis direction by the first hinge region HGR1 and the second hinge region HGR2. Accordingly, the prism unit 330 may be rotated or tilted in the second axis direction.

For example, the second magnet 322M2, the third magnet 322M3 disposed in the first rotation unit 341, the second rotation unit 342 can form an electromagnetic force, respectively with the second coil unit 323C2, the third coil unit 323C3 disposed in the housing 310. So the prism unit 330 can be tilted or rotated by tilting the first rotation unit 341 and the second rotation unit 342 in the X-axis direction by this electromagnetic force, Also, according to the embodiment, the rotation guide 334P of the prism unit 330 may be rotatably coupled to the first rotation hole 342R1 of the second rotation unit 342 such that the prism unit 330 may be rotated or tilted in the first axial direction, for example, the Y-axis direction.

For example, the prism mover 334 may include a rotation guide 334P and the second rotation guide 334P2 of the rotation guide 334P may function as a rotation shaft and may be coupled to the first rotation hole 342R1 of the second rotation unit 342 so that the prism unit 330 can be rotated or tilted in the Y-axis direction.

In addition, according to the embodiment, there is a technical effect that can provide a camera actuator and a camera module including the same, capable of securing a sufficient amount of light by solving the size limitation of the lens in the lens assembly of the optical system when OIS is implemented.

For example, according to the embodiment, by implementing OIS through rotation in the first and second axis directions of the prism unit 230 itself, there is a technical effect that can provide a possible camera actuator and a camera module including the same, capable of securing sufficient light quantity by solving the size limitation of the lens in the lens assembly of the optical system when implementing OIS.

In addition, according to the embodiment, by controlling the rotation of the prism unit 330 on the first axis or the second axis by the electromagnetic force between the magnet arranged on the prism mover 334 and the coil unit arranged on the housing while implementing the OIS. There is a technical effect that minimizes the occurrence of a decent or tilt phenomenon and produces the best optical characteristics.

In addition, according to the embodiment, there is a technical effect of providing a camera actuator and a camera module including the same, capable of providing the best optical characteristics by minimizing the occurrence of a decent or tilt phenomenon when implementing OIS.

For example, according to the embodiment, a prism driving unit 320 stably disposed on the housing 310 is provided to control the rotation of the prism unit 330 on a first axis or a second axis such that there is a technical effect that can produce the best optical properties by minimizing the occurrence of a decent or tilt phenomenon when implementing OIS.

In addition, according to the embodiment, there is a technical effect of providing a camera actuator and a camera module including the same, capable of implementing OIS with low power consumption.

For example, according to the embodiment, the prism driving unit 320 and the shaft unit 340 are provided to control the rotation of the prism unit 330 on the first axis or the second axis, unlike moving the existing plurality of solid lenses, there is a technical effect of providing a camera actuator and a camera module including the same, capable of implementing OIS with low power consumption.

INDUSTRIAL APPLICABILITY

Figure 31:
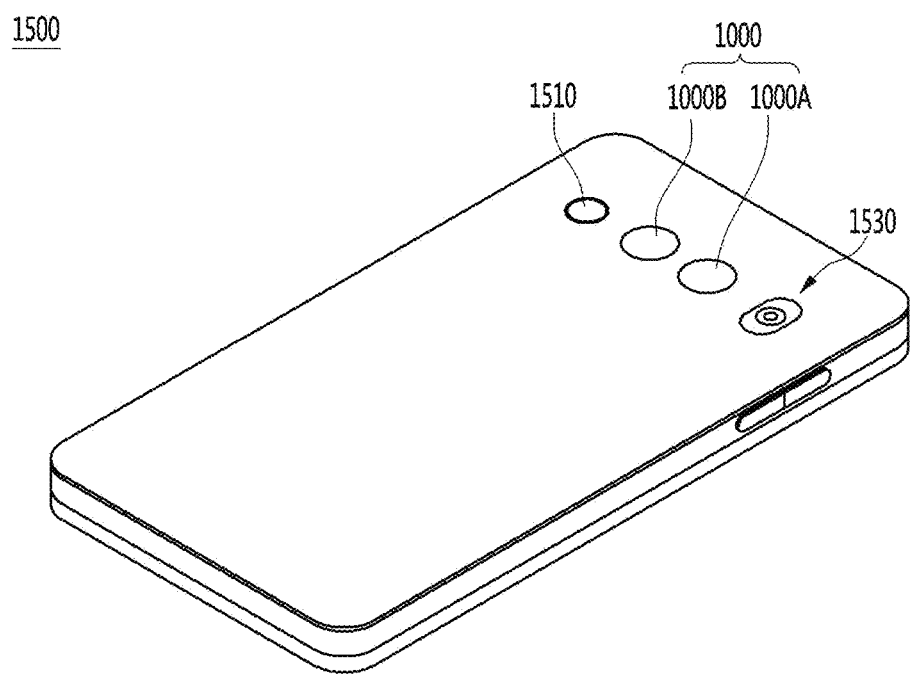
FIG. 31 is a perspective view of a mobile terminal to which a camera module according to an embodiment is applied.

Next, FIG. 31 is a mobile terminal 1500 to which a camera module according to an embodiment is applied.

As shown in FIG. 31, the mobile terminal 1500 according to the embodiment may include a camera module 1000, a flash module 1530, and an autofocus device 1510 provided on the rear side.

The camera module 1000 may include an image capturing function and an auto focus function. For example, the camera module 1000 may include an auto-focus function using an image.

The camera module 1000 processes an image frame of a still image or a moving image obtained by an image sensor in a shooting mode or a video call mode. The processed image frame may be displayed on a predetermined display unit and stored in a memory. A camera (not shown) may also be disposed on the front of the mobile terminal body.

For example, the camera module 1000 may include a first camera module 1000A and a second camera module 1000B, and OIS can be implemented together with an AF or zoom function by the first camera module 1000A.

The flash module 1530 may include a light emitting device emitting light therein. The flash module 1530 may be operated by a camera operation of a mobile terminal or a user's control.

The autofocus device 1510 may include one of the packages of the surface light emitting laser device as a light emitting part.

The auto-focus device 1510 may include an auto-focus function using a laser. The auto focus device 1510 may be mainly used in a condition in which the auto focus function using the image of the camera module 1000 is deteriorated, for example, close to 10 m or less or in a dark environment. The autofocus device 1510 may include a light emitting unit including a vertical cavity surface emitting laser (VCSEL) semiconductor device and a light receiving unit that converts light energy such as a photodiode into electrical energy.

Figure 32:
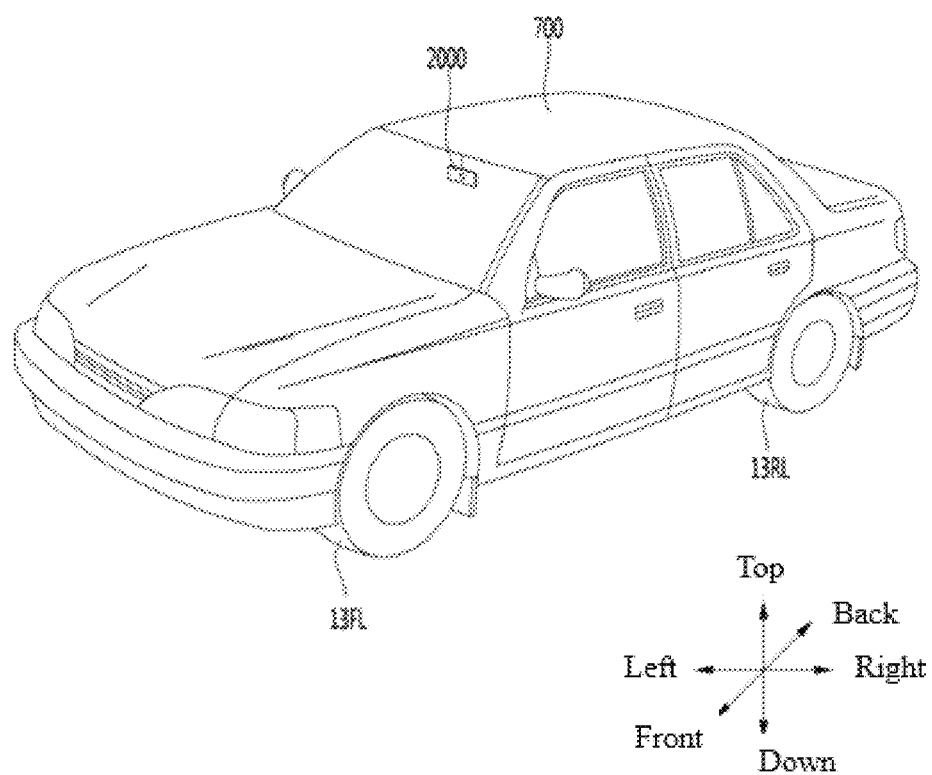
FIG. 32 is a perspective view of a vehicle to which a camera module according to an embodiment is applied.

Next, FIG. 32 is a perspective view of the vehicle 700 to which the camera module according to the embodiment is applied.

For example, FIG. 32 is an external view of a vehicle including a vehicle driving assistance device to which the camera module 1000 according to the embodiment is applied.

Referring to FIG. 32, the vehicle 700 according to the embodiment may include wheels 13FL and 13FR that rotate by a power source and a predetermined sensor. The sensor may be the camera sensor 2000, but is not limited thereto.

The camera 2000 may be a camera sensor to which the camera module 1000 according to the embodiment is applied.

The vehicle 700 of the embodiment may acquire image information through a camera sensor 2000 that captures a front image or a surrounding image, and determines a lane unidentified situation using the image information and generates a virtual lane when unidentified can do.

For example, the camera sensor 2000 may acquire a front image by photographing the front of the vehicle 700, and a processor (not shown) may obtain image information by analyzing an object included in the front image.

For example, when an object such as a median, curb, or street tree corresponding to a lane, an adjacent vehicle, a driving obstacle, and an indirect road mark is captured in the image captured by the camera sensor 2000, the processor detects the object Thus, it can be included in the image information.

In this case, the processor may further supplement the image information by acquiring distance information from the object detected through the camera sensor 2000. The image information may be information about an object photographed in an image.

The camera sensor 2000 may include an image sensor and an image processing module. The camera sensor 2000 may process a still image or a moving image obtained by an image sensor (eg, CMOS or CCD). The image processing module may process a still image or a moving image obtained through the image sensor, extract necessary information, and transmit the extracted information to the processor.

In this case, the camera sensor 2000 may include a stereo camera to improve the measurement accuracy of the object and further secure information such as the distance between the vehicle 700 and the object, but is not limited thereto.

Features, structures, effects, etc. described in the above embodiments can be included in at least one embodiment, and are not necessarily limited to only one embodiment. Furthermore, features, structures, effects, etc. illustrated in each embodiment can be combined or modified for other embodiments by those of ordinary skilled person in the art to which the embodiments belong. Accordingly, the contents related to such combinations and modifications should be interpreted as being included in the scope of the embodiments.

In the above, the embodiment has been mainly described, but this is only an example and does not limit the embodiment, and those of ordinary skilled person in the art to which the embodiment belong may find several not illustrated above within the range that does not deviate from the essential characteristics of the embodiment. It can be seen that variations and applications of branches are possible. For example, each element specifically shown in the embodiment can be implemented by modification. And differences related to such modifications and applications should be construed as being included in the scope of the embodiments set forth in the appended claims.

The invention claimed is:

1. A camera actuator comprising:
a housing;
a prism unit disposed in the housing; and
a prism driving unit and a shaft unit disposed in the housing and tilting the prism unit in a first axis or a second axis direction,
wherein the shaft unit comprises a first shaft disposed in a direction parallel to a first direction, and a second shaft and a third shaft disposed in a direction perpendicular to the first direction,
wherein the prism unit comprises a prism mover having a seating portion and a prism disposed on the seating portion of the prism mover,
wherein the prism mover comprises a first outer surface and a second outer surface extending upward from both edges of the seating portion,
wherein the first outer surface of the prism mover comprises a first recess, and the second outer surface comprises a second recess,
wherein the second shaft and the third shaft are respectively disposed in the first recess and the second recess, and
wherein each diameter of the first recess and the second recess of the prism mover is larger than each diameter of the second shaft and the third shaft, respectively.

2. The camera actuator according to claim 1,
wherein the prism mover comprises a third outer surface between the first outer surface and the second outer surface and a rotation guide area on the third outer surface,
wherein the rotation guide area comprises a first guide protrusion protruding from the third outer surface and a second guide protrusion protruding from the first guide protrusion,
wherein the first guide protrusion comprises a third guide recess, and
wherein the second guide protrusion comprises a fourth guide recess.

3. The camera actuator according to claim 2, wherein the first shaft of the shaft unit is disposed in the fourth guide recess on the second guide protrusion.

4. The camera actuator according to claim 2, wherein the second guide protrusion protrudes higher than the first guide protrusion.

5. The camera actuator according to claim 2, wherein the third outer surface of the prism mover comprises a third-first seating portion and a third-second seating portion, and wherein each of a fourth magnet and a first magnet is respectively disposed on the third-first seating portion and the third-second seating portion.

6. A camera module comprising the camera actuator of claim 1.

7. A camera actuator comprising:
a housing;
a prism unit disposed in the housing;
a driving unit for tilting the prism unit; and
a first shaft, a second shaft, and a third shaft,
wherein the housing comprises a housing base, a first sidewall, a second sidewall opposite the first sidewall, and a third sidewall disposed between the first sidewall and the second sidewall,
wherein the housing base comprises a first recess protruding from the housing base in an area proximate to the first sidewall and a second recess protruding from the housing base in an area proximate to the second sidewall,
wherein the second shaft is disposed in the first recess, and the third shaft is disposed in the second recess, and
wherein the first shaft is disposed in a third recess formed in the first sidewall and a fourth recess formed in the second sidewall.

8. The camera actuator according to claim 7, wherein directions of long axes of the second shaft and the third shaft are perpendicular to a direction of a long axis of the first shaft,
wherein the prism unit comprises a prism mover having a seating portion, and a prism disposed on the seating portion of the prism mover,
wherein the prism mover comprises a first outer surface, a second outer surface, a third outer surface between the first outer surface and the second outer surface, and a rotation guide area on the third outer surface.

9. The camera actuator according to claim 8, wherein the rotation guide area comprises a first guide protrusion protruding from the third outer surface and a second guide protrusion protruding from the first guide protrusion,
wherein the first guide protrusion comprises a third guide recess,
wherein the second guide protrusion comprises a fourth guide recess, and
wherein the first shaft is disposed in a fourth guide recess on the second guide protrusion.

10. The camera actuator according to claim 9, wherein the second guide protrusion protrudes higher than the first guide protrusion.

11. The camera actuator according to claim 10, wherein the prism unit is rotated or tilted in a second axis direction using the second shaft and the third shaft as rotation axis, and the first shaft serves as a stopper by the third guide recess.

12. A camera actuator comprising:
a housing;
a prism unit disposed in the housing; and
a prism driving unit and a rotating unit disposed in the housing and tilting the prism unit in a first axis or a second axis direction,
wherein the rotating unit comprises a first rotating unit and a second rotating unit at least partially overlapping with the first rotating unit,
wherein the prism unit is disposed on the first rotating unit and the second rotating unit,
wherein the prism unit comprises a prism mover having a seating portion, and a prism disposed on the seating portion of the prism mover.

13. The camera actuator according to claim 12, wherein the prism mover comprises a first outer surface and a second outer surface extending upward from both edges of the seating portion,
- wherein the first outer surface of the prism mover comprises a first mover protrusion, and the second outer surface comprises a second mover protrusion,
- wherein the prism mover comprises a third outer surface between the first outer surface and the second outer surface, and
- comprising a rotation guide disposed on the third outer surface.

14. The camera actuator according to claim 13, wherein the rotation guide comprises a first rotation guide extended in a vertical direction from the third outer surface and a second rotation guide extended vertically from the first rotation guide.

15. The camera actuator according to claim 14, wherein the third outer surface of the prism mover comprises a third-first seating portion and a third-second seating portion.

16. The camera actuator according to claim 12, wherein the housing comprises a first housing side portion, a second housing side portion, and a third housing side portion disposed between the first and second housing sides portions, and
- the first housing side portion comprises a first hinge groove, and the second housing side portion comprises a second hinge groove.

17. The camera actuator according to claim 16, wherein a first hinge shaft of the first rotation unit is coupled to the first hinge groove and a second hinge shaft of the second rotation unit is coupled to the second hinge groove.

18. The camera actuator according to claim 17, wherein the second hinge groove comprises a second-first hinge groove and a second-second hinge groove, and the second-first hinge groove comprises a rectangular cross section, and the second-second hinge groove comprises a circular or hemispherical cross-section.

* * * * *